(12) United States Patent
Radovanovic

(10) Patent No.: US 10,584,281 B2
(45) Date of Patent: Mar. 10, 2020

(54) LIGHT EMITTING MATERIALS AND SYSTEMS AND METHOD FOR PRODUCTION THEREOF

(71) Applicant: Pavle Radovanovic, Waterloo (CA)

(72) Inventor: Pavle Radovanovic, Waterloo (CA)

( * ) Notice: Subject to any disclaimer, the term of this patent is extended or adjusted under 35 U.S.C. 154(b) by 492 days.

(21) Appl. No.: 14/882,547

(22) Filed: Oct. 14, 2015

(65) Prior Publication Data

US 2016/0102842 A1 Apr. 14, 2016

Related U.S. Application Data

(60) Provisional application No. 62/063,480, filed on Oct. 14, 2014.

(51) Int. Cl.
C09K 11/62 (2006.01)
C09K 11/54 (2006.01)

(52) U.S. Cl.
CPC .......... *C09K 11/621* (2013.01); *C09K 11/54* (2013.01)

(58) Field of Classification Search
CPC .................................................. C09K 11/621
See application file for complete search history.

(56) References Cited

U.S. PATENT DOCUMENTS

2009/0021141 A1* 1/2009 Emoto .................... B82Y 30/00
313/503
2009/0278441 A1* 11/2009 Braune ................. H01L 33/504
313/503

FOREIGN PATENT DOCUMENTS

WO WO2013/169364 * 11/2013

OTHER PUBLICATIONS

Uheda. Synthesis and long-period phosphorescence of ZnGa 204:Mn 2+ spinel.Journal of Alloys and Compounds 262-263 (1997) 60-64.*

* cited by examiner

Primary Examiner — Matthew E. Hoban
(74) Attorney, Agent, or Firm — Gowling WLG (Canada) LLP; Neil W. Henderson

(57) ABSTRACT

A method for making a light emitting structure including: determine desired light emitting characteristics; prepare a plurality of nanostructure composites, wherein the plurality of nanostructure composites are configured to provide the desired light emitting characteristics and are configured with predetermined excitation characteristics; selecting a light emission source based on the predetermined excitation characteristics; providing a substrate for the plurality of nanostructure composites; and applying the plurality of nanostructure composites to the substrate such that the plurality of nanostructure composites receive light from the light emission source. A light emitting structure including: a plurality of nanostructure composites, wherein the plurality of nanostructure composites are configured to provide predetermined light emitting characteristics and are configured with predetermined excitation characteristics; and a substrate for the plurality of nanostructure composites, wherein the plurality of nanostructure composites are applied to the substrate such that the plurality of nanostructure composites receive light from a light emission source having a spectrum that includes the predetermined excitation characteristics.

20 Claims, 61 Drawing Sheets

| RhB Concentration | CIE Coordinate (x,y,z) |
|---|---|
| 0.0 μM (Pure Ga$_2$O$_3$) | (0.2305, 0.3116, 0.4579) |
| 3.6 μM RhB | (0.2599, 0.3285, 0.4116) |
| 7.1 μM RhB | (0.2857, 0.3417, 0.3726) |
| 10.7 μM RhB | (0.3084, 0.3529, 0.3387) |
| 14.3 μM RhB | (0.3411, 0.3681, 0.2908) |
| 17.9 μM RhB | (0.3567, 0.3744, 0.2689) |
| 21.5 μM RhB | (0.3691, 0.3809, 0.2500) |
| 25.0 μM RhB | (0.3707, 0.3812, 0.2481) |
| 28.6 μM RhB | (0.3886, 0.3883, 0.2231) |
| Pure RhB | (0.5329, 0.4658, 0.0013) |

FIG. 6A

| RhB Concentration | CIE Coordinate (x,y,z) |
|---|---|
| 0.0 μM (Pure Ga₂O₃) | (0.2145, 0.2784, 0.5071) |
| 3.6 μM RhB | (0.3174, 0.3409, 0.3417) |
| 7.1 μM RhB | (0.3619, 0.3671, 0.2710) |
| 10.7 μM RhB | (0.3852, 0.3803, 0.2345) |
| 14.3 μM RhB | (0.4083, 0.3905, 0.2012) |
| 17.9 μM RhB | (0.4234, 0.4021, 0.1745) |
| 21.5 μM RhB | (0.4376, 0.4076, 0.1548) |
| 28.6 μM RhB | (0.4873, 0.4300, 0.0827) |
| Pure RhB | (0.5329, 0.4658, 0.0013) |

FIG. 8A

| RhB Concentration | CIE Coordinate (x,y,z) |
|---|---|
| 0.0 μM (Pure Ga$_2$O$_3$) | (0.2156, 0.3116, 0.4728) |
| 3.6 μM RhB | (0.2984, 0.3339, 0.3677) |
| 7.1 μM RhB | (0.3364, 0.3552, 0.3084) |
| 10.7 μM RhB | (0.3638, 0.3691, 0.2671) |
| 14.3 μM RhB | (0.3838, 0.3780, 0.2382) |
| 17.9 μM RhB | (0.4105, 0.3898, 0.1997) |
| 21.5 μM RhB | (0.4175, 0.3941, 0.1884) |
| 25.0 μM RhB | (0.4232, 0.3962, 0.1806) |
| 28.6 μM RhB | (0.4446, 0.4032, 0.1522) |
| Pure RhB | (0.5329, 0.4658, 0.0013) |

FIG. 10A

| RhB Concentration | CIE Coordinate (x,y,z) |
|---|---|
| 0.0 µM (Pure Ga$_2$O$_3$) | (0.2055, 0.2536, 0.5409) |
| 3.6 µM RhB | (0.2900, 0.3103, 0.3997) |
| 7.1 µM RhB | (0.3450, 0.3432, 0.3118) |
| 10.7 µM RhB | (0.3608, 0.3520, 0.2872) |
| 14.3 µM RhB | (0.3803, 0.3616, 0.2581) |
| 17.9 µM RhB | (0.4011, 0.3744, 0.2245) |
| 21.5 µM RhB | (0.4165, 0.3819, 0.2016) |
| 25.0 µM RhB | (0.4230, 0.3851, 0.1919) |
| 28.6 µM RhB | (0.4309, 0.3899, 0.1792) |
| Pure RhB | (0.5329, 0.4658, 0.0013) |

FIG. 12A

| Number | RhB Concentration | CIE Coordinate (x,y) |
|---|---|---|
| 1 | 0.0% RhB (Pure ZnO) | (0.219, 0.308) |
| 2 | 10% RhB (Pure ZnO) | (0.266, 0.378) |
| 3 | 20% RhB (Pure ZnO) | (0.278, 0.381) |
| 4 | 30% RhB (Pure ZnO) | (0.290, 0.387) |
| 5 | 40% RhB (Pure ZnO) | (0.305, 0.396) |
| 6 | Pure RhB | (0.533, 0.466) |

FIG. 16B

| RhB Concentration | CIE Coordinate (x,y) |
|---|---|
| 0.0% RhB (Pure ZnO) | (0.219,0.308) |
| 10% RhB–ZnO | (0.266,0.378) |
| 20% RhB–ZnO | (0.278,0.381) |
| 30% RhB–ZnO | (0.290,0.387) |
| 40% RhB–ZnO | (0.305,0.396) |
| 50% RhB–ZnO | (0.315,0.401) |
| 60% RhB–ZnO | (0.324,0.406) |
| 70% RhB–ZnO | (0.335,0.412) |
| 80% RhB–ZnO | (0.340,0.415) |
| 90% RhB–ZnO | (0.352,0.420) |
| 100% RhB–ZnO | (0.361,0.427) |
| Pure RhB | (0.533,0.466) |

FIG. 18A

LIGHT EMITTING MATERIALS AND SYSTEMS AND METHOD FOR PRODUCTION THEREOF

CROSS REFERENCE TO RELATED APPLICATIONS

The present disclosure claims the benefit of U.S. Provisional Patent Application No. 62/063,480 filed Oct. 14, 2014 the content of which is hereby incorporated herein by reference.

FIELD

The present application relates to novel light emitting materials and systems and methods for production of thereof. In particular, the light emitting materials are configurable to accept broadband ultraviolet excitation and produce white light emissions.

BACKGROUND

Lighting of buildings and outdoor areas is a large part of global electricity consumption. At least in part because of this, the use of energy inefficient lighting, including fluorescent lighting, induction lighting, incandescent lighting, is typically being phased out through promotion of more efficient lighting systems.

In conventional fluorescent lighting, electric current in the gas phase excites mercury or other ion vapor which produces a broad range of ultraviolet (UV) light, in addition to visible light. The UV light in turn causes a phosphor coating on the inside of the bulb to glow. Combination of converted and directly emitted visible light makes up the total output. Conventional fluorescent lighting systems may use multiple phosphors that coat the inside wall of a fluorescent tube. However, much of the UV radiation created by the discharge is not used because it is not absorbed by the phosphors, and is filtered or reflected back into the tube, which makes the devices less efficient and/or more costly to manufacture.

Conventional induction lighting operates in a similar way to fluorescent lighting, but without the need for electrodes. The excitation of the ions in the gas phase is done externally by electric or magnetic field. Induction lighting typically emits the same broad spectrum as a fluorescent lamp, but may have a longer lifetime and higher durability. However, due to multiple phosphors and a mixture of directly emitted visible light and converted UV light, the color rendering index is typically poor.

Conventional fluorescent or induction lighting that uses phosphors may only convert a narrow range of wavelengths into visible light. As well, multiple phosphors emitting complementary colors are generally needed to approximate white light. Further, conventional phosphor-based lighting typically uses expensive rare earth elements.

As such, there is a need for new high-efficiency lighting sources to reduce electricity usage. Solid state lighting, and in particular light emitting diodes (LEDs), have emerged as a promising long-term solution that could meet stringent efficiency, safety, durability, and reliability standards. Currently, LEDs are found in a wide variety of applications, including general lighting, automotive industry, architectural lighting and displays. White Light Emitting Diodes (WLEDs) are traditionally based on a multicolor (RGB) approach, in which white light is generated by controlled mixing of the emission from blue, green, and red LED chips. More recently, WLEDs have primarily been fabricated by combining a GaN blue LED chip with one or more phosphors, most notably yellow-emitting yttrium aluminum garnet doped with cerium ($Ce^{3+}$:YAG). These GaN/$Ce^{3+}$:YAG and similar phosphor-converted WLEDs generally suffer from a deficiency in the red emission component, resulting in low color rendering index (CRI <80%) and high correlated color temperature (CCT ~7000 K). The past decade has seen an ongoing effort to develop rare earth element-based converters that could produce optimal quality white light in conjunction with blue LEDs. However, increasing deficiency and strategic importance of rare earth elements call for investigating other approaches to WLEDs. The slow adoption of WLED technologies is exacerbated by complex design and inconsistency of key figures of merit, ultimately leading to high device manufacturing cost.

While LEDs and WLEDs in particular are being used in some applications, there remain other applications where LEDs may not be as effective, for example, larger area lighting such as that for larger buildings (e.g. warehouses, open-floor office spaces and the like) and outdoor lighting (e.g. parking areas, stadiums, and the like). In these applications, it is likely that fluorescent lighting, induction lighting or halogen lighting will be used. As noted above, conventional fluorescent and halogen lighting systems also have some drawbacks, including the use of rare earth metals in the phosphors and mercury vapor in the gas phase to provide the light output. These materials can be expensive and/or dangerous. Further, conventional lighting approaches may require electrical ballasts to regulate the current passed through the lamp. Ballasts generally make the lighting bulky and costly. Conventional lighting approaches may also generate UV light which can have harmful effects if not converted or blocked.

There is therefore a need to provide a new lighting material, a method of producing the same, and fluorescent lighting systems making use of the new lighting material that can generate a desired quality of white light in an energy-efficient and economically viable way.

SUMMARY

In a first aspect, the present disclosure provides a method for making a light emitting structure, the method including: determine desired light emitting characteristics; prepare a plurality of nanostructure composites, wherein the plurality of nanostructure composites are configured to provide the desired light emitting characteristics and are configured with predetermined excitation characteristics; selecting a light emission source based on the predetermined excitation characteristics for the plurality of nanostructure composites; providing a substrate for the plurality of nanostructure composites; and applying the plurality of nanostructure composites to the substrate such that the plurality of nanostructure composites receive light from the light emission source.

In a particular case, the excitation characteristics of the plurality of nanostructure composites are configured to cover substantially all of the ultraviolet frequency range.

In another particular case, the excitation characteristics of the plurality of nanostructure composites are configured to cover a sub-set of the ultraviolet frequency range.

In still another particular case, the sub-set of the ultraviolet frequency range is approximately 180 nm to 380 nm.

In yet another particular case, the light emission source is a mercury or halogen light source.

In still yet another particular case, the light emission source is a fluorescent lighting source.

In a particular case, at least one of the plurality of nanostructure composites comprises a stabilizing agent.

In another particular case, the stabilizing agent is epoxy silane.

In still another particular case, applying the plurality of nanostructure composites comprises forming a layer including the plurality of nanostructure composites.

In yet another particular case, the light emitting structure further comprises a second layer comprising conventional phosphors.

In still yet another particular case, the light emitting structure further comprises additional layers of nanostructure composites and conventional phosphor based on the wavelengths for the desired light emitting characteristics.

In a particular case, the desired light emitting characteristics are in a white light range.

In another particular case, the plurality of nanostructure composites comprises a first and second nanostructure composite and the method further includes: configuring the first nanostructure composite to provide photoluminescence (PL) in a first PL spectrum based on the light emitting characteristics and to have absorption for a first excitation spectrum; and configuring the second nanostructure composite to provide photoluminescence in a second PL spectrum based on the light emitting characteristics and to have absorption for a second excitation spectrum that is different from the first adsorption spectrum.

In still another particular case, the first PL spectrum and the second PL spectrum are the same.

In yet another particular case, the first nanostructure composite is applied in a first layer and the second nanostructure composite is applied in a second layer.

In still yet another particular case, the first nanostructure composite and the second nanostructure composite are mixed and applied in a single layer.

In another particular case, the first absorption spectrum and the second absorption spectrum overlap.

In a further aspect, there is provided a light emitting structure including: a plurality of nanostructure composites, wherein the plurality of nanostructure composites are configured to provide predetermined light emitting characteristics and are configured with predetermined excitation characteristics; and a substrate for the plurality of nanostructure composites, wherein the plurality of nanostructure composites are applied to the substrate such that the plurality of nanostructure composites receive light from a light emission source having a spectrum that includes the predetermined excitation characteristics.

In a particular case, the plurality of nanostructure composites comprise Ga2O3 and ZnO-based nanostructure composites.

In another particular case, at least one of the plurality of nanostructure composites comprises a stabilizing agent.

Other aspects and features of the present disclosure will become apparent to those ordinarily skilled in the art upon review of the following description of specific embodiments on conjunction with the accompanying figures.

BRIEF DESCRIPTION OF THE DRAWINGS

Embodiments of the present disclosure will now be described, by way of example only, with reference to the attached Figures.

FIGS. 6A and 6B illustrate the International Commission on Illumination (CIE) coordinates obtained from the photoluminescence spectra for gallium(III) oxide ($Ga_2O_3$) (approximately 5.6 nm)—Rhodamine B (RhB), according to an embodiment.

FIGS. 8A and 8B illustrate a map of $Ga_2O_3$ (approximately 4.4 nm)—RhB photoluminescence using a CIE chromaticity diagram, according to an embodiment.

FIGS. 10A and 10B illustrate $Ga_2O_3$ (approximately 4.3 nm)—RhB photoluminescence using a CIE chromaticity diagram, according to an embodiment.

FIGS. 12A and 12B illustrate CIE coordinate analyses of $Ga_2O_3$—RhB nanocomposites to achieve white light emissions, with 3.8 nm $Ga_2O_3$ nanocrystals with different amounts of RhB bound on the surface of the nanocrystals, according to an embodiment.

DETAILED DESCRIPTION

Figure 1A:
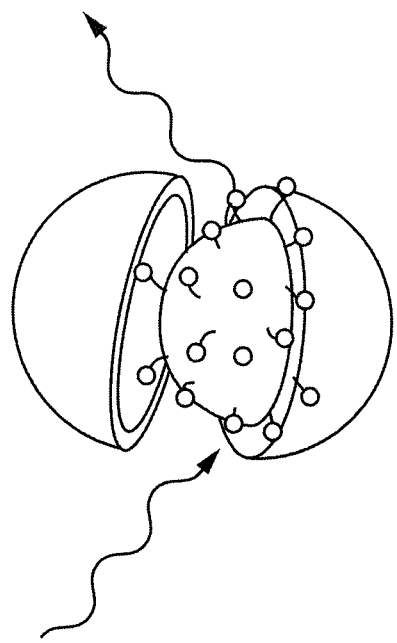
FIGS. 1A and 1B illustrate a nanocrystal (NC)-based chromophore according to an embodiment.

In the drawings, embodiments are illustrated by way of example. It is to be expressly understood that the description and drawings are only for the purpose of illustration and as an aid to understanding, and are not intended as a definition of the limits of the disclosure.

In light of the complexity and the cost of conventional methods for fabricating light emitting materials and systems, in particular, white light emitting materials and systems, the light emitting materials, systems, structures and production methods herein have been developed to provide composite materials and lighting systems that are intended to provide benefits, such as higher efficiency, lower cost and less reliance on rare earth materials and the like.

Aspects of new light emitting materials and methods for production of the same are described in US Patent Publication No. 2015/0108406 by Radovanovic et al., which is hereby incorporated herein by reference. In particular, Radovanovic et al. describes a light emitting material formed from transparent conducting oxide nanoparticles and either an organic or organometallic complex or an inorganic complex (such as quantum dots) that is bound to the surfaces of the oxide nanoparticles. These types of light emitting materials are sometimes referred to as hybrid materials, hybrid nanocrystal conjugates or composites, hybrid nanoconjugates, nanostructure conjugates or composites, or the like. These light emitting materials can generally be made in either a solid form or a liquid form (for example as colloids), in order to simplify the fabrication of light emitting systems and devices with different lighting characteristics.

White light emissions are generally induced by the combination of three primary colors (blue, green and red) or two complimentary colors (blue and orange or cyan and red). In one case, colloidal metastable $\gamma$-$Ga_2O_3$ nanocrystals emit light that is size-tunable from the violet to cyan region (405-465 nm) of the visible spectrum. This emission arises from the recombination of an electron trapped on a donor (oxygen vacancy) with a hole trapped on an acceptor (gallium or gallium-oxygen vacancy pair). Known as the donor-acceptor pair (DAP) recombination, this phenomenon usually depends on the binding energy of localized donors and acceptors and their attractive Coulomb interaction. By manipulating the oxidizing/reducing environment during the synthesis process, the native defect concentration can be controlled, in turn affecting the intensity of the defect emission.

With a nanostructure composite, a white light-emitting material may be made by adjusting the size of oxide nanocrystals, for example, by varying synthesis temperature, and by varying the concentration of RhB (or another fluorophore) on the nanocrystal surfaces. Varying the size of the nanocrystals may allow for tuning of the blue-green part of the spectrum, and varying the concentration of RhB bound to the nanocrystals can modulate the intensity of the orange/red part of the spectrum. A flourophore such as RhB can be used because it generally satisfies the spectral requirements, is well characterized and readily commercially available.

An advantage of the nanostructure composites described herein with regard to oxide nanocrystals is blue-to-green photoluminescence originating from donor-acceptor pair recombination, which is sufficiently broad and size-tunable in the spectral region so that it requires only a minor contribution to the emission from the orange-red part of the spectrum to generate white light. As a variety of available organic dye molecules are highly emissive in the orange-red spectrum, hybrid materials based on colloidal $Ga_2O_3$ nanocrystals are a practical way to obtain white light-emitting phosphors. Furthermore, the colloidal form of the nanocrystals allows for their easy manipulation and functionalization using chemical means, including the incorporation into light emitting systems and devices.

An advantage of the synthesis method for nanostructure composites is that it is intended to induce non-radiative coupling of the chromophores. Non-radiative coupling is accomplished relying on Förster resonance energy transfer (FRET) effects for extending the blue emission in the red spectral region, thereby enabling white light formation based on excitation of the nanocrystals functionalized with RhB (or a similar molecule). FRET is an electrodynamic phenomenon that occurs between the donor in the excited state (i.e. blue emitting nanocrystals) and the acceptor in the ground state (i.e. RhB) through nonradiative dipole—dipole coupling between the two chromospheres. The extent to which energy is transferred from a donor to an acceptor is based on the overlap between the emission spectrum of a donor (blue emitting nanocrystals) and the absorption spectrum of an acceptor (RhB). As a result of the application of FRET, the nanocrystals provide not only a blue component of the spectrum but also a strong tunable overlap with the absorption of the molecular fluorophore. The blue luminescence of nanocrystals is sufficiently broad to allow for the white light formation upon the addition of a much narrower orange-red component from the adsorbed fluorophore. As well, it is demonstrated herein that the application of FRET may significantly enhance the emission lifetime of the secondary chromophore (i.e. RhB).

By increasing the amount of the fluorophore-acceptor (for example RhB) on the surfaces of the nanocrystals, the probability of transferring energy from the donor (blue emitting nanocrystals) to the acceptor (RhB) increases. As a consequence the transferred energy may be higher than energy emitted in the form of blue luminescence, allowing for tuning of the white light from "cool" (i.e. bluer) to "warm" (i.e. "more yellow"). Accordingly, as further explained below, the synthesis of the hybrid nanocrystal may include a variation of the concentration of the fluorophore-acceptor. This variation is for the purpose of affecting energy transfer processes within the nanomaterial in order to tune the light emitting spectra of the nanomaterial in order to achieve overall white light luminescence that is consistent with a set of desired light emitting attributes.

Although organic semiconductor light emitting diodes (OLEDs) have sometimes been used to fabricate large-area white light illuminating panels, these devices generally have problems including a short lifespan, low efficiency, and low stability. An alternative may be to use highly luminescent colloidal semiconductor nanocrystals (NCs). Colloidal NCs typically have higher resistance to thermal and photo degradation and include CdSe, CdZnS alloys, ZnSe/CdSe/ZnS core/shell/shell, CdSe/ZnS core/shell and the like. While these approaches may reduce or eliminate the necessity of using rare-earth elements, these approaches still typically rely on multiple independent components. Relying on multiple independent components makes it difficult to control the proportion of the individual components, maintain the uniformity of the emission, and reproduce the same quality of white light in different devices.

Further, NC-based white light emitters are intended to generate white light by photoluminescence (PL) from only one type of NC upon single wavelength excitation by an ultraviolet (UV) LED. For example, white light emitting ZnSe NCs have been developed in which white light generation is a result of a combination of band edge (blue) and broad surface trap (green to red) emission. Further, the widespread use of CdSe NCs is a testament to their size-tunable PL in the visible range, quantum yield, and well-understood synthesis and modification methods. However, the toxicity of cadmium-related compounds and nanomaterials is well documented, limiting their potential applications. Furthermore, photo-oxidation, low Cd/Se abundance in earth's crust, and the necessary control of dopants and surface states remain significant challenges. There is therefore a need to fully realize the potential of solid state lighting by developing white light emitting colloidal nanomaterial that is made of earth abundant elements and is intended to be non-toxic, environmentally benign and inexpensive to produce.

One of the attractive features of colloidal NCs generally is the possibility of their manipulation in the solution phase, including the conjugation with molecular species to form new structures with enhanced functionality. FIG. 1A illustrates the concept of nanostructure composites being used to generate white light. In this case, the white light is generated using dye-conjugated ZnO NCs. Broad-band defect-based blue PL of ZnO NCs allows for a partial resonance energy transfer to orange-red chromophores (i.e ATTO 590) conjugated on NC surfaces. This results in the formation of a new quasi-single chromophore which simultaneously emits from both centers by single energy excitation. While the origin of defect-based ZnO NC emission may not be fully understood, there are strong indications that it involves NC surface states. Some research has proposed that the visible emission is due to the recombination of an electron from the conduction band edge, or a level close to the band edge, to deeply trapped hole localized at an oxygen vacancy site ($V_O^\bullet$) in a NC. It has been further suggested that this process is enabled by the transfer of the photogenerated hole from the valence band to the $V_O^\bullet$ site, which is mediated by initial trapping of the hole at an $O^{2-}$ or $OH^-$ surface site.

Figure 1B:
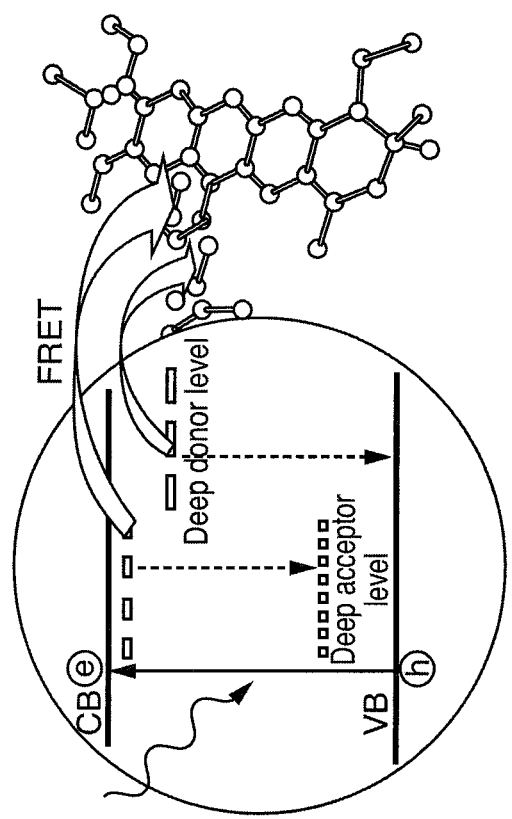

As an example, FIG. 1A illustrates a schematic representation of ZnO nanocrystals conjugated with ATTO 590 and the possible energy transfer process from surface defect energy levels to the attached dye molecules upon excitation of ZnO band gap. FIG. 1B illustrates ZnO-ATTO 590 FRET pair stabilized by functionalization with a stabilizing agent such as epoxy silane or the like and the hybrid nanocomposite acts as a stable single emitting white phosphor under UV-excitation. Applicants have demonstrated that ATTO 590 molecules may be attached to colloidal NC surfaces, most likely via free carboxyl group binding to cation sites, allowing for the formation of the FRET pair, where trapped charge carriers on ZnO defects transfer energy to the adsorbed dye molecules upon UV excitation in the ZnO band gap (as shown in FIG. 1A). This nanoconjugate may be further modified to optimize and enhance its properties, or increase its stability and efficiency (as shown in FIG. 1B). Specifically, encapsulation of the conjugated NCs in a protecting layer of a stabilizing agent (epoxy silane) could enhance its stability as a white light emitting phosphor.

FIGS. 2 to 30 provide examples of and experimental results for various types of nanostructure composites.

Figure 2A:
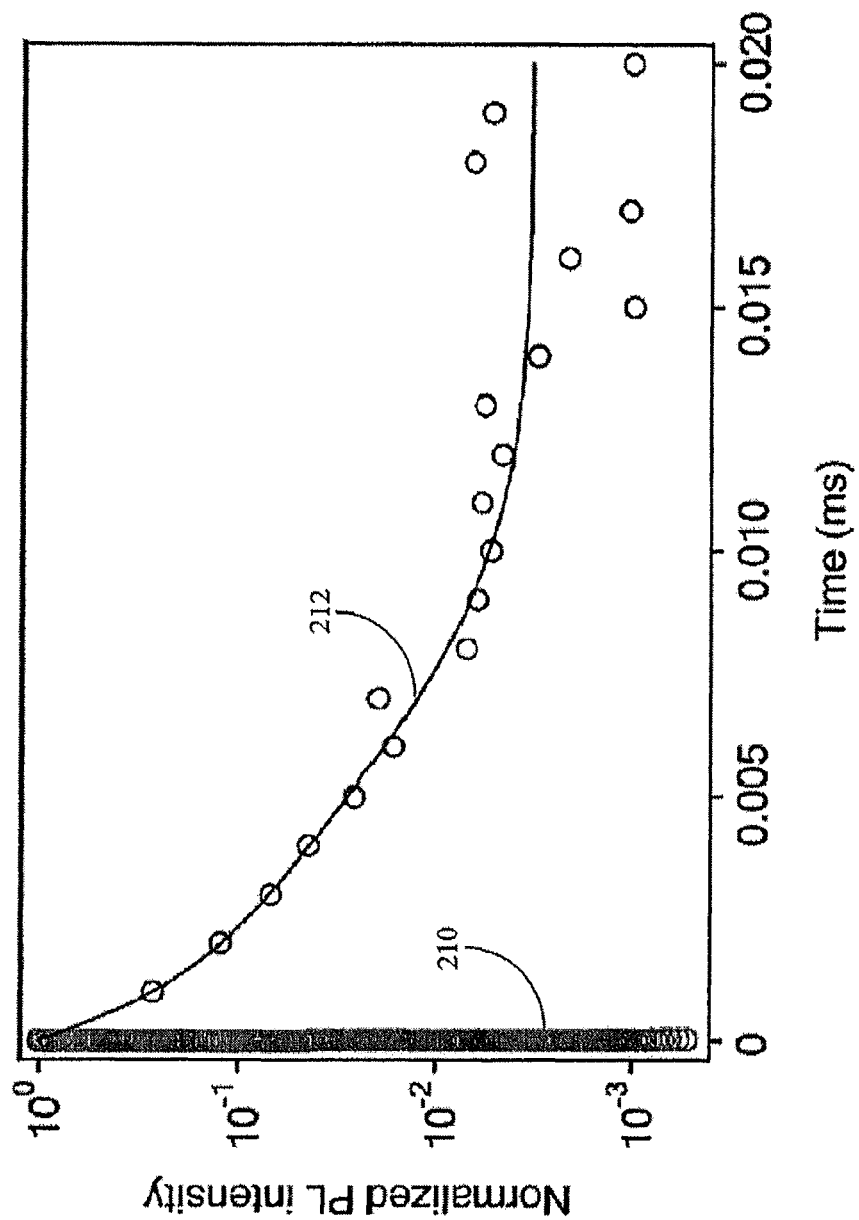
FIGS. 2A to 2J illustrate certain parameters and characteristics of Förster resonance energy transfer, according to an embodiment.
Figure 2B:
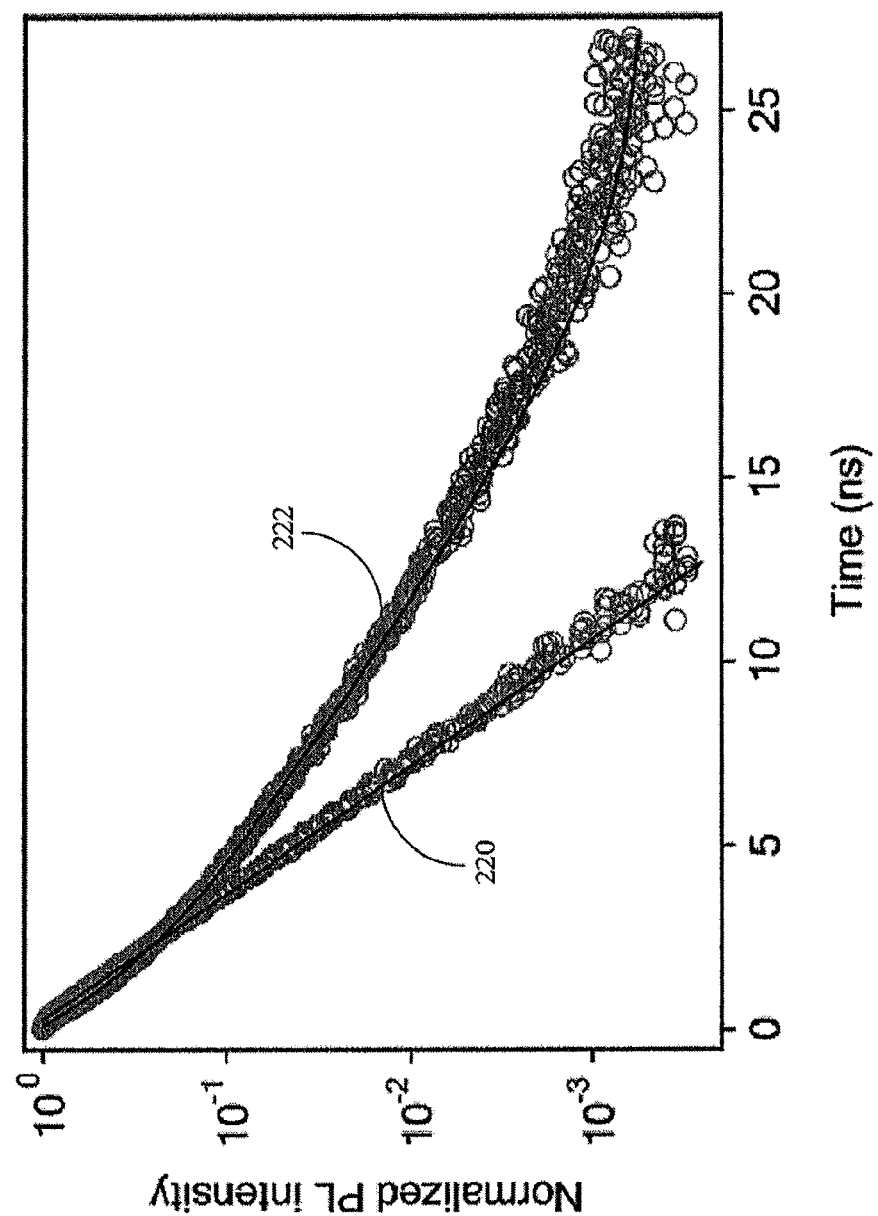
Figure 2C:
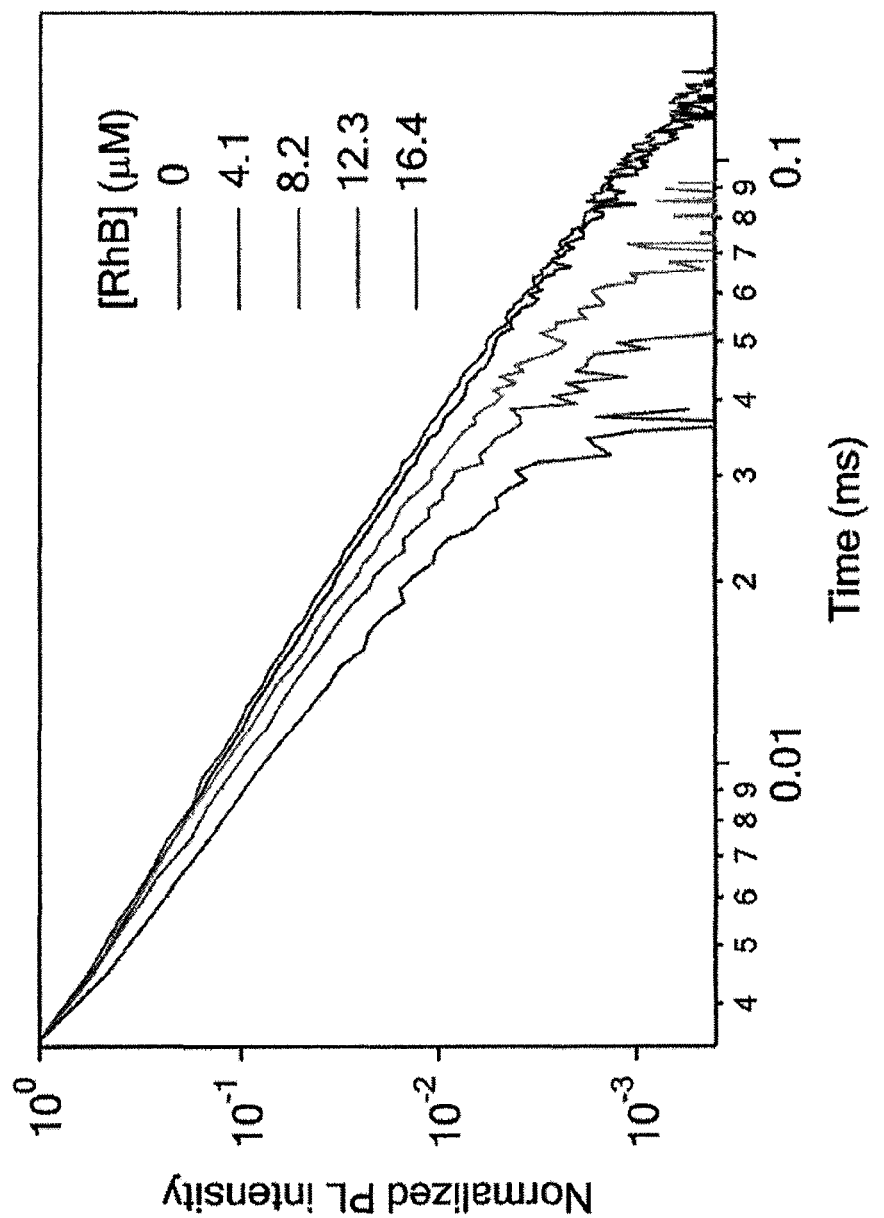

FIGS. 2A and 2B show a series of time-resolved photoluminensense (PL) measurements. FIG. 2A compares the PL decay dynamics of RhB bound to $Ga_2O_3$ nanocrystals upon excitation of $S_0$ to $S_1$ transition at 565 nm 210 and excitation into $Ga_2O_3$ nanocrystal band gap at 230 nm 212. Owing to the complete transparency of $Ga_2O_3$ nanocrystals throughout the visible part of the spectrum, RhB can be directly excited into $S_0$ to $S_1$ transition. FIG. 2B shows a comparison of the photoluminescence decay dynamics of free standing RhB in water 220 and bound to $Ga_2O_3$ nanocrystals in hexane 222. The resulting temporal decay of RhB bound to $Ga_2O_3$ nanocrystals in hexane 222 was fit with a bi-exponential function yielding an average lifetime ($<\tau>$) of 3.6 ns. This value is similar to the lifetime of free RhB molecules ($\tau=1.5$ ns), determined from the single exponential fit to the photoluminescence decay of RhB in aqueous solution 220. This behavior, typical for dye molecules, is in stark contrast with the photoluminescence decay of RhB when $Ga_2O_3$— RhB nanocrystals are excited into the $Ga_2O_3$ nanocrystal band gap. In this case, the decay rate is significantly slower, with three orders of magnitude longer average lifetime ($<\tau>=1.5$ μs). Extended lifetime suggests that RhB adopts the dynamics of DAP (donor-acceptor pair) recombination, and confirms that RhB is excited by FRET involving DAP states in $Ga_2O_3$ nanocrystals. $Ga_2O_3$ nanocrystal to RhB FRET is also evident from a decrease in the lifetime of DAP emission with increasing concentration of RhB added to nanocrystal surfaces, which is shown in FIG. 2C.

Figure 2D:
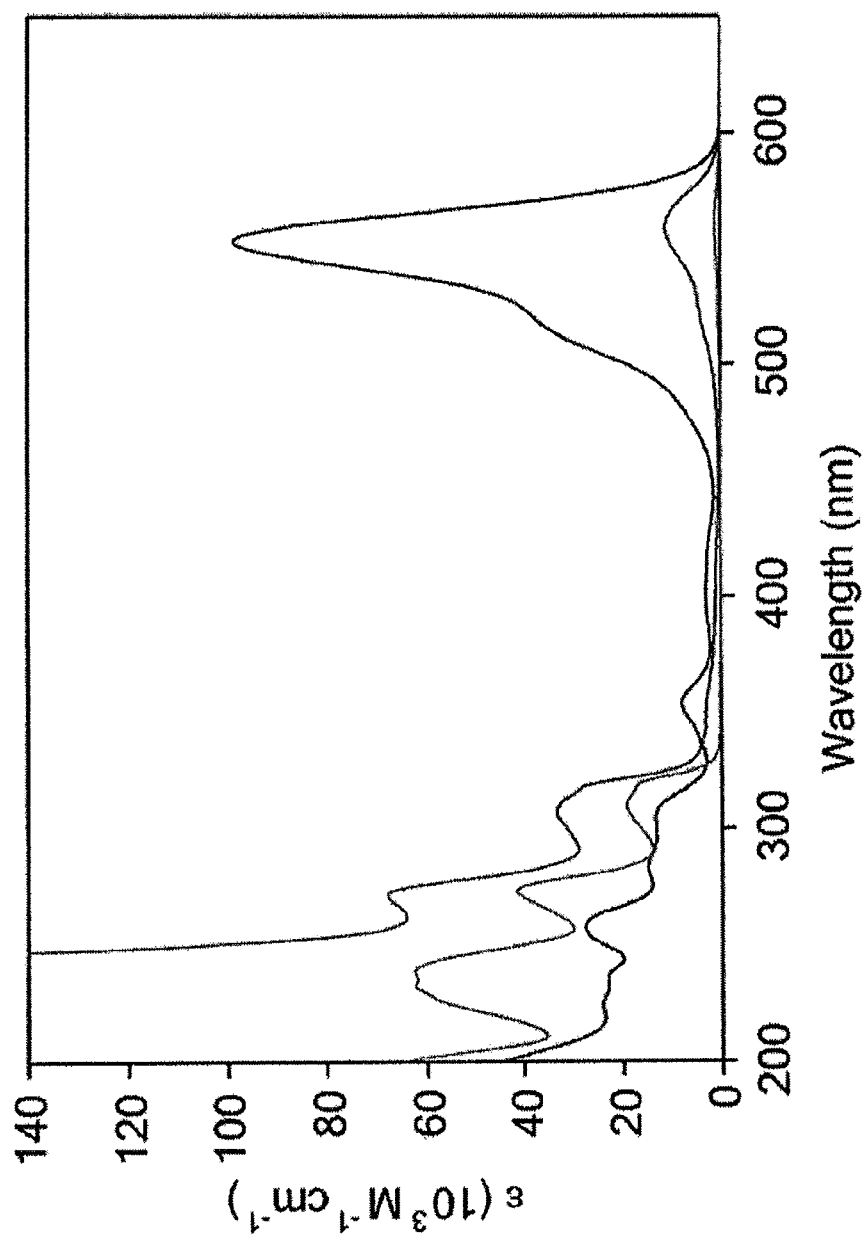

FIG. 2D compares the absorption spectra of RhB molecules dissolved in water (zwitterion, or Z form) and hexane (lactone, or L form) with those bound to $Ga_2O_3$ nanocrystals. The lactone form has very different absorption spectrum from the zwitterion form, particularly evident by the red shift and significant reduction in intensity of the $S_0$ to $S_1$ band with a maximum at approximately 561 nm, which is responsible for the emission of the ionic form. Consequently, RhB lactone in hexane solution does not emit in orange-red. Upon transferring RhB to $Ga_2O_3$ nanocrystal suspension the $S_0$ to $S_1$ band also experiences some red shift, and its intensity drops by a factor of approximately 9 relative to the zwitterion form. These changes indicate a distinct electronic structure of RhB upon transport into the non-polar solvent containing $Ga_2O_3$ nanocrystals. RhB can coordinate to $Ga_2O_3$ nanocrystals via carboxylic groups by replacing trioctylphosphine oxide ligands.

Figure 2E:
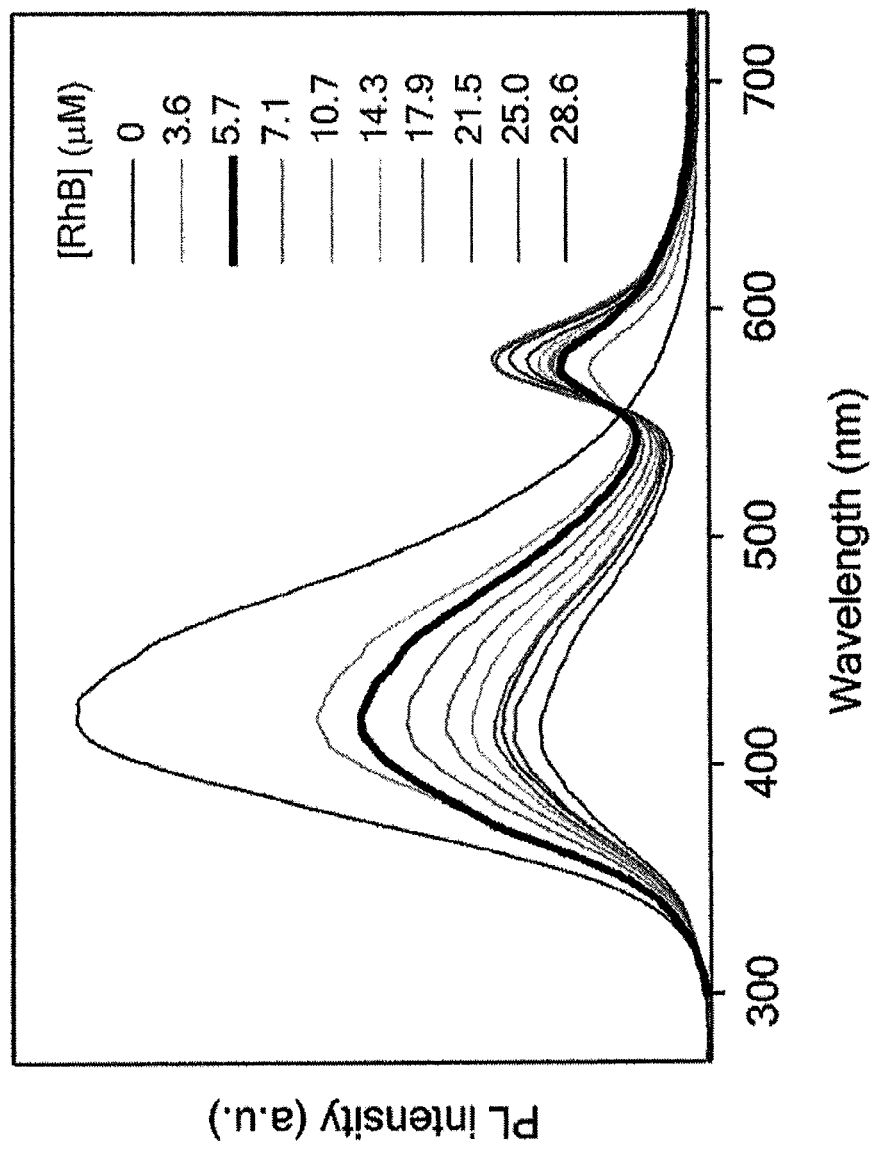

The photoluminescence spectra of $Ga_2O_3$ nanocrystals conjugated with RhB ($Ga_2O_3$—RhB nanocrystals) using different dilutions of RhB stock solution, upon excitation above the $Ga_2O_3$ band edge energy are shown in FIG. 2E. In the presence of RhB, the DAP emission quenches, while the characteristic $S_1$ to $S_0$ RhB emission band centred at approximately 578 nm appears. The RhB emission intensity increases at the expense of the DAP emission with increasing starting concentration of RhB solution, indicating the excitation of RhB by $Ga_2O_3$ nanocrystals. Assuming the excitation of RhB by FRET, the energy transfer efficiencies ($\eta_{FRET}$) for the nanocrystal sizes may be calculated, for example, using the following expression:

$$\eta_{FRET} = 1 - \frac{F_{DA}}{F_D}$$

where $F_D$ and $F_{DA}$ are relative intensities of DAP donor emission in the absence and presence of conjugated RhB acceptors, respectively. For these measurements, the same concentration of $Ga_2O_3$ nanocrystal suspensions may be based on the equal band gap absorbance, while the starting concentrations of RhB solutions were adjusted to give the same optical density of $S_0$ to $S_1$ transition of RhB bound to nanocrystals. The overlap integral $J(\lambda)$ may be calculated from the following equation:

$$J(\lambda) = \int_0^\infty F_D(\lambda)\varepsilon_A(\lambda)\lambda^4 d\lambda$$

where $\varepsilon_A(\lambda)$ is the extinction coefficient of RhB at wavelength $\lambda$. The FRET efficiency generally increases linearly as a function of the spectral overlap confirming that RhB excitation occurs by FRET mechanism.

Figure 2F:
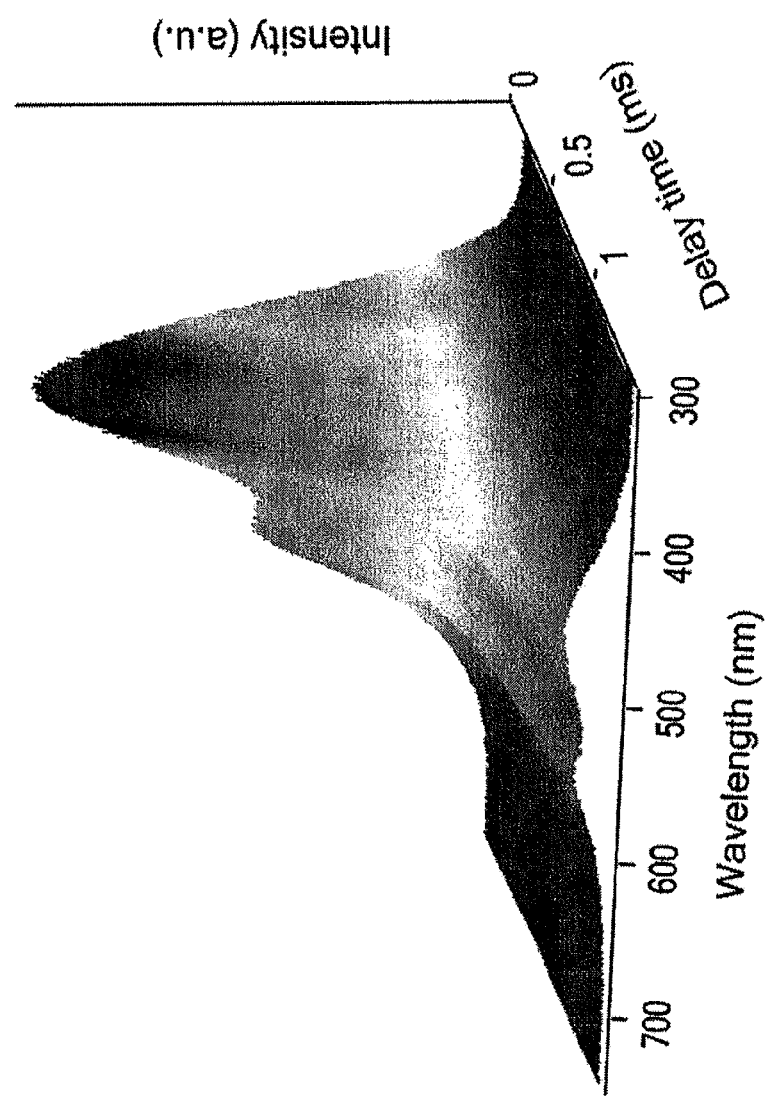

FIG. 2F shows a three-dimensional contour graph of the spectrum of colloidal $Ga_2O_3$—RhB nanocrystals as a function of the delay time after nanocrystal excitation. The afterglow of the dual emission persists for several milliseconds after excitation, which is a favorable feature of this system.

The cumulative implication of the graphs of FIGS. 2A to 2J is that the $Ga_2O_3$—RhB hybrid nanocrystal system acts as a single illumination entity, allowing for the generation of uniform and homogeneous white light with tunable chromaticity and long lifetime. Accordingly, the hybrid material produced using embodiments of methods herein is intended to act as a single illumination entity (an artificial molecular fluorophore), rather than a mixture of different components i.e. phosphors, and thus allows for a uniform and homogeneous white light emission. This development of a single illumination entity is believed to be demonstrated by the fact that, in solution, RhB has a characteristic excited state decay time of a few nanoseconds (depending on the solvent it is dissolved in), while the measured excited state decay time of RhB bound to nanocrystals is on the order of microseconds, upon nanocrystal excitation. Accordingly, the RhB decay rate has been harmonized with the decay rate of the $Ga_2O_3$. It follows from this that the lifetime of RhB bound to nanocrystals will be determined by the dynamics of nanocrystal emission, and therefore a hybrid LED made in accordance with embodiments herein functions as a single white light emitting fluorophore.

It is further noted that the broad emission spectrum of $Ga_2O_3$ nanocrystals has a strong overlap with the absorption spectrum of RhB (which is chosen by design based on its electronic structure), thereby allowing for a very efficient energy transfer (around or up to 60%) and white light conversion. This produces a more efficient approach for white light creation than by direct excitation, which is typically used in multi-component white LEDs. Furthermore, the RhB binding procedure on $Ga_2O_3$ nanocrystals, as described above, allows for precise control of the chemical binding and concentration of RhB molecules on nanocrystal surfaces, resulting in purer white light than an illusion/approximation of white light.

As noted above, the light emitting characteristics of nanocrystals are tunable. This is accomplished by tuning the DAP photoluminescence band by changing the $Ga_2O_3$ nanocrystal size and is facilitated by the ability to process the material from solution. The ability to tune DAP emission by changing nanocrystal size allows for using different attached orange or red emitting molecules and even semiconductor quantum dots (CdSe, CdTe etc.) to achieve particular characteristics, such as thermal or photo-stability and advanced functionality, in addition to white light emission.

Attachment of the secondary flourophore can be achieved directly, for example, by covalent binding to $Ga_2O_3$ nanocrystals via metal-binding functional groups. The secondary flourophore can also be bound indirectly by using a bonding agent or by encapsulation of the primary and secondary fluorophores in a common nanostructure matrix, such as a silica nanoparticle matrix. Direct binding may be suitable for, for example, organic molecules such as RhB, ATTO 565 free carboxylic acid dye, etc. Indirect binding may be suitable for, for example, quantum dots, in order to form all-inorganic LEDs.

As noted above, FRET effects enable radiative decay engineering of white LEDs having suitable characteristics for a range of applications. More specifically, one aspect of the embodiments herein involves modification of the fluorophores (luminescent molecules) by increasing or decreasing their radiative decay rates. By placing the fluorophores (an acceptor) at suitable distances from the nanocrystal (a donor), FRET can occur to modify emission from the fluorophores. Application of FRET enables the generation of blue and orange emissions (or alternatively, emissions of the 3 primary colors: red, green, blue) using two components by absorbing only a single wavelength corresponding to the primary fluorophore. For example, two types of secondary fluorophores emitting in green and red can be bound to $Ga_2O_3$ nanocrystal surfaces, allowing for the generation of primary colors and white light formation by single or reduced wavelength excitation. This contrasts with conventional methods where the use of FRET would not be practical as there may be insufficient control of light emitting characteristics and the components of the hybrid system may be difficult to design and expensive to synthesize/process. The embodiments as described herein are formed such that a single excitation energy value may be used, thus enabling radiative engineering using FRET. The ability to utilize FRET effects enables the expansion of the emission range and assists with producing a white light emitting material. Furthermore, the utilization of FRET effects has the advantage of enabling the modification of FRET conditions so as to optimize the characteristics of the white LEDs based on excitation of the donor using a predetermined excitation energy. The FRET conditions that may be varied include, for example, the distance between the donor and acceptor, the donor and acceptor spectral overlap and the emission spectra of the two components. The average distance between FRET donor and acceptor may be adjusted by adjusting the surface concentration of the secondary fluorophore or insertion of a molecular spacer. Additionally FRET conditions may be adjusted by change of spectral overlap by adjusting nanocrystal size and type of secondary fluorophore.

Figure 2G:
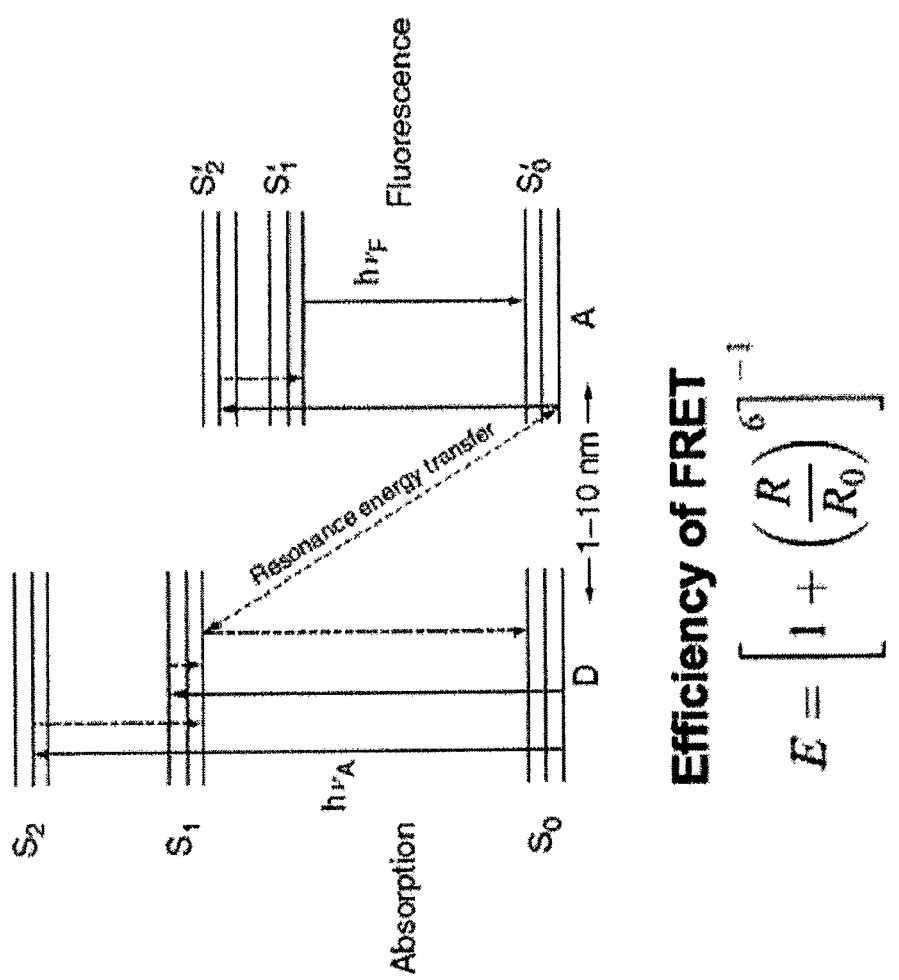
Figure 2H:
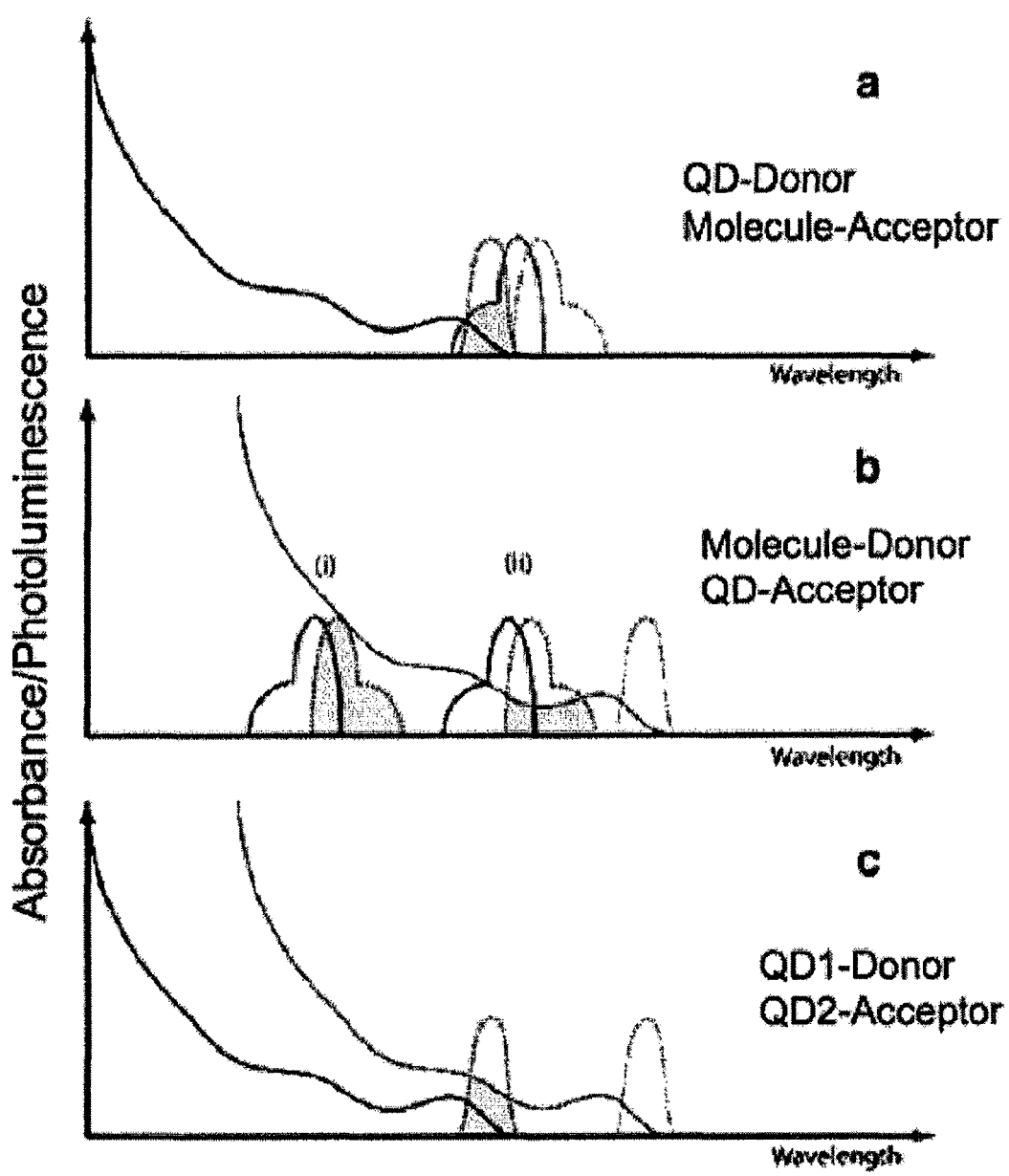
Figure 2I:
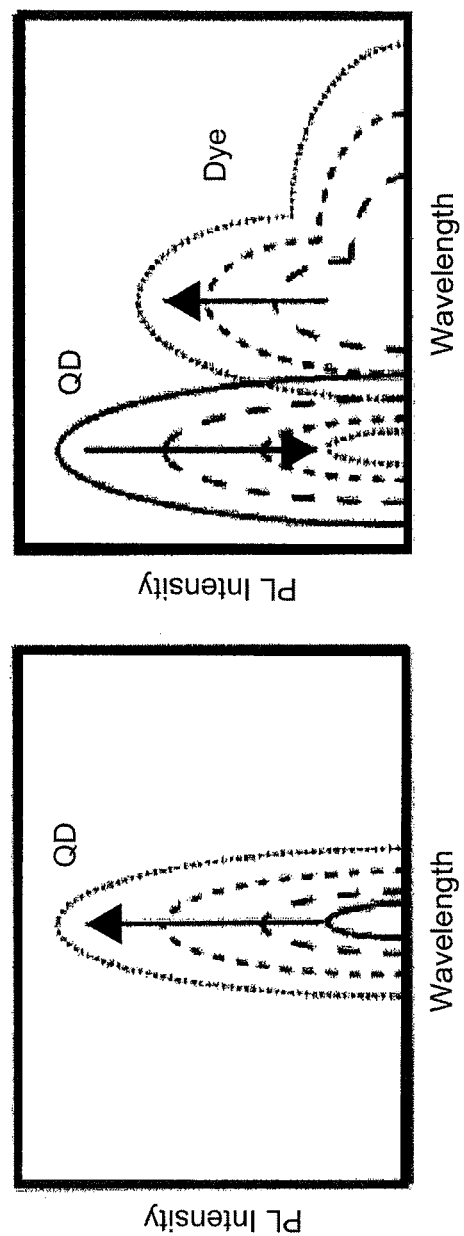
Figure 2J:
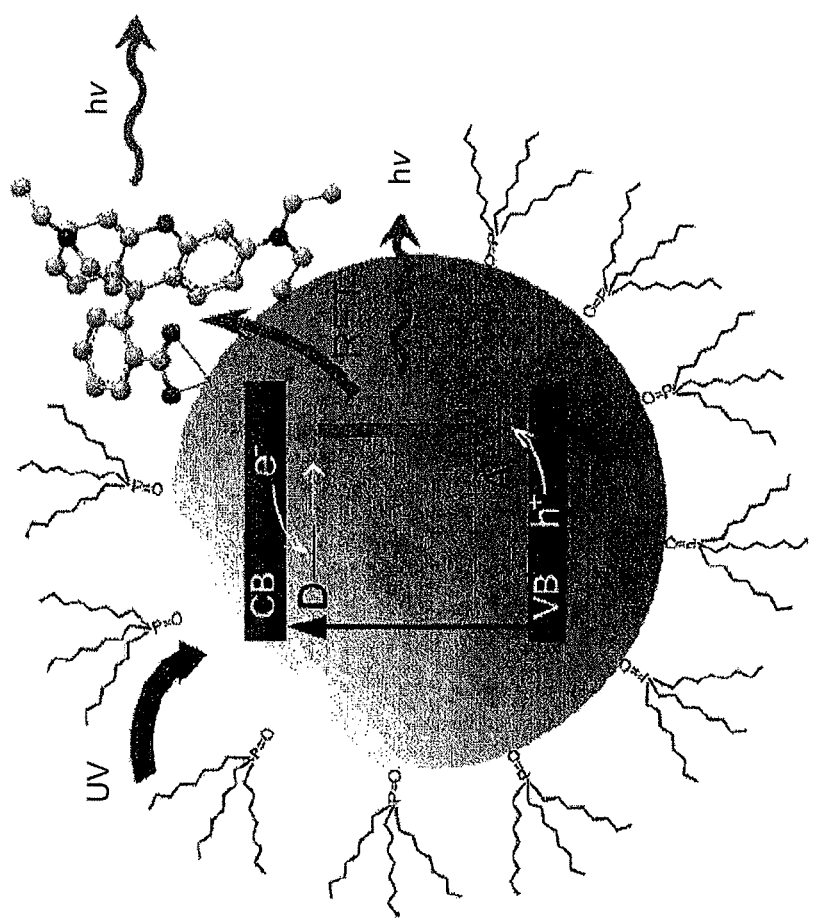

FIGS. 2G to 2J describe certain parameters of FRET relevant to its application in accordance with embodiments herein. FIG. 2G illustrates that FRET is a universal process involving a transfer of the excitation energy from an electronically excited donor species to an acceptor chromophore in the ground state. FIG. 2G illustrates that FRET generally occurs for the separation between donors and acceptors of up to 10 nm. FIG. 2H illustrates that in the weak coupling limit the energy conservation of FRET is enabled by the spectral overlap of the donor emission and acceptor absorption, where donors and acceptors can be for example both molecular species and quantum dots. FIG. 2I illustrates that this electronic interaction involves a coupling of transition moments of the donor and acceptor, which is conceptually analogous to coupled oscillators. FIG. 2J is a schematic representation of the coupling between colloidal $Ga_2O_3$ and nanocrystal surface-bound RhB by resonance energy transfer (RET). Upon $Ga_2O_3$ band gap excitation (UV) the excited donor (D)-acceptor (A) pairs are formed allowing for DAP recombination (blue hv emission) and excitation of RhB (orange hv emission) by FRET. The two simultaneously emitting components (blue and orange) can be adjusted to produce white light. FRET effects depend on distance, spectral overlap and transition dipole orientation.

Figure 3A:
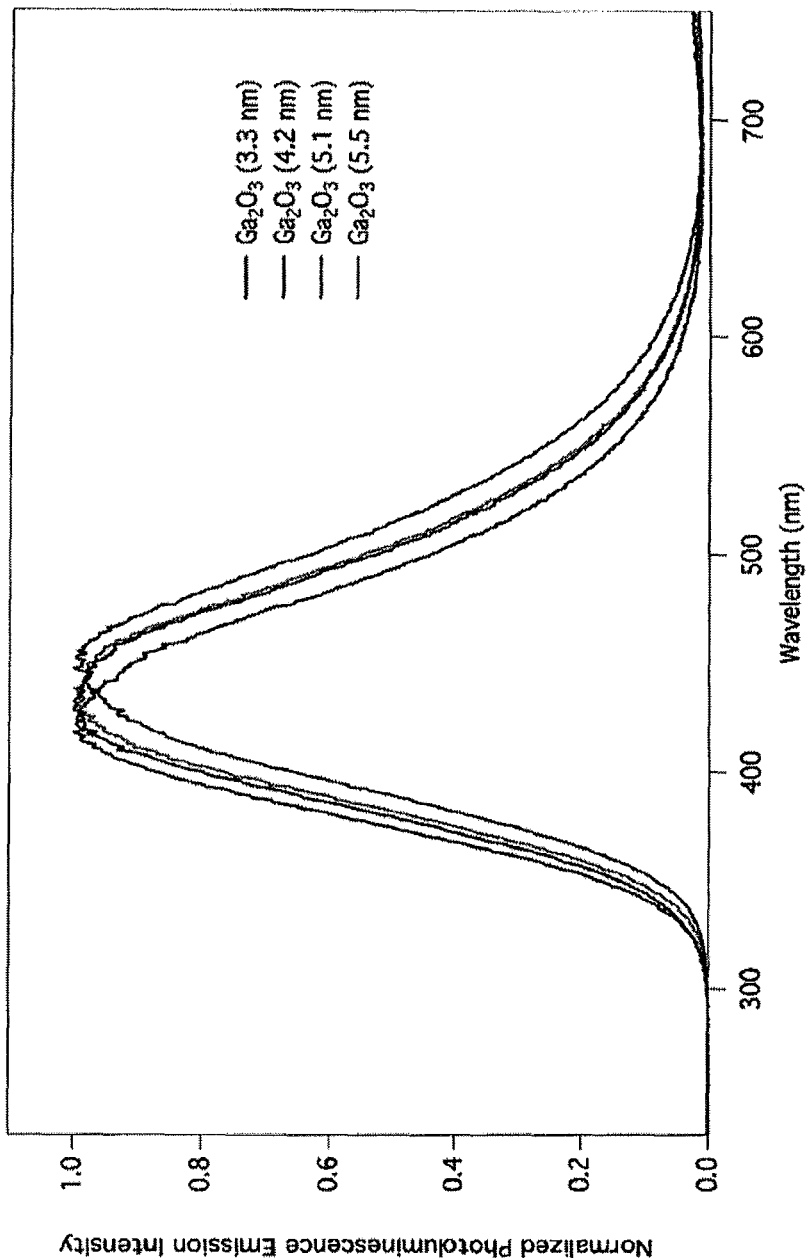
FIGS. 3A to 3C illustrate one aspect of an embodiment, specifically the photoluminescence properties of $\gamma$-$Ga_2O_3$ nanocrystals.
Figure 3B:
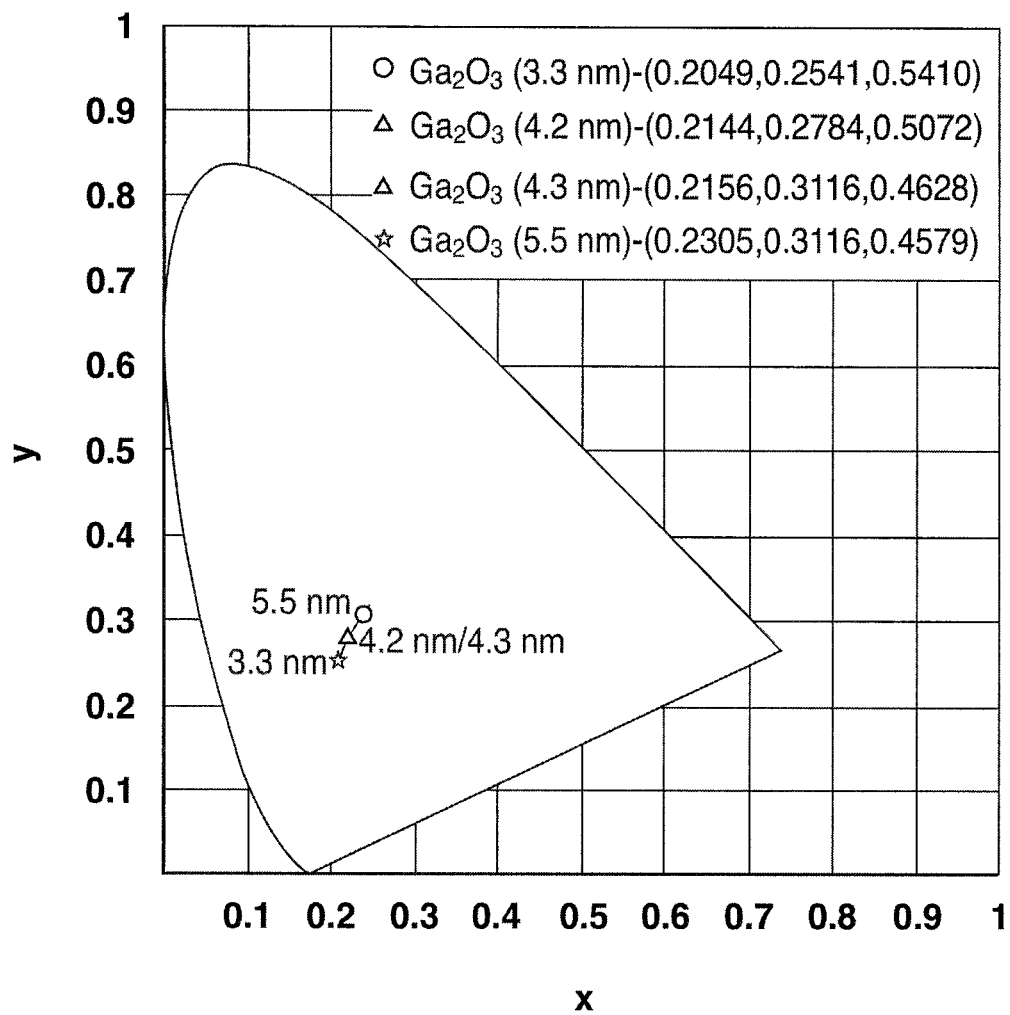

FIGS. 3A and 3B illustrate different photoluminescence properties of various sizes of a primary fluorophore, in this case $\gamma$-$Ga_2O_3$. Size-tunable $\gamma$-$Ga_2O_3$ may be synthesized by using gallium acetylacetonate as a metal precursor and oleylamine as a coordinating solvent under high temperature in an inert atmosphere. It should be understood that the photoluminescence properties of $Ga_2O_3$, for example, are associated with inherent internal defects. These defects are tunable using a number of different synthesis conditions, such as, temperature, aerobic/anaerobic environments, and the like. For example, size variance of between 3.3 nm (deep blue) to 5.5 nm (turquoise) may be achieved by selecting different synthesis temperatures. A higher temperature results in larger particles, and therefore shifts the emission range toward red because of the lowering of the defect concentration and separation with the increase in particle size.

Figure 3C:
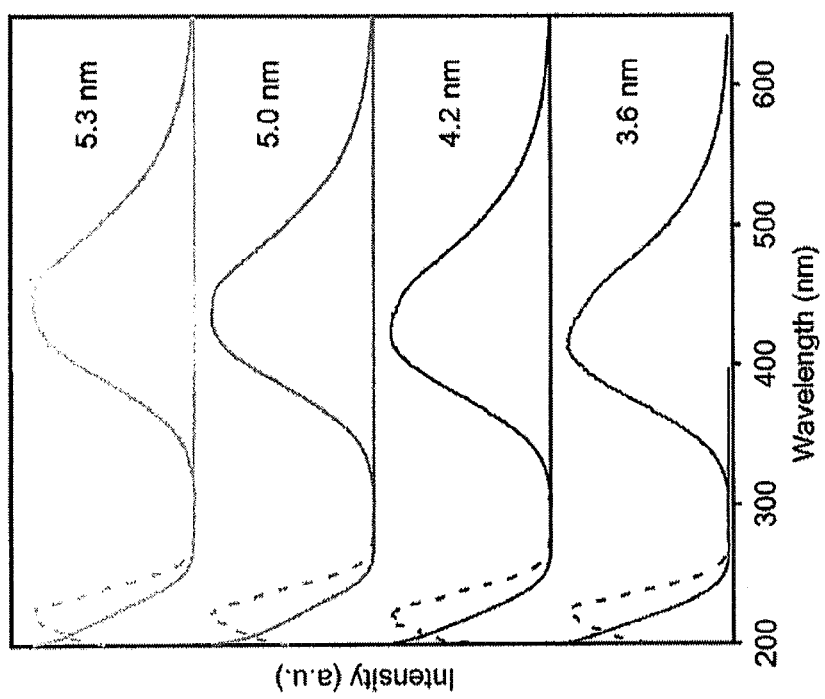

FIG. 3C illustrates the absorption and photoluminescence spectra of colloidal $Ga_2O_3$ nanocrystals having different sizes. The corresponding excitation spectra are shown with dashed lines. The emission spectra were collected upon excitation at 230 nm, while excitation spectra were recorded by monitoring photoluminescence at the maximum of the photoluminescence band for a given nanocrystal sample. The absorption and excitation spectra are insensitive to the change in nanocrystal size, indicating the absence of quantum confinement in the given size regime. The photoluminescence spectra red-shift with increasing nanocrystal size ranges from 415 nm (for 3.6 nm diameter nanocrystals) to 445 nm (for 5.3 nm diameter nanocrystals). This shift predominantly arises from an increase in the average donor-acceptor separation with increasing nanocrystal size. An increased separation between donors and acceptors results in smaller Coulomb interaction contribution to the photoluminescence energy, and therefore a shift of the donor-acceptor pair emission band to lower energies.

Figure 4A:
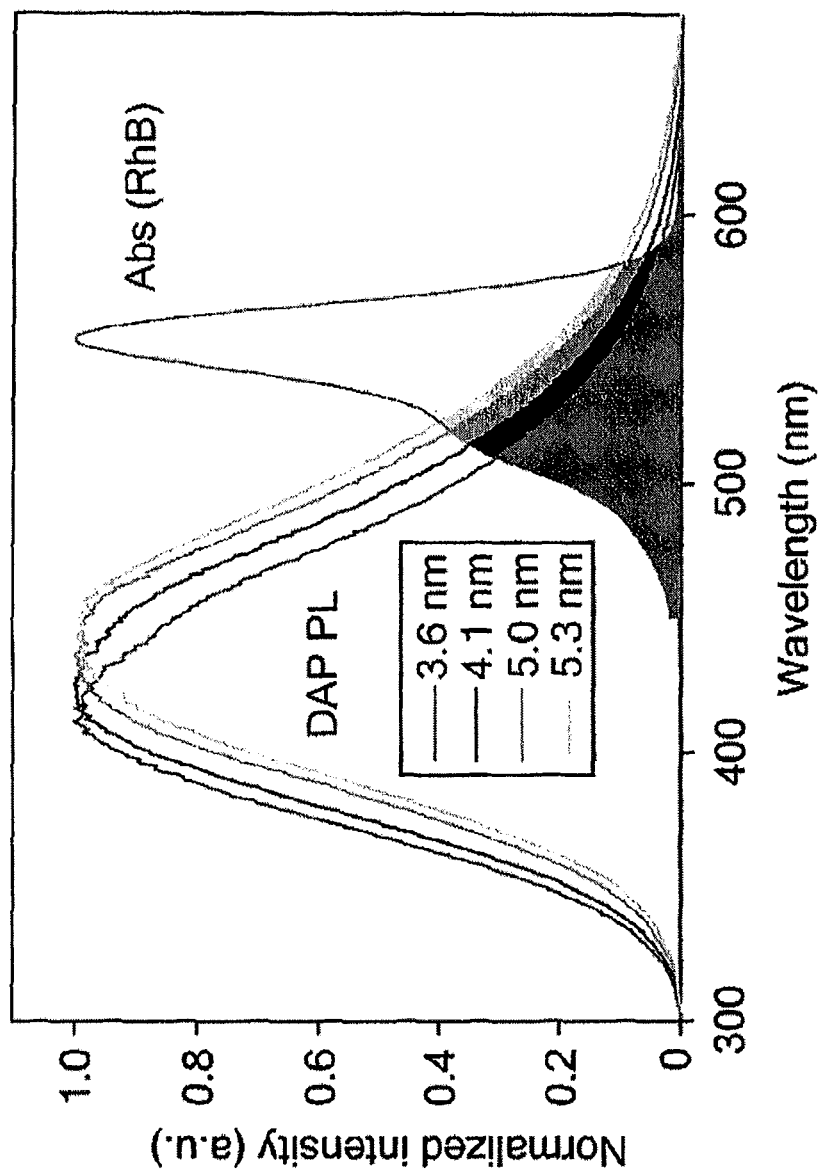
FIGS. 4A and 4B illustrate the utilization efficiency of FRET, according to an embodiment.
Figure 4B:
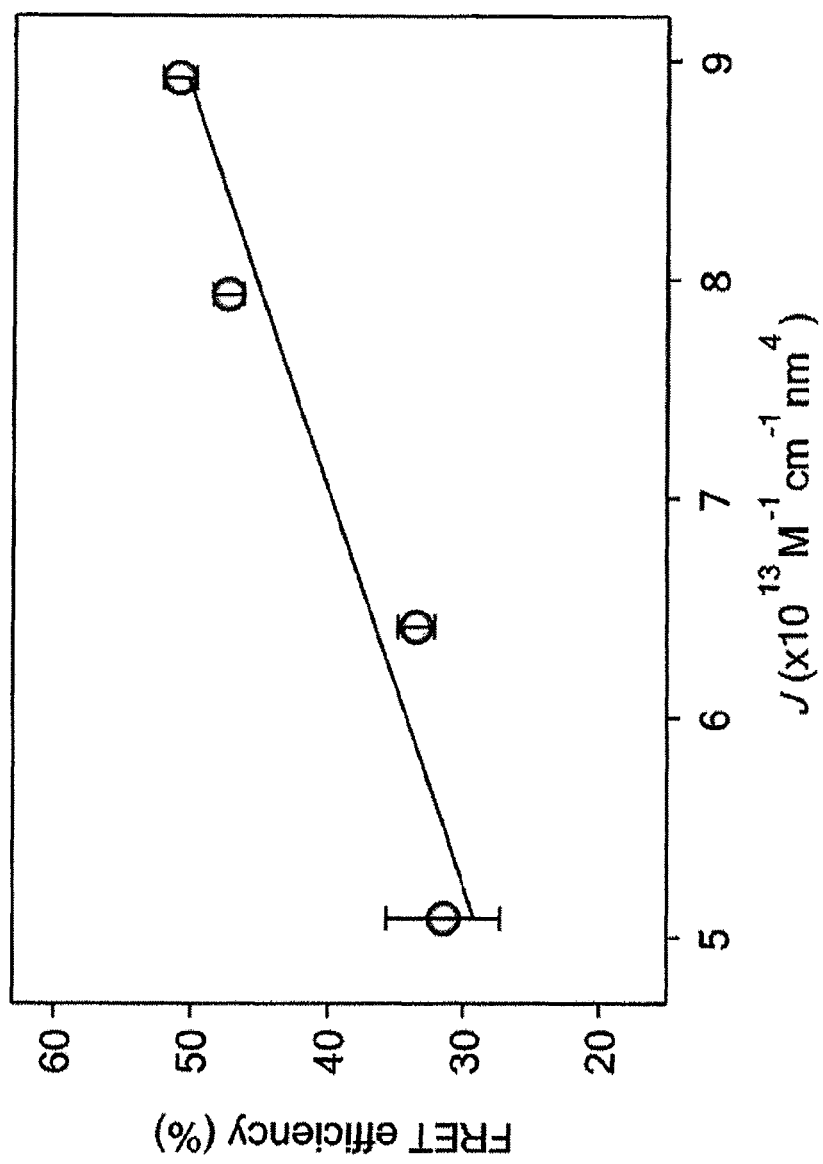

FIGS. 4A and 4B are graphs which illustrate the FRET efficiency control. More specifically, FIG. 4B indicates that size-tunability enables FRET efficiency of between, approximately 30% to 50%, depending on the nanocrystal size. The same concentration of RhB is obtained for different sizes of $Ga_2O_3$, which in turn provides desirable energy transfer efficiency because of the enhancement of RhB emission and quenching of the $Ga_2O_3$.

Figure 5:
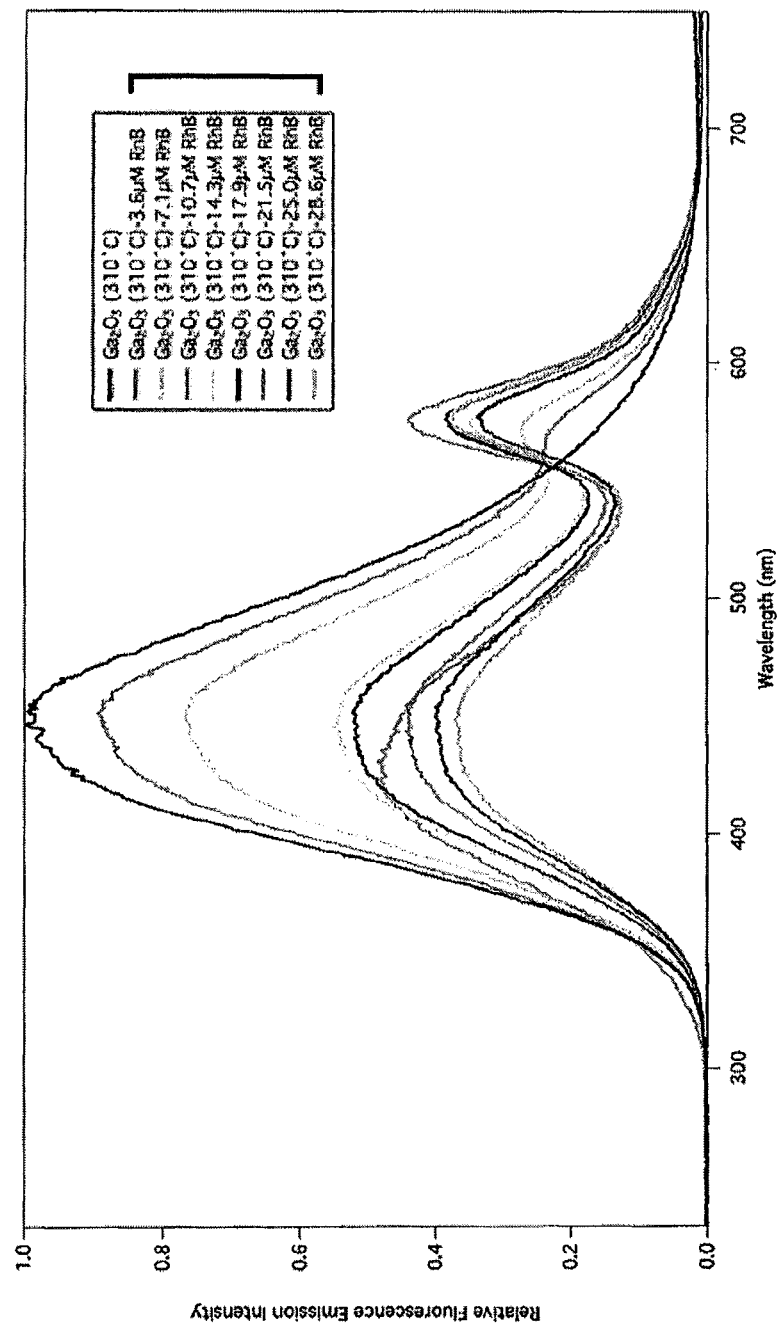
FIG. 5 illustrates the variability of photoluminescence characteristics of hybrid nanocomposite by altering the concentration of secondary fluorophore on nanocrystals, according to an embodiment.

FIG. 5 illustrates the variability of photoluminescence characteristics by altering the concentration of RhB on the nanocrystals, in this case $Ga_2O_3$. The adsorption of the luminescent molecules on nanocrystal surfaces may be accomplished for example by applying certain techniques. The dye molecule, RhB, may be covalently bound to the surface of $Ga_2O_3$ nanoparticles. The nanoparticles may be dispersed in, for example, hexane whereas the fluorophore RhB may be dissolved in water. The two components interact at the boundary of the two solvents, allowing the RhB to phase transfer into the hexane phase when it is bound to the surface of the nanoparticles. This technique is suitable for manufacturing white LEDs, or generally, to tune the emission color of the LEDs and may also work for various other lighting applications. It should be understood however that other techniques may be used to enable the adsorption/binding of the luminescent species in relation to the nanocrystal surfaces. Additionally, by varying the concentration of RhB in the water phase, the amount of RhB bound to the surface of the nanoparticle may be varied, and thus the concentration of RhB on the nanoparticle surface.

During the energy transfer process, the excitation energy in the donor ($Ga_2O_3$ nanocrystals for example) will be transferred non-radiatively to its neighbouring acceptors without any emission during the transfer process. Hence, as more acceptors are in close proximity to the donor, the likelihood for a non-radiative energy transfer process will increase, leading to a lowering of the nanoparticles photoluminescence emission intensity. On the other hand, the emission intensity of the acceptor will be enhanced based on the energy that is transferred from the donor that is located within a specific distance of up to about 10 nm.

In order to determine the ideal size of nanoparticles (for example, $Ga_2O_3$) and the ratio between nanoparticles and fluorophore (for example, RhB), different concentrations of fluorophore may be bound on the surface of the nanoparticles. Subsequently, the CIE chromaticity coordinates of different concentration of RhB, but with a fixed amount of $Ga_2O_3$, may be calculated. For example, FIG. 5 illustrates the photoluminescence spectra of colloidal $Ga_2O_3$ nanocrystals-RhB hybrid nanomaterial with different concentrations of RhB. The table in FIG. 5 illustrates the CIE coordinates of $Ga_2O_3$ nanocrystals-RhB corresponding to white light emission. The CIE coordinates of each sample is determined based on the photoluminescence emission spectrum of individual sample using the color matching functions. The color matching functions are based on the spectral power distribution and the emission intensity, both as a function of wavelength. It will be understood that a table such as that in FIG. 5 may be used as a "look-up" table for determining the desired concentration of the fluorophor.

Figure 6B:
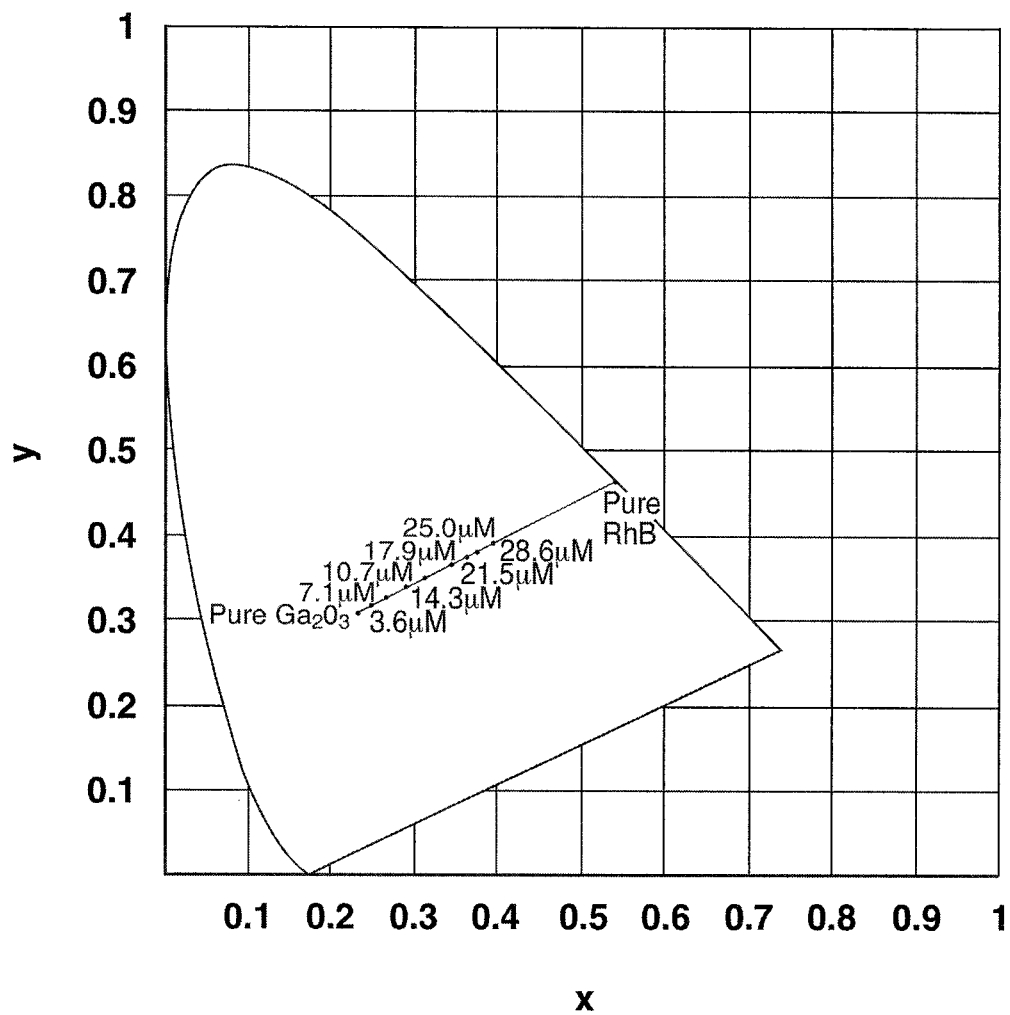

As a further example, FIGS. 6A and 6B illustrate CIE coordinates obtained from the photoluminescence spectra for $Ga_2O_3$ (approximately 5.6 nm)—RhB.

Figure 7:
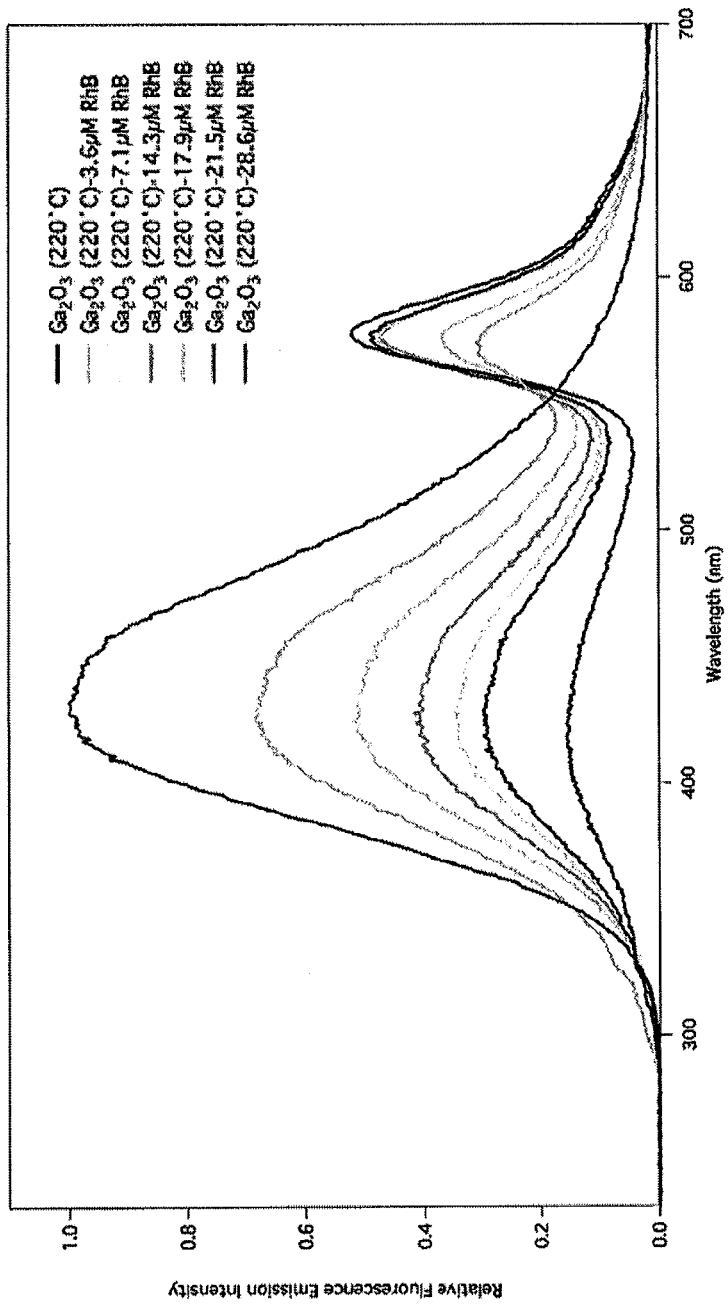
FIG. 7 illustrates the photoluminescence spectra for $Ga_2O_3$ (approximately 4.4 nm)—RhB for different RhB concentrations, according to an embodiment.

FIG. 7 illustrates the photoluminescence spectra for $Ga_2O_3$ (approximately 4.4 nm)—RhB for different RhB concentrations.

Figure 8B:
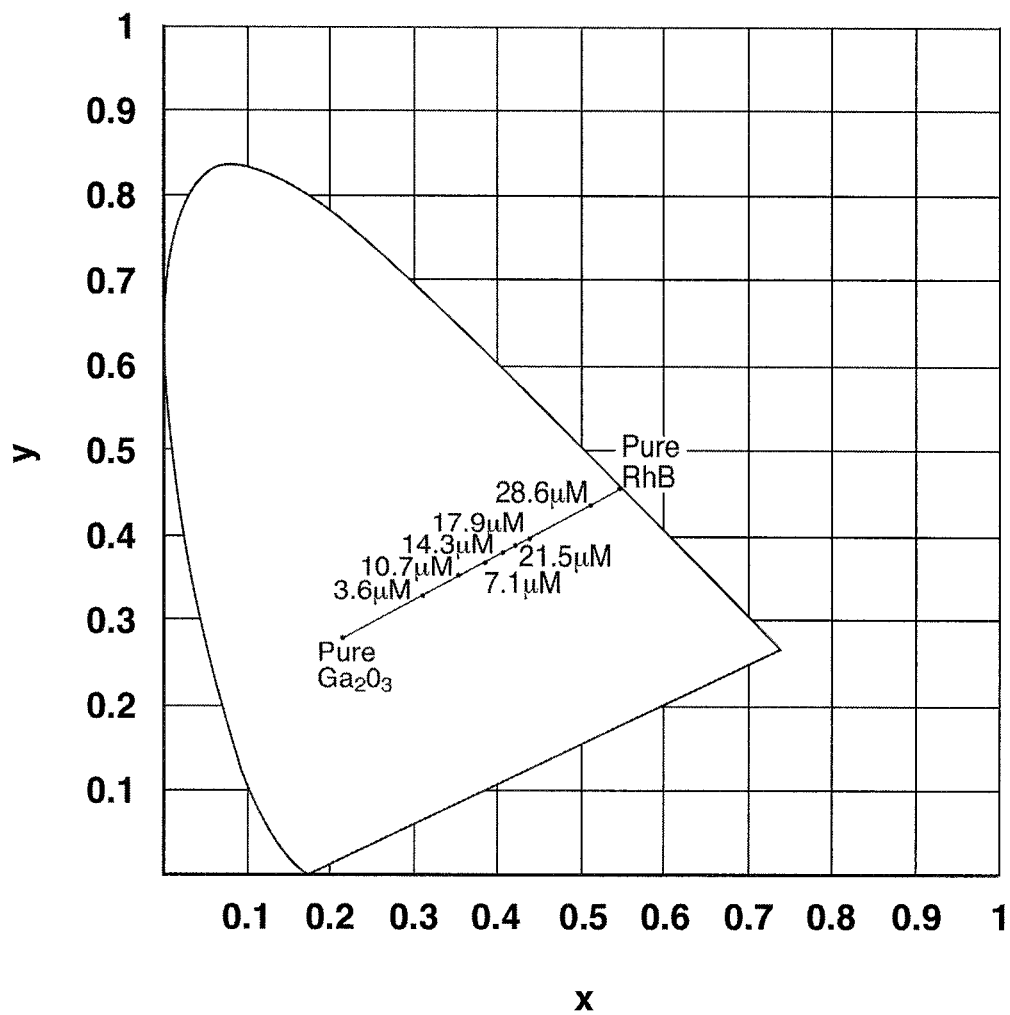

FIGS. 8A and 8B map $Ga_2O_3$ (approximately 4.4 nm)—RhB photoluminescence using a further CIE chromaticity diagram.

Figure 9:
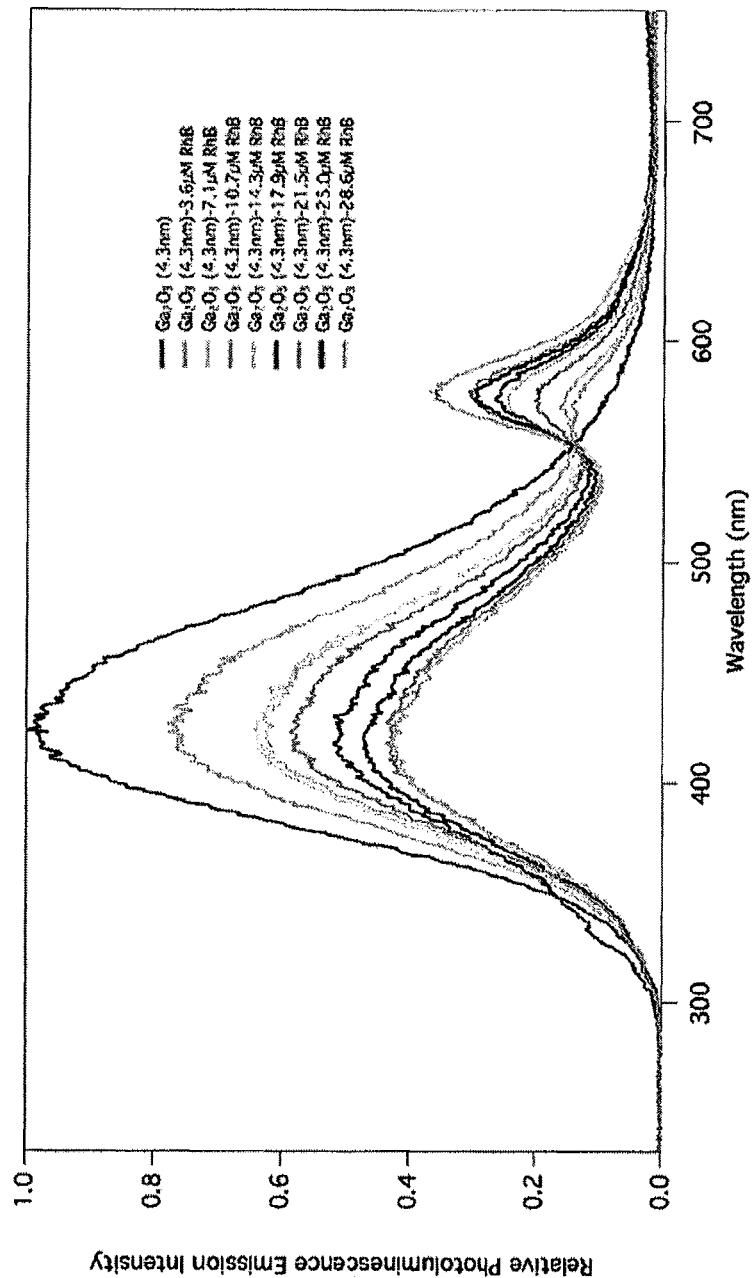
FIG. 9 illustrates the photoluminescence spectra for $Ga_2O_3$ (approximately 4.3 nm)—RhB for different RhB concentrations, according to an embodiment.

FIG. 9 illustrates the photoluminescence spectra for $Ga_2O_3$ (approximately 4.3 nm)—RhB for different RhB concentrations.

Figure 10B:
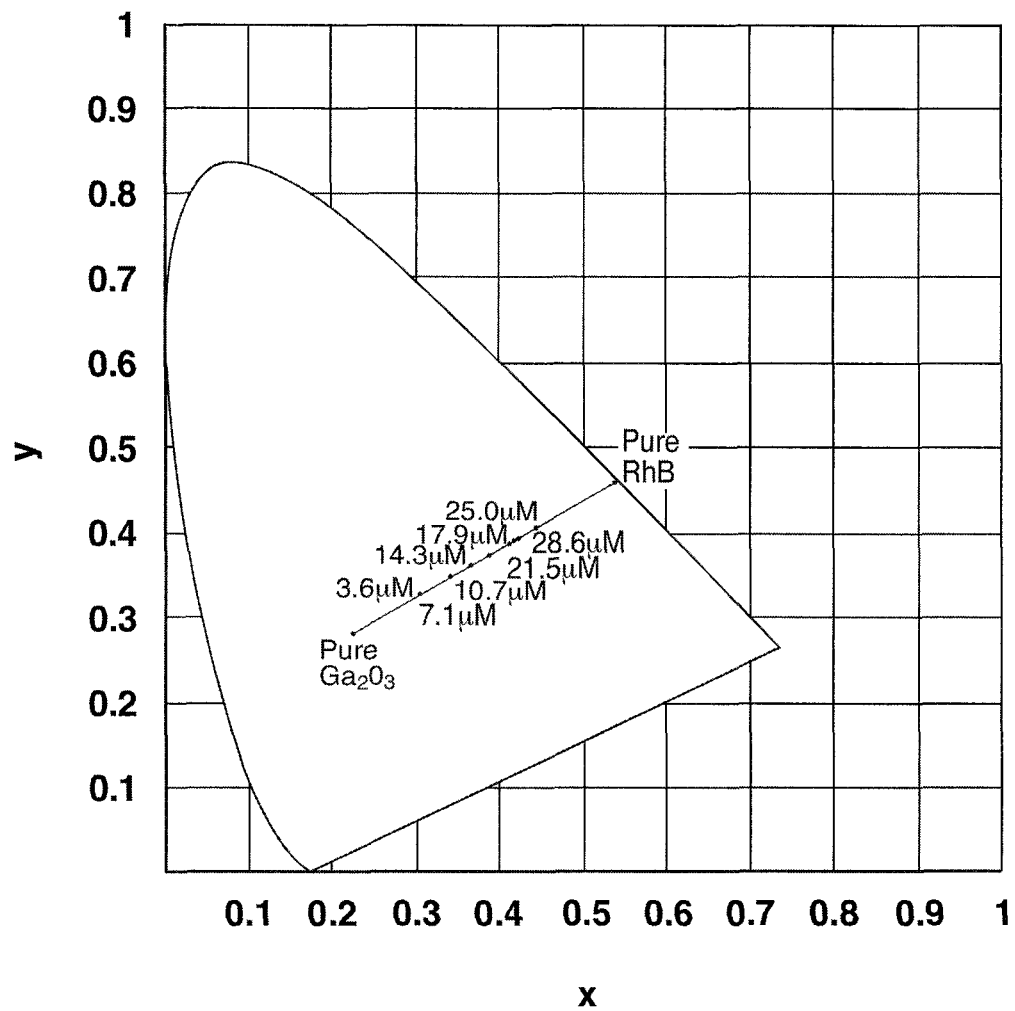

FIGS. 10A and 10B map $Ga_2O_3$ (approximately 4.3 nm)—RhB photoluminescence using a further CIE chromaticity diagram.

Figure 11:
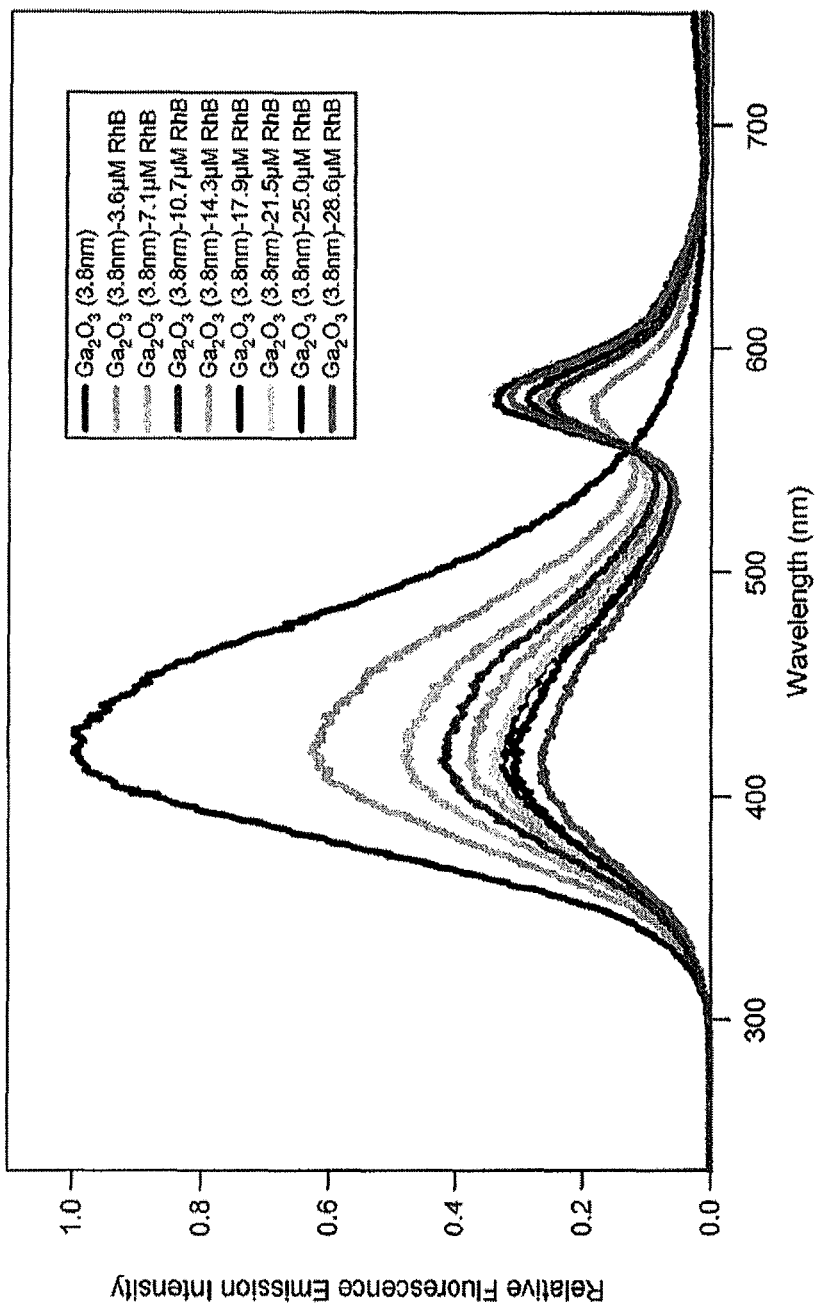
FIG. 11 illustrates the photoluminescence spectra for $Ga_2O_3$ (approximately 3.8 nm)—RhB for different RhB concentrations, according to an embodiment.

FIG. 11 illustrates the photoluminescence spectra for $Ga_2O_3$ (approximately 3.8 nm)—RhB for different RhB concentrations.

Figure 12B:
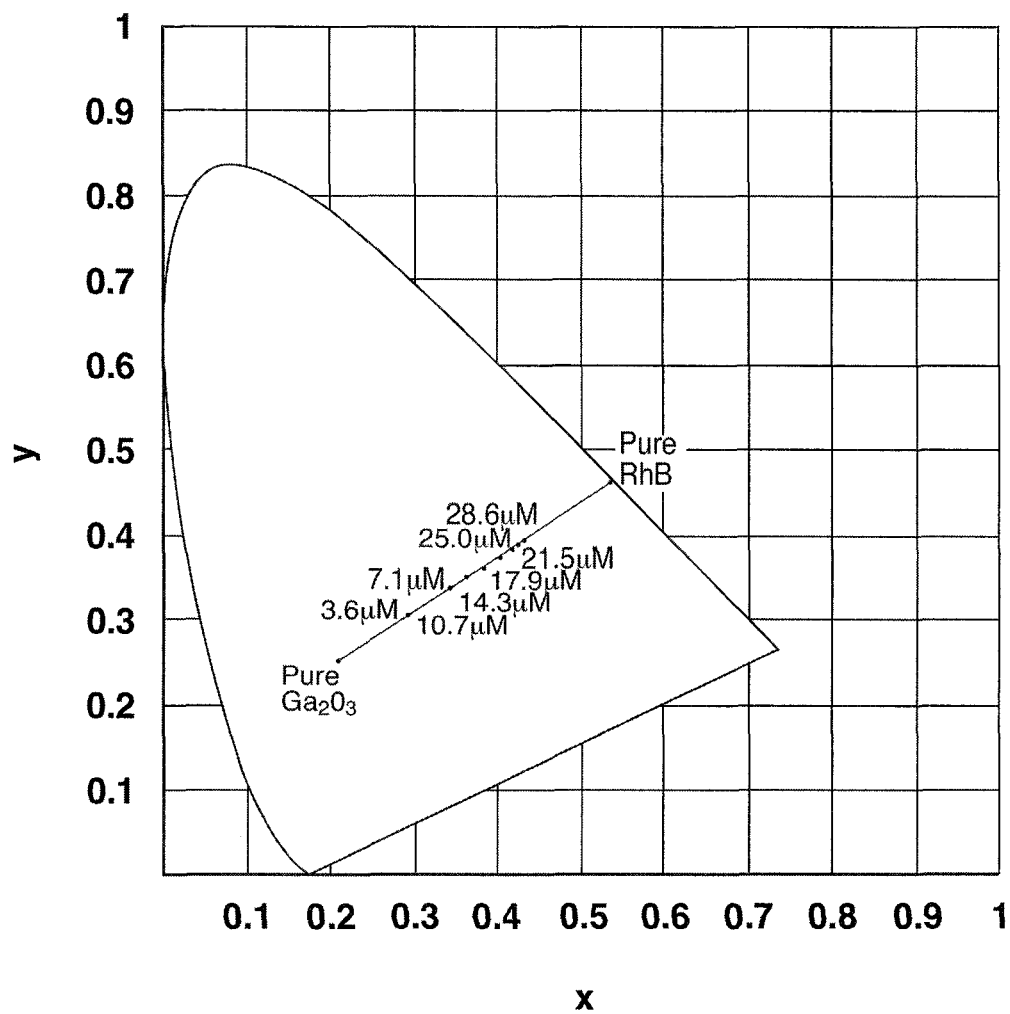
Figure 13A:
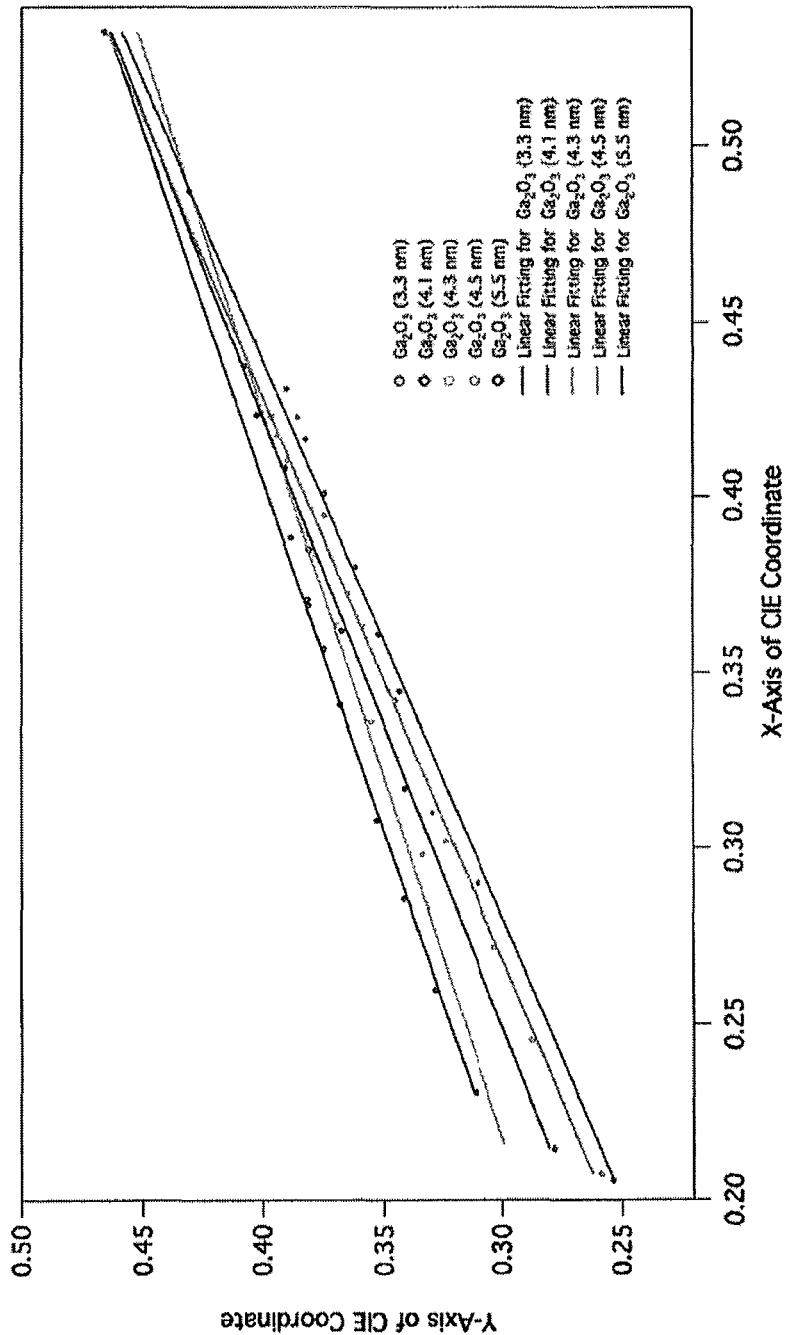
FIG. 13A illustrates a modeling analysis of one example of a size of $Ga_2O_3$ nanoparticles that can achieve "pure" white light, according to an embodiment.
Figure 13B:
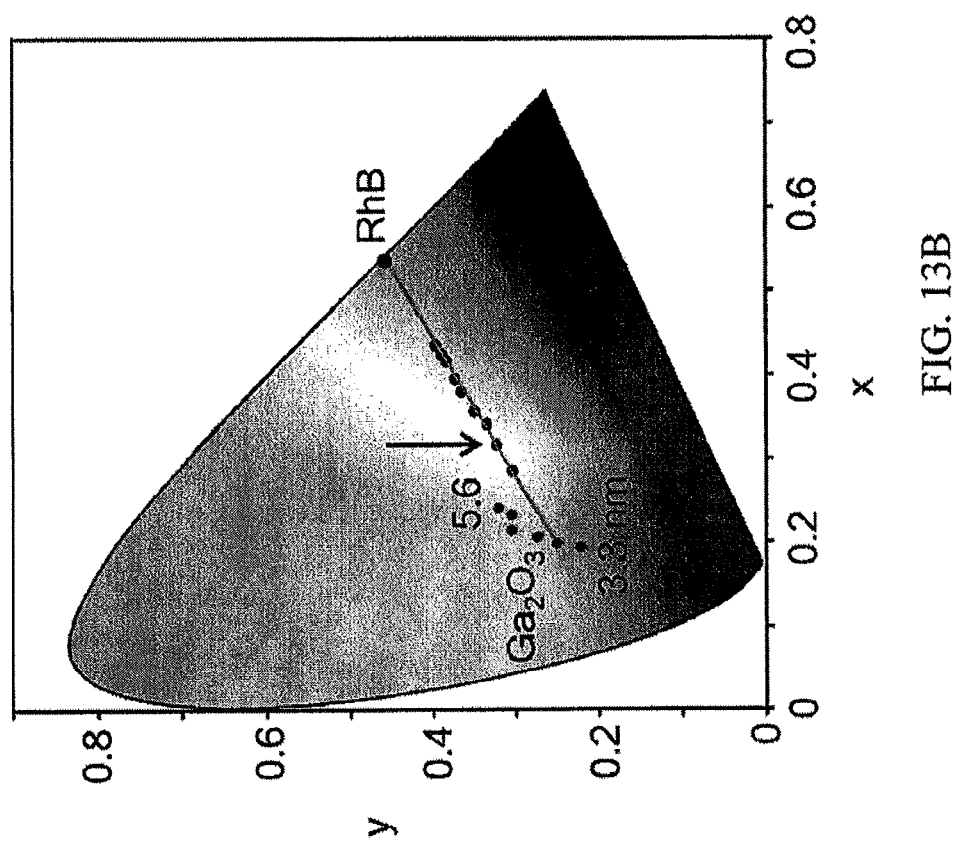
FIG. 13B illustrates a CIE 1931 color space chromaticity diagram indicating various color points, with pure white light indicated, according to an embodiment.
Figure 14A:
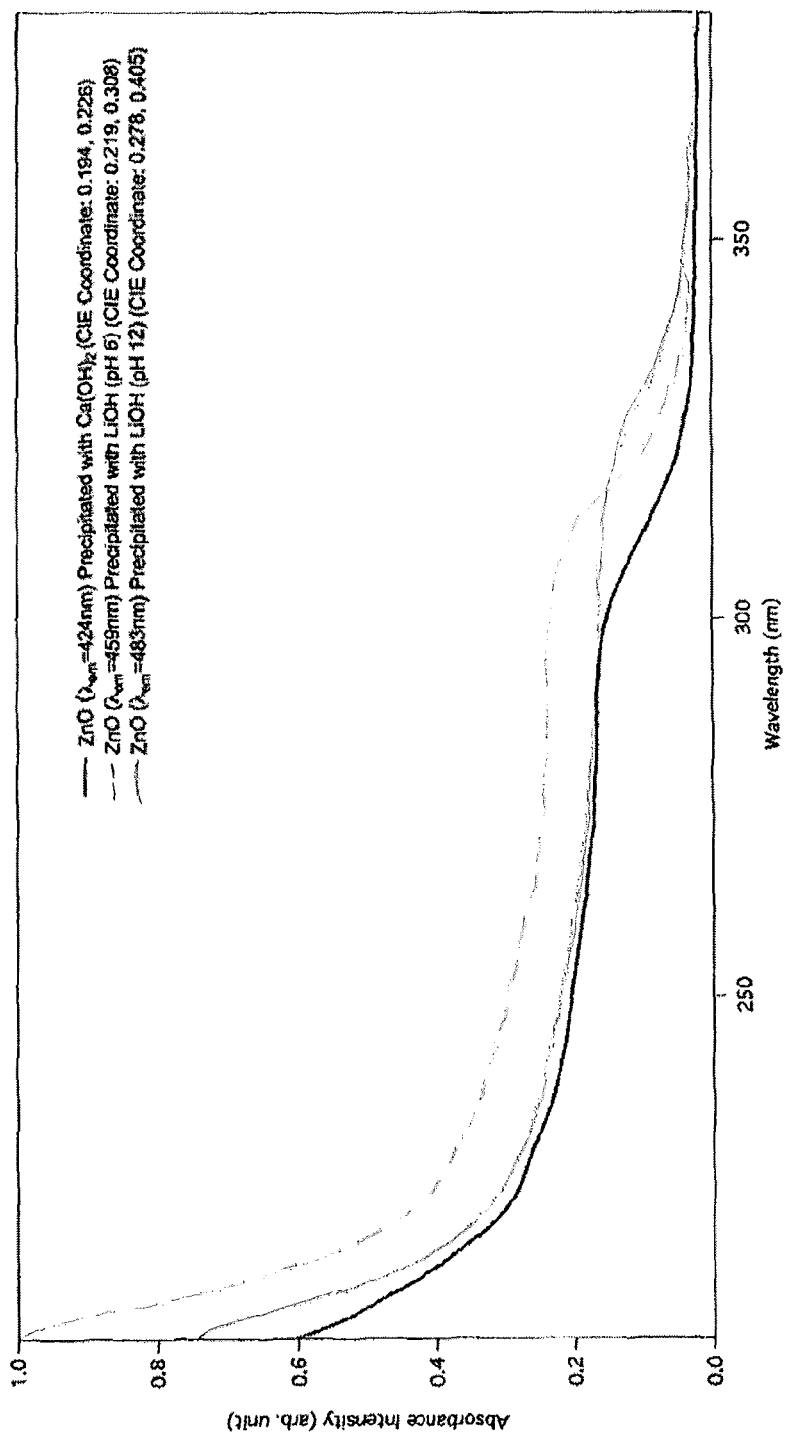
FIGS. 14A to 24 illustrate the parameters and characteristics of using a zinc oxide (ZnO) nanocrystal instead of using a Ga2O3 nanocrystal, according to an embodiment.
Figure 14B:
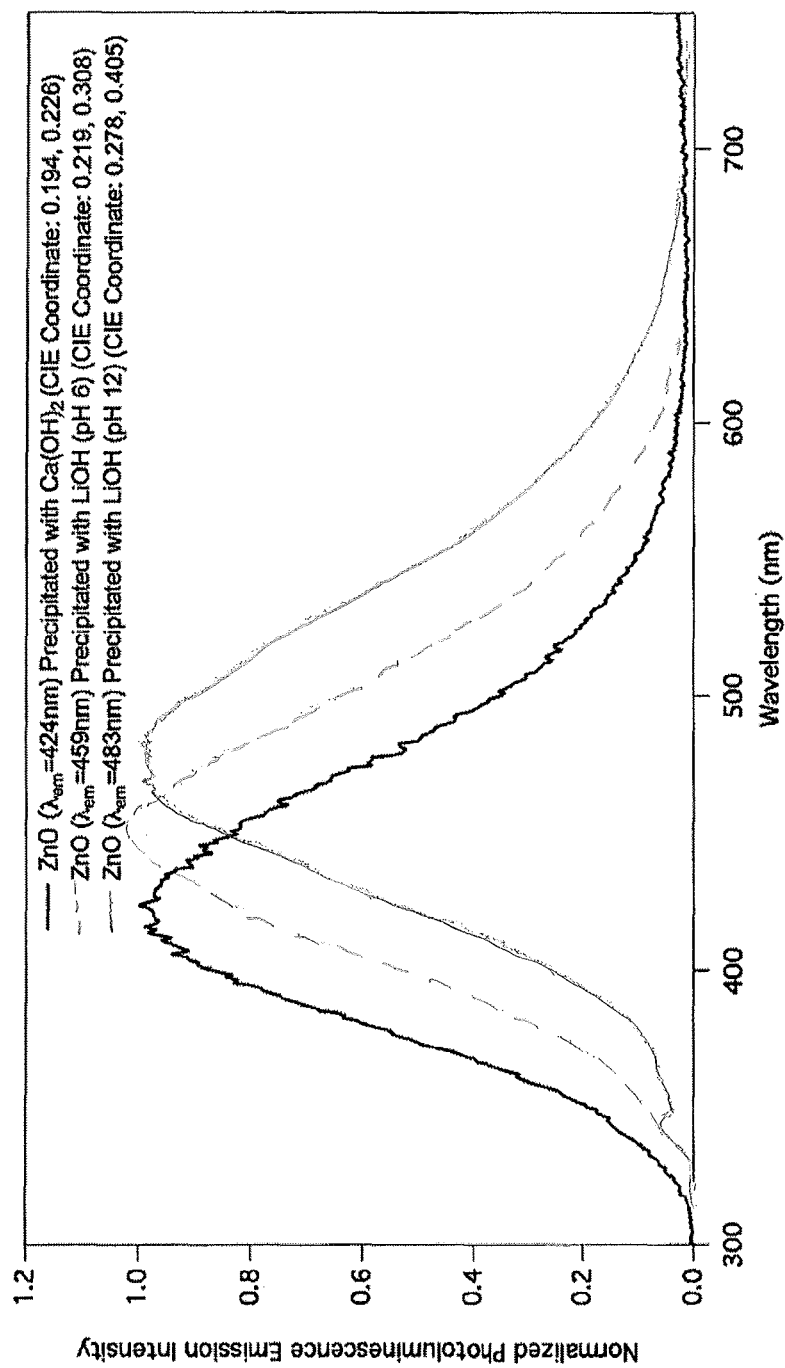
Figure 14C:
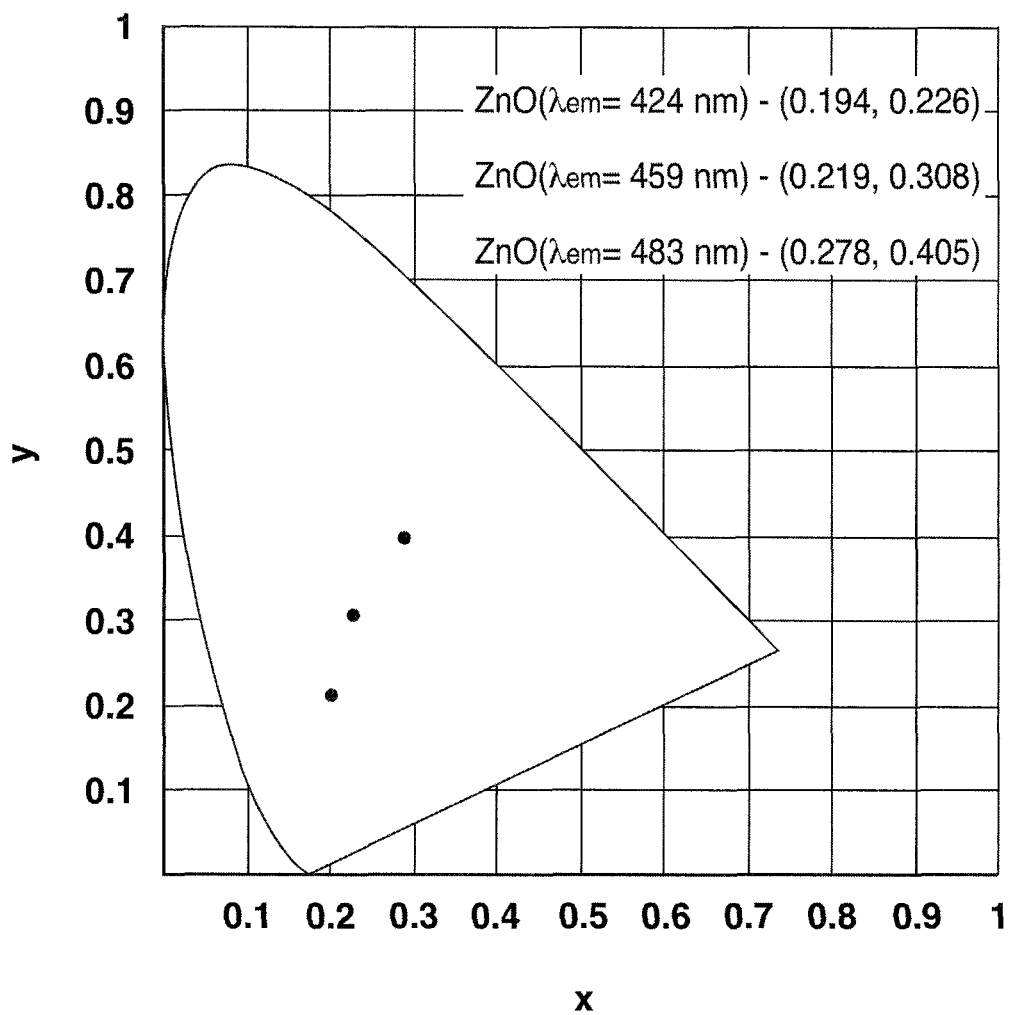
Figure 15:
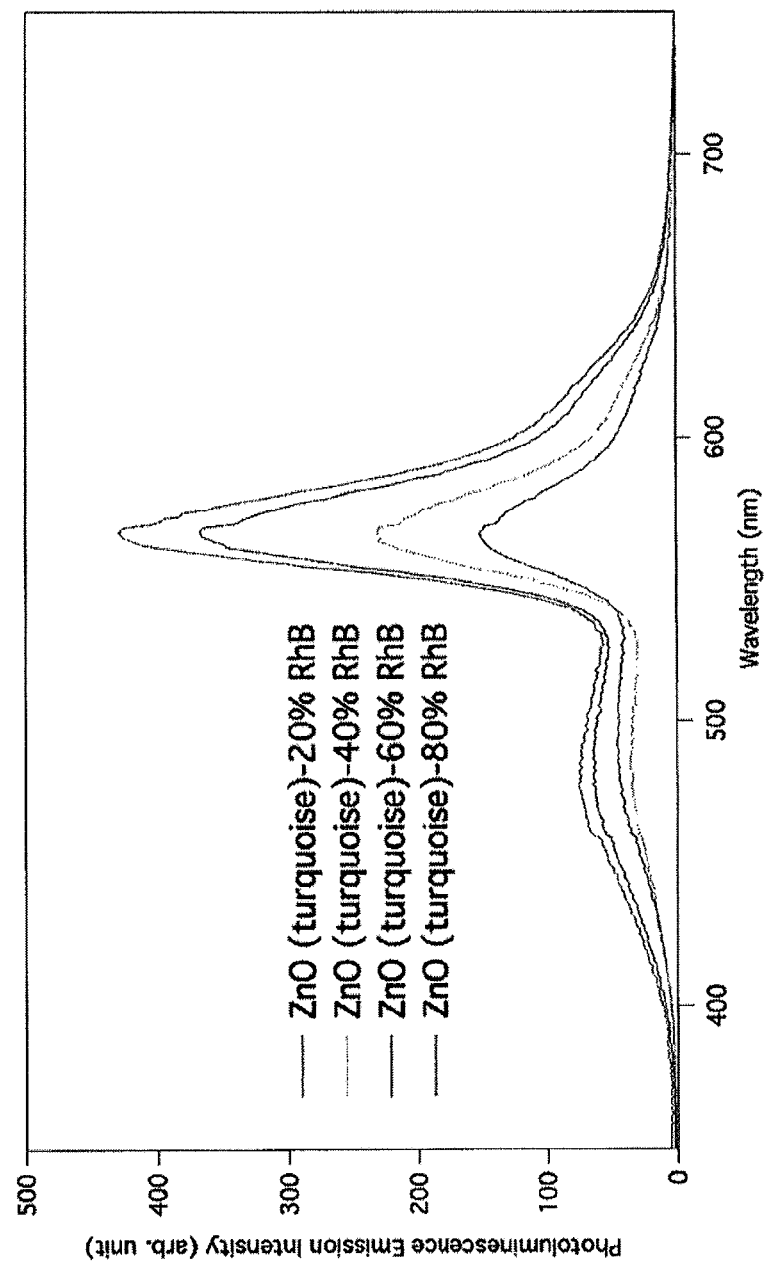
Figure 16A:
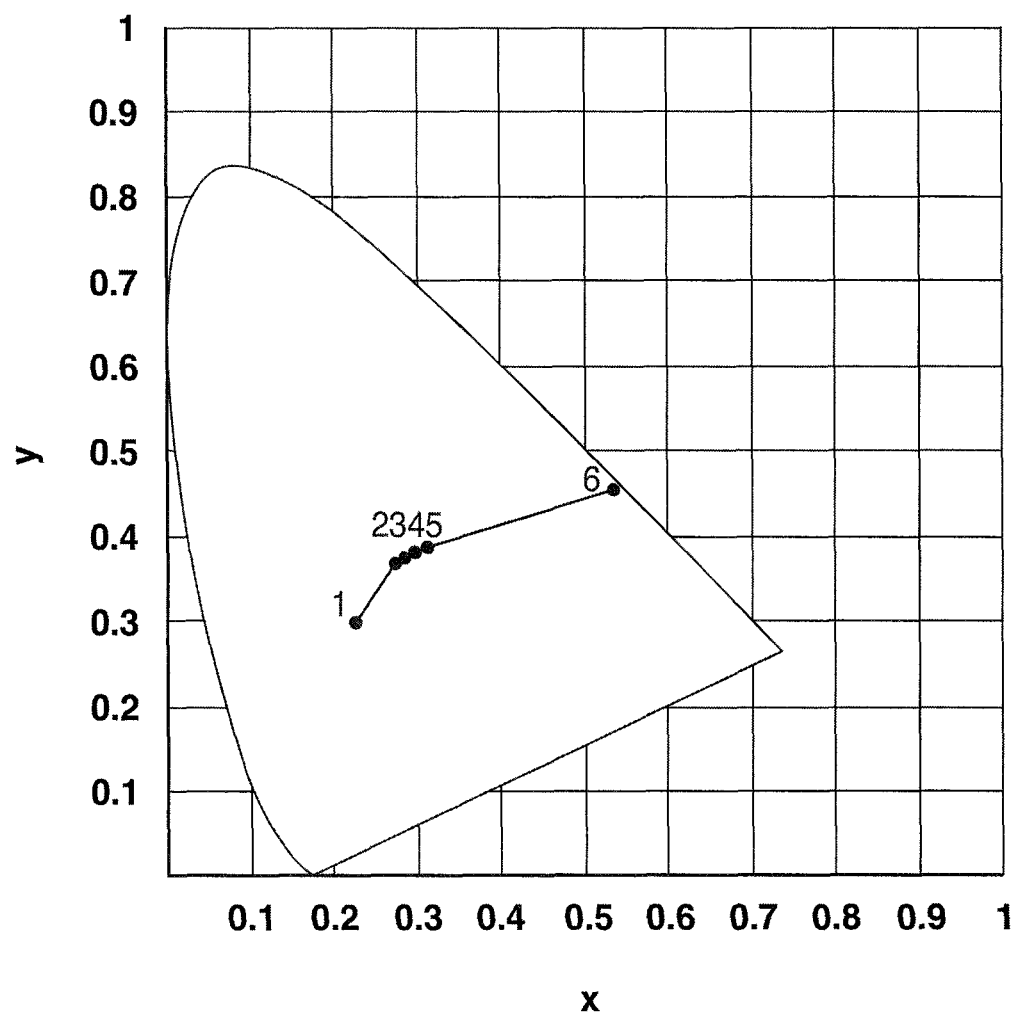
Figure 17A:
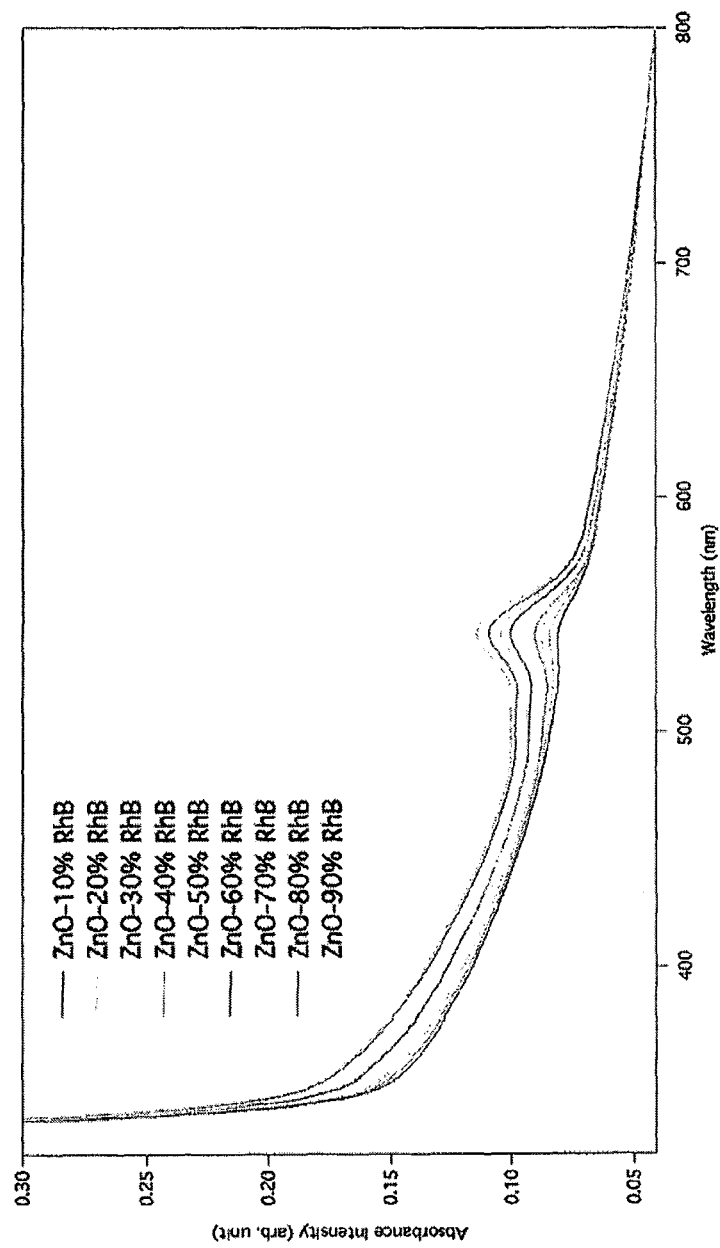
Figure 17B:
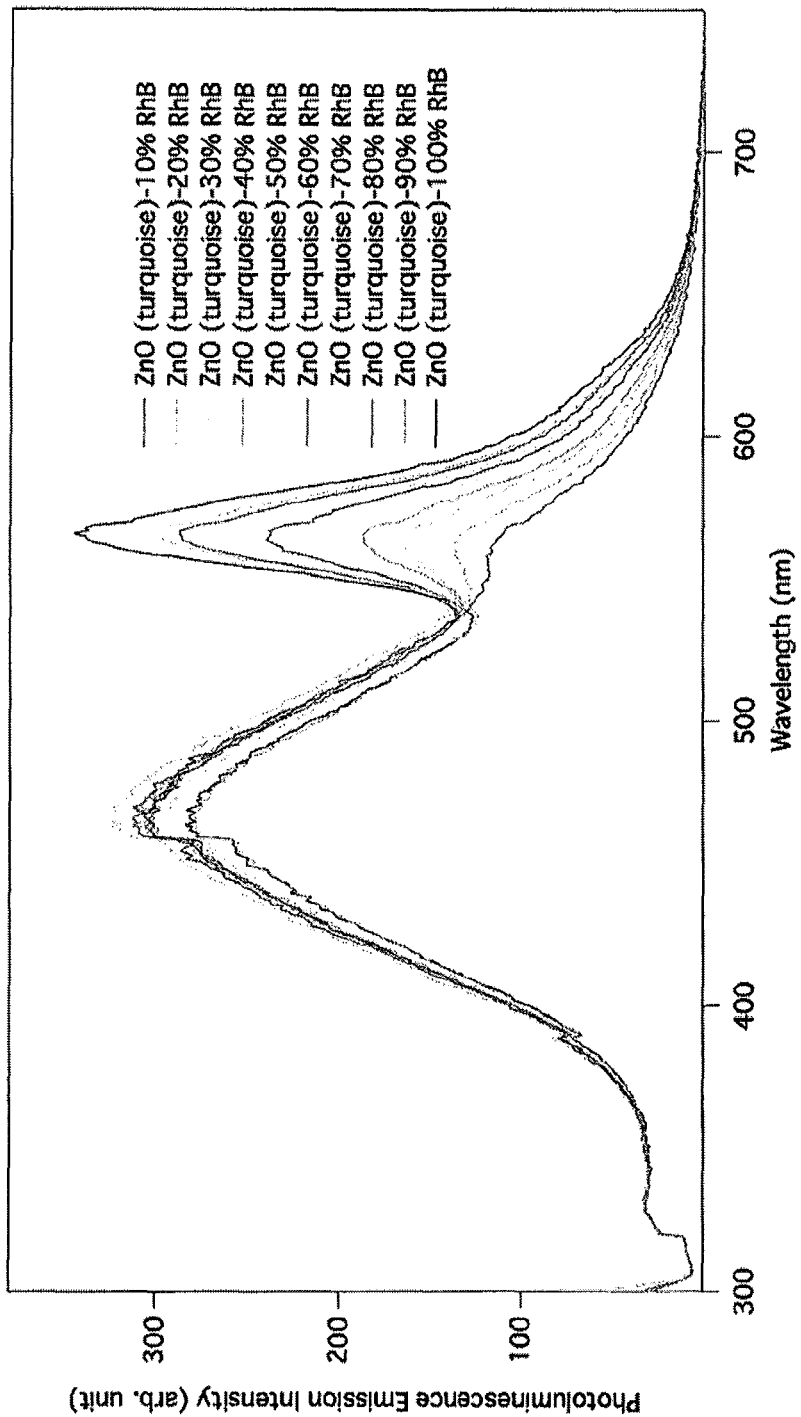
Figure 18B:
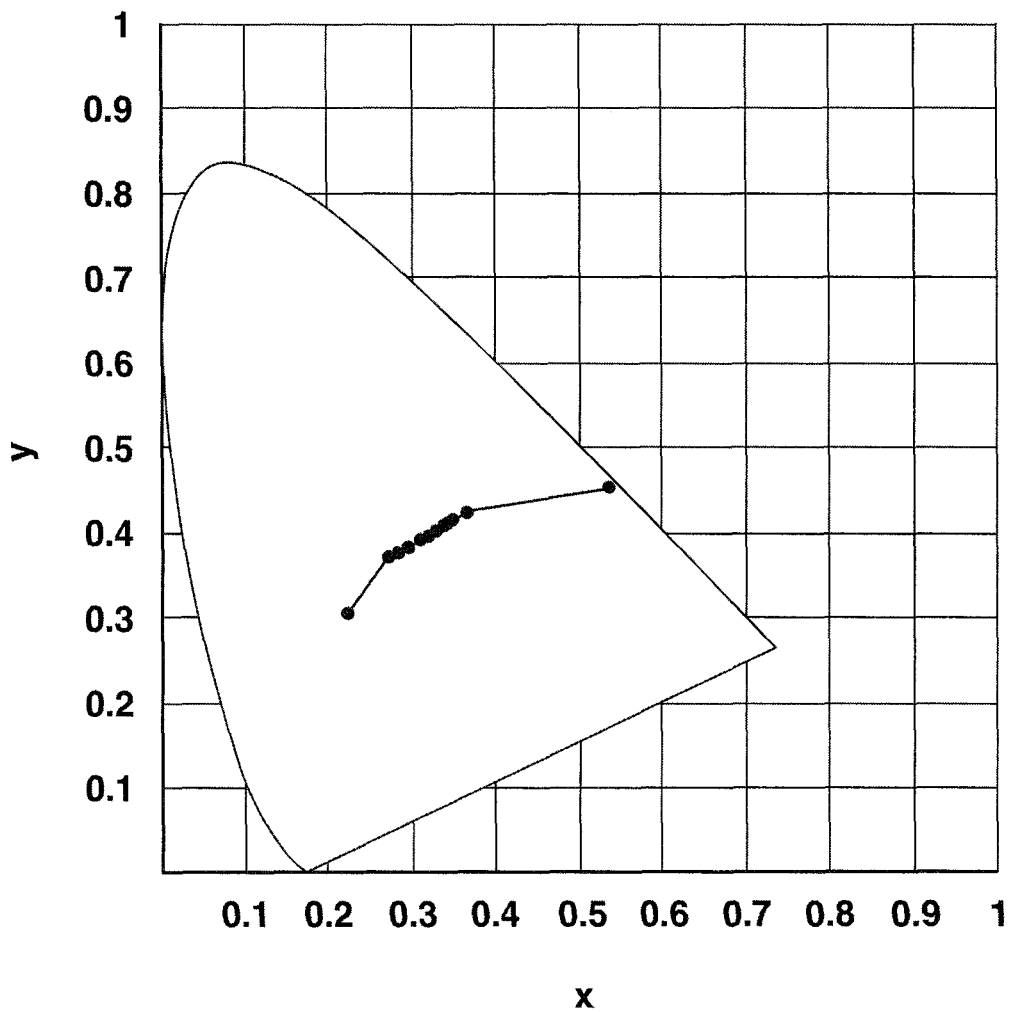

FIGS. 12A and 12B depict CIE coordinate analyses of $Ga_2O_3$—RhB nanocomposites to achieve white light emissions, with different sizes of $Ga_2O_3$, and with different amounts of RhB bound on the surface of the NCs. Using a linear function for modeling analysis shown in FIGS. 13A and 13B, one example of the size of $Ga_2O_3$ NCs that can achieve "pure" white light is 3.8 nm. FIG. 13B shows a CIE 1931 color space chromaticity diagram indicating various color points. With increasing average number of RhB molecules per $Ga_2O_3$ nanocrystal, the perceived emission color gradually transforms from deep blue to orange-red. This color transformation can be rationally controlled with high precision and reproducibility over a wide color range. In the example of FIG. 13B, the generation of pure white light is represented by color coordinates (0.333, 0.338), using 5.73 µM RhB solution and 3.6 nm $Ga_2O_3$ nanocrystals (indicated with an arrow).

The quantum yield reproducibly achieved in $Ga_2O_3$ nanocrystals may be up to 40%, which is believed to be comparable with conventional high performance commercial blue LEDs.

It should be understood that other photoluminescent materials may be used when applying the techniques described herein. Some examples for the primary fluorophore include aluminum oxide ($Al_2O_3$), zinc oxide (ZnO) and similar metal oxides. In selecting a particular material, it can be important to consider factors such as: 1) the energy level required for excitation needed to achieve the desired photoluminescence spectrum, 2) the cost of the material, 3) the range of solvents that can be used for production purposes (EtOH, $H_2O$, hexane, toluene, etc.) and 4) the environmental impact of the material.

One example of a suitable alternative to $Ga_2O_3$ is zinc oxide (ZnO). Some of the advantages of ZnO include a narrower band gap (3.4 eV), the ability to disperse in polar solvents, such as EtOH and $H_2O$, low cost, biological consumptiveness, and the ability to achieve higher emission color tunability (ranging from approximately 400 nm to approximately 600 nm). Regarding the narrower band gap (3.4 eV), this allows for a lower excitation energy (up to approximately 365 nm), generally requiring cheaper excitation emitters.

ZnO nanoparticles or nanocrystals may be prepared using, for example, a precipitation method. The precipitation method may include using lithium hydroxide (LiOH) as the precipitation agent in ethanol, and zinc acetate as the metal precursor. The size of nanoparticles can be tuned by precipitating at different pH levels. The purification process of the nanoparticles can be achieved by washing the nanoparticles with EtOH.

FIGS. 14A to 18B demonstrate the chromaticity results using a ZnO nanocrystal-based nanostructure composite. FIGS. 14A to 18B illustrate results for various sizes of ZnO nanocrystals and for various concentrations of RhB.

Some adaptation of the production/synthesis techniques may be required in order to utilize ZnO as the nanocrystal. Specifically, adaptation may be needed due to lower emissions in the blue part of the spectrum. Tunability of photoluminescence for ZnO nanocrystals may be accomplished, for example, based on the preparation of the nanocrystals using a hydrolysis method. This method enables the achievement of strong blue photoluminescence, with quantum efficiency and spectral band-width comparable to that of $Ga_2O_3$ nanocrystals. White light emissions are then obtained by binding RhB to ZnO nanocrystal surfaces, based on the methods described herein.

The following paragraphs provide additional detail on the white light-emitting hybrid nanostructures constructed using colloidal ZnO nanocrystals. ZnO is a naturally occurring wide band gap n-type semiconductor (band gap energy ~3.37 eV), which has significant industrial importance because of its low cost, non-toxicity, chemical stability, good optical transparency, n-type conductivity and high electron mobility, and strong room-temperature visible light emission. Importantly, colloidal ZnO NCs are readily synthesized at room temperature, and exhibit strong quantum confinement and size-dependent optical properties. Although the nature of the defect-based emission in ZnO NCs continues to be debated, it also shows size-dependent behavior, allowing for the manipulation of visible photoluminescence via NC size. Broad-band blue-green PL of ZnO NCs may allow for a partial resonance energy transfer to orange-red organic chromophores (i.e ATTO 565 and 590) conjugated on NC surfaces, leading to an efficient generation of white-light by this new quasi-single nanostructure composite. Owing to the size-tunability of defect-based ZnO NC PL, the blue emission energy and the spectral overlap with absorption of conjugated fluorophores may be controlled, leading to a wide tunability of white light chromaticity. The hybrid nanostructure composite formed in this way may allow for seamless integration with other light emitting materials or devices, intended to allow for inexpensive, readily accessible, rare-earth element free, broadly-tunable single white light converter for new lighting technologies.

It is intended that all reagents and solvents are generally commercially available. Zinc acetate dihydrate (Zn$(OAc)_2.2H_2O$), lithium hydroxide monohydrate (LiOH.$H_2O$), (3-glycidyloxipropyl) trimethoxy-silane (≥98%), ATTO 590 (≥90%), ethanol (EtOH) (≥98%), and ATTO 565 (≥75%) are generally commercially available; for example can be purchased from Sigma-Aldrich Corporation and/or Fischer Scientific.

Synthesis of ZnO NCs.

In an example preparation of ZnO NCs, Zn$(OAc)_2$.2$H_2O$ (2 mmol) was added to 20 mL EtOH in a round bottom flask and refluxed for 1 h at 70° C. under continuous stirring. The resulting Zn(II) precursor was cooled in ice-water bath. In another reaction vessel, LiOH.H2O corresponding to a Li/Zn concentration ratio of 3.5 was sonicated in 20 mL EtOH for 30 minutes to achieve complete dispersion, and then cooled down to 0° C. using an ice-water bath. The LiOH ethanolic solution was mixed thoroughly with the Zn(II) precursor at 0° C. and stirred vigorously for about an hour. In order to obtain ZnO NCs of largest average size, 10 mL of the Zn(II) precursor was reacted with 10 µl of 10 M aqueous NaOH solution at 60° C. under vigorous stirring for 60 minutes.

Conjugation to the Dye Molecules.

In an example conjugation of dye molecules, a stock suspension of ZnO NCs and solutions of ATTO590/ATTO565 of appropriate concentrations were prepared in ethanol. The initial sample was prepared by the addition of 20 µL stock solution of an ATTO dye to 3 mL ZnO NC suspension, followed by sonication for 1 hour. A series of samples were subsequently prepared by changing the starting volume of the ATTO stock solution added to the NC suspension in increments of 20 µL, up to the total of 200 µL.

For preparation of NC surface-protected white light emitters, 25 µL of diluted (3-glycidyloxipropyl) trimethoxy-silane in ethanol (4-fold dilution) was added to dye-conjugated ZnO NC suspension, and further sonicated for 1 h in ice-bath. The sample was then left undisturbed overnight.

Spectroscopic Measurements

Absorption and Steady-State PL Spectroscopy

Absorption measurements were made at room temperature with a Varian Cary 5000 UV-vis-NIR spectrophotometer using a standard quartz cuvette (1 cm path length). The spectra were recorded in a double-beam mode.

The steady-state PL spectra were recorded with a Varian Cary Eclipse fluorescence spectrometer, using standard PL quartz cuvettes. The data were recorded over the wavelength range 320-800 nm and the slit widths for both excitation and emission were set to 5 nm. The quantum yields of the NC samples were determined relative to quinine bisulfate (QBS) as the reference (the quantum yield of QBS in 1 N H2SO4 reported to be 0.55).

Time-Resolved PL Measurements.

Applicants performed time-resolved emission measurements using time correlated single photon counting (TC-SPC) system from Horiba Jobin Yvon IBH Ltd. A 563 nm NanoLED (IBH Ltd) was used as the excitation source, and the emission was collected at the right angle geometry. The signals were monitored at the emission maxima; 600 and 575 nm, respectively, for ATTO 590 and ATTO 565 dyes bound to NCs. Both excitation and emission slit widths were set to 16 nm. All data were acquired over 1024 channels using 1 MHz repetition rate and a 0.059 ns/channel. The maximum intensity for a channel was 20,000 counts. The instrument response function (IRF) was recorded using a Ludox solution (Sigma Aldrich) by detecting the scattered excitation.

An iterative reconvolution method was employed to analyze all decays using IBH DAS 6.2 software. An experimental curve was fit to a program generated curve, which was convoluted numerically with the instrument response function.

The decays were then fit to a multi-exponential function (mono- to three-exponentials) using the IBH DAS-6 program:

$$I(t) = I(0)\sum_{1}^{i} A_i \exp\left(-\frac{t}{\tau_i}\right) \quad (1)$$

l(t) and l(0) are the respective luminescence intensities at time t and zero (immediately after the excitation by the pulsed light). $A_i$ values are the relative contributions to the amplitude of the decay of the ith species involved $$\sum_{1}^{i} A_i = 1 \quad (2)$$

The goodness of the fit to the experimental data was evaluated by considering the reduced $\chi^2$ values, which should be between 0.9 and 1.2, and analyzing the randomness of the weighted residuals.

Development of Prototype White LEDs.

Prototype white LEDs were prepared using monochromatic UV LEDs (300±5 nm) with a flat top window, purchased from, for example, Sensor Electronic Technology. The window of an LED was first cleaned with hexane and ethanol. A suitable white light-emitting sample prepared using the approach outlined above was deposited on the flat top surface of the LED in 10 µL aliquotes, followed by air drying at room temperature. The deposition continued until a sufficient thickness was achieved, resulting in the emission of bright white light upon applying 7.0 V to the LED. Color rendering index (CRI) and correlated color temperature (CCT) of the fabricated LEDs were measured with an illuminance spectrophotometer CL-500A purchased from, for example, Konica Minolta.

Figure 19A:
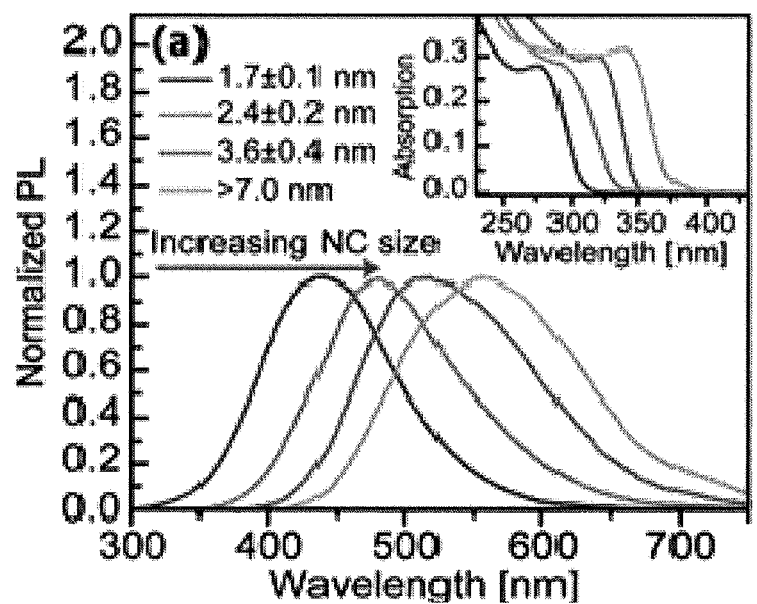

Visible emission in bulk ZnO is an extrinsic property related to discrete electronic states in the band gap associated with structural point defects or dopants. In ZnO NCs, this emission was studied due to its attractive size-dependent behavior. Different origins of the observed PL have been proposed involving donor and/or acceptor states, often associated with specific surface sites. While the mechanism of this emission was not investigated, the possibility of coupling broadly-emitting defect states in ZnO NCs with surface-bound molecular fluorophores was recognized, as a potential approach to tunable white light generation. FIG. 19A shows PL spectra of a series of colloidal ZnO NCs with varying average sizes in ethanol. These NCs exhibit intense broad-band visible emission, which red-shifts with increasing NC size. Although typical semiconductor NCs display significant exciton emission, the ZnO NC spectra in FIG. 19A are dominated by lower-energy defect emission, with no evidence of the exciton recombination. The absorption spectra of the same NCs are shown in the inset. The lowest energy transition, ranging between ca. 275 and 350 nm, also shifts to lower energy with increasing NC size due to quantum confinement effect. The relatively small band width and the sharp onset of absorption transition at the red edge reflect narrow size distributions of ZnO NCs. Significant stokes shifts of the PL bands relative to the corresponding absorption spectra are consistent with the presence of sub-band gap states associated with structural defects.

The red shift of the emission band indicates that relevant defect energy states shift in conjunction with the electronic band structure of NCs with increasing particle size. The broadening of the PL spectra is associated with inhomogeneous distribution and speciation of defects in individual NCs. The quantum efficiency of this luminescence was determined to be in the range 10-12%, without any further modification. Quantum yield of modified ZnO nanocrystals can be as high as 75%.

The absorption spectra for different sizes of ZnO nanocrystals are shown in the inset of FIG. 19A.

Figure 19B:
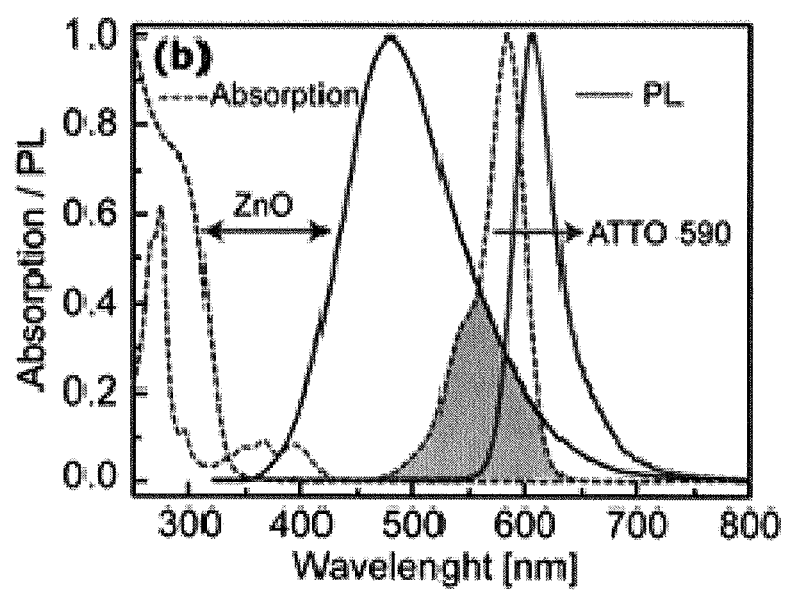

Given the large band width and energy range of ZnO NC PL, it is intended that immobilization of a fluorophore, having a complementary PL spectrum, on the surface of appropriately-sized NCs may generate white light of desired chromaticity by the Förster resonance energy transfer (FRET) mechanism. The primary requirements for the FRET are the overlap between a donor emission and an acceptor absorption spectra, and a short separation between the donor and acceptor (<ca. 10 nm). The ATTO 590 dye has a maximum absorbance at 585 nm, whereas the emission spectrum is Stokes-shifted by ca. 20 nm, which is complementary to the broad blue emission of ZnO NCs having an average diameter of 2.4±0.2 nm (as shown in FIG. 19b). It is also evident from FIG. 19B that the ZnO NC emission and the ATTO 590 absorption spectra may have significant overlap, potentially enabling their electronic coupling via FRET. The dye absorbs very little around 300 nm, allowing for the selective excitation of the ZnO NCs.). FIG. 19B illustrates, in the shaded area, an overlap of emission spectrum of ZnO NCs (2.4±0.2 nm) and absorption spectrum of ATTO 590 dye molecules, indicating significant overlap which is an intended to enable an energy transfer process.

Figure 20A:
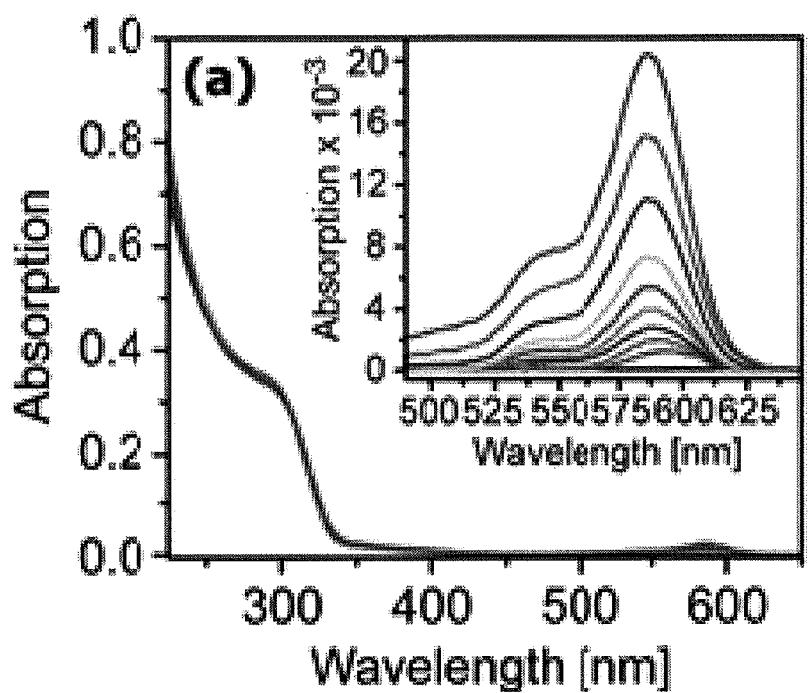
Figure 20B:
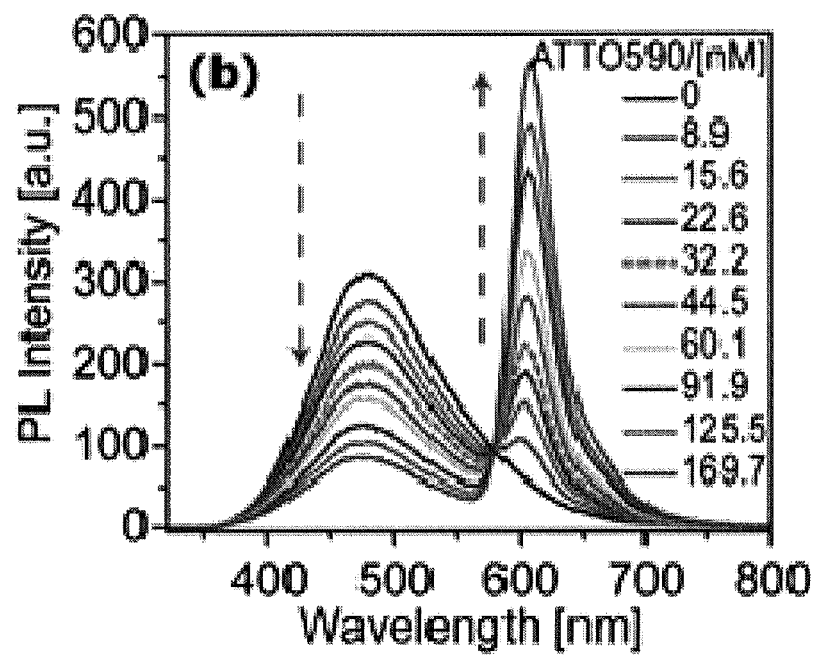
Figure 20C:
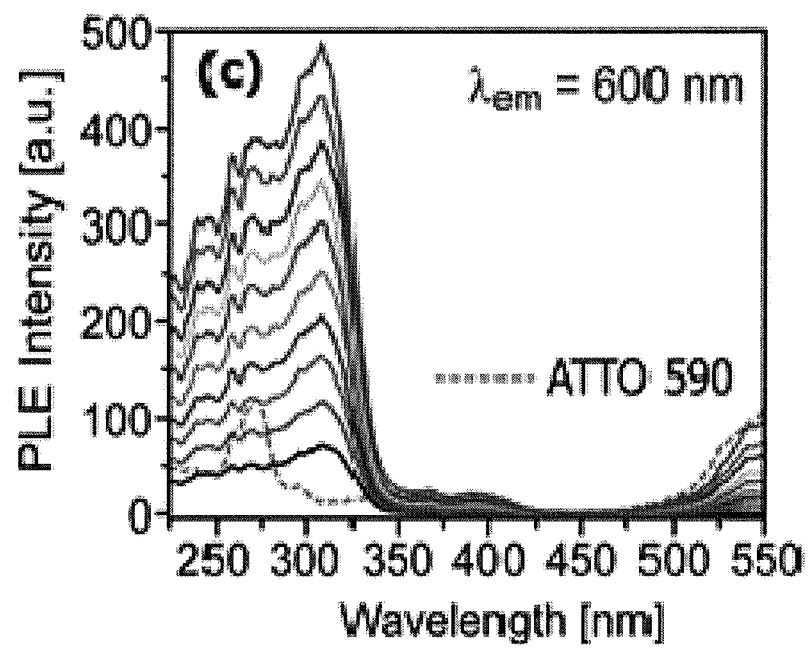
Figure 20D:
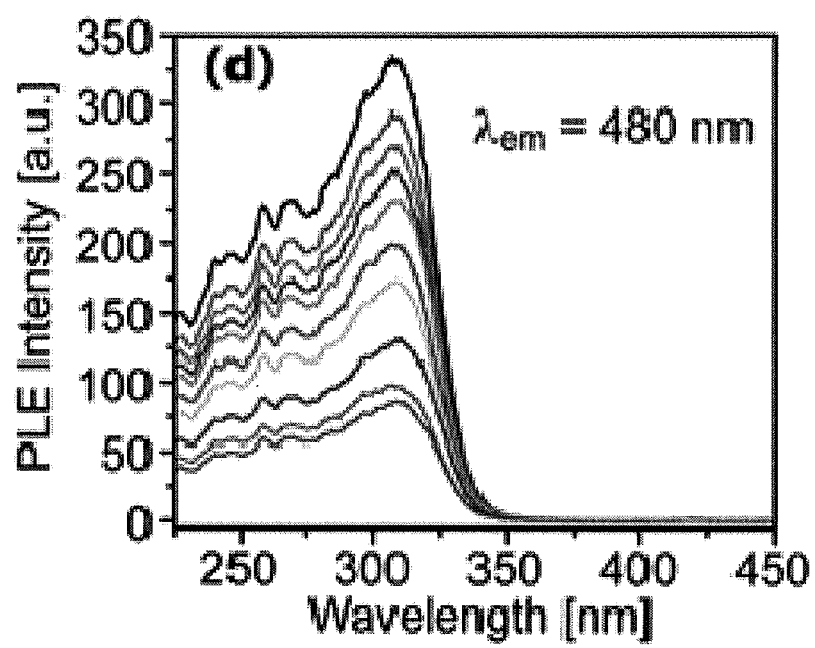

The absorption spectra of ZnO-ATTO 590 nanoconjugate suspensions prepared using increasing concentrations of ATTO 590 (from 0 to 170 nM) are displayed in FIG. 20A. The broad shoulder centered at ca. 300 nm is due to the NC band gap absorption, while weaker asymmetric band peaking at ca. 590 nm is assigned to $S_0 \rightarrow S_1$ transition of ATTO 590 (inset of FIG. 20A). The PL spectra of the same samples upon excitation at 300 nm are shown in FIG. 20B. The increasing concentration of the dye leads to a decrease in the intensity of the defect emission concurrently with an increase in the dye emission. This observation may suggest electronic coupling between NCs and dye molecules, consistent with the nanoconjugate formation. The increase in the ATTO 590 emission cannot be associated with the direct excitation of the dye because ATTO 590 emission is more than an order of magnitude weaker than the ZnO emission for this excitation wavelength. The possibility of coupling via electron transfer is also ruled out since the absorption spectra of the nanoconjugates are the same as the spectrum of a simple mixture, showing no evidence of characteristic charge transfer transitions. Therefore, the simultaneous quenching of ZnO NC (donor) and an increase in ATTO 590 (acceptor) emission can be ascribed to the resonance energy transfer (FRET), similarly to previously reported examples. Furthermore, the presence of an isosbestic point in the emission spectra at ca. 580 nm (shown in FIG. 20B) may indicate that both quenching of the NC trap emission and the enhancement of ATTO 590 emission occurs directly and is due to the same process. In particular, the thick light blue line spectrum shown in FIG. 20B is intended to corresponds to pure white light The corresponding photoluminescence excitation (PLE) spectra are shown in FIGS. 20C and 20D. The excitation spectra of ATTO 590 in the molecular form (dashed line) and bound to ZnO NCs (solid lines) are compared in FIG. 20C. In the absence of ZnO, the excitation spectrum (PL monitored at 600 nm) shows an intense maximum at ca. 585 nm and a set of weak features at 250-400 nm, characteristic for ATTO 590 (dashed line in FIG. 20C). After the addition of ZnO NCs, the excitation spectra are dominated by the strong onset at ca. 340 nm characteristic for the ZnO exciton state. These results may indicate that the ATTO 590 emission at 600 nm occurs upon the excitation of ZnO NCs and affirm that energy transfer takes place from the NCs to the dye adsorbates. Applicants also recorded the excitation spectra of ZnO NCs (PL monitored at 480 nm) in the presence of different concentration of ATTO 590 (shown in FIG. 20D). As expected, the excitation spectra appear to display the features characteristic of the ZnO band gap transition. With increasing concentration of dye, the PLE maximum around 310 nm decreases even though ZnO NC concentration remains unchanged (shown in FIG. 20A). This observation may further confirm the energy transfer from ZnO NCs to adsorbed ATTO 590. The ATTO 590 dye contains a carboxylic group, which can facilitate binding of the molecule to the surface of the ZnO NCs. To establish whether unbound dye could also quench ZnO PL, Applicants first prepared silane-coated ZnO NCs with an emission maximum at ca. 480 nm, and then titrated different concentrations of ATTO 590. In this configuration, silane coating were determined to prevent direct conjugation of dye molecules on the NC surface, which prevents energy transfer from ZnO to ATTO 590.

Figure 20E:
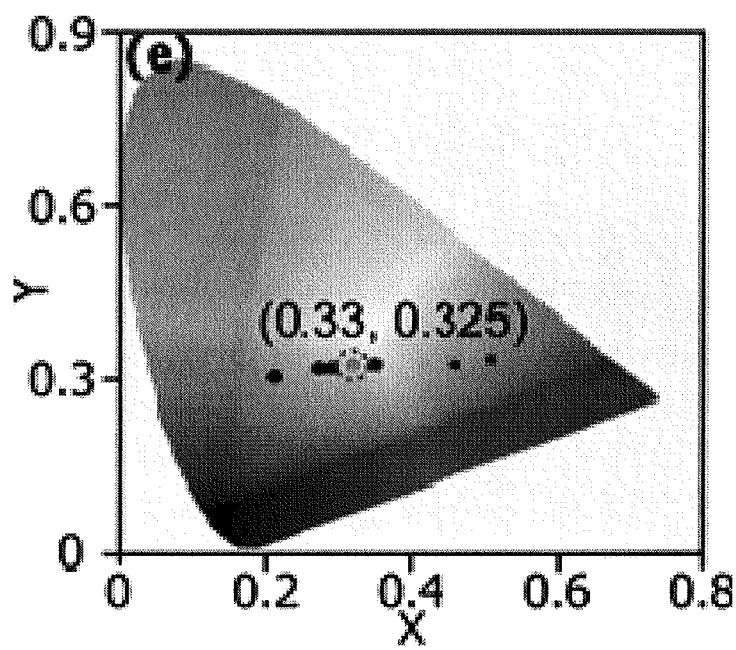
Figure 20F:
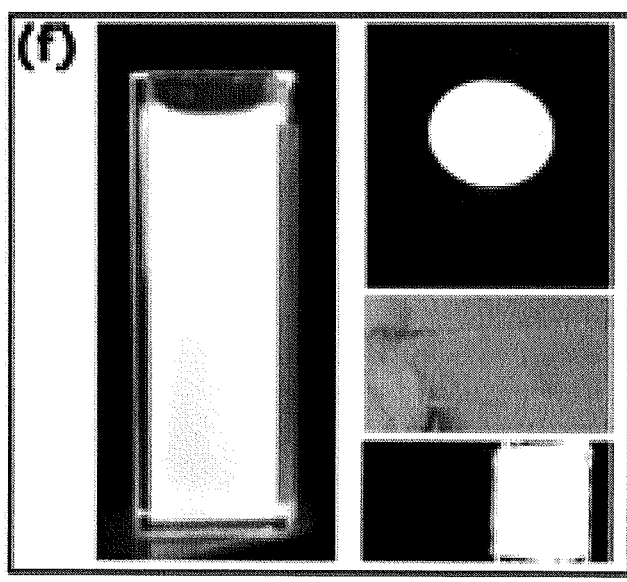

FIG. 20E shows the CIE-1931 chromaticity diagram indicating the color points corresponding to the spectra in FIG. 20B. With increasing amount of ATTO 590 per ZnO NC, the perceived emission color gradually transforms from blue to orange-red. This color transformation may be controlled with high precision and reproducibility over a wide range. Experiments have demonstrated the generation of nearly pure white light, represented by color coordinates (0.33, 0.325), using 32.2 nM ATTO 590 solution and 2.4 nm ZnO NCs (indicated with a dotted circle in FIG. 20E). The white light point in the CIE-1931 diagram corresponds to the spectrum shown with a thick dotted line in FIG. 20B. The colloidal suspensions of ATTO 590-conjugated ZnO NCs are completely transparent, potentially allowing for their incorporation into transparent films and optical windows. Photographs of this white-emitting sample in the colloidal form (left), incorporated into an LED (right), and a transparent film prepared on a quartz substrate (middle right, without exposure to UV light and bottom right with exposure to UV light) are shown in FIG. 20F. A thin transparent layer of NCs generates bright white illumination that is believed to be sufficiently strong to be visible even in daylight. Furthermore, the color rendering index (CRI), a quantitative measure of the ability of a light source to reproduce an object color, was measured to be up to 92-95 for the prepared LEDs. This value is better than the CRI of a typical cathode fluorescent lamp (~80) measured under the same conditions with the same instrument. The correlated color temperature of this particular sample was measured by the Applicants to be ~5300 K.

Förster Resonance Energy Transfer

According to the Förster theory, the rate of energy transfer for an isolated single donor-acceptor pair separated by a distance r is given by $$k_T(r) = \frac{1}{\tau_D}\left(\frac{R_0}{r}\right)^6 \quad (1)$$

where $\tau_D$ is the lifetime of the donor in the absence of the acceptor, and $R_0$ is known as the Förster distance, the distance at which the energy transfer efficiency is 50%. At the Förster distance, $r=R_0$, the energy transfer rate, $k_T(r)$, is equal to the decay rate of the donor.

The Förster distance ($R_0$) is defined as:

$$R_0^6 = \frac{9000(\ln 10)\kappa^2 \phi_D}{128\pi^5 N n^4} J(\lambda) \quad (2)$$

where $\varphi_D$ is the quantum yield of donor in the absence of acceptor, n is the refractive index of the surrounding medium, N is Avogadro's number, and $\kappa^2$ describes the relative orientation of the interacting donor and acceptor transition dipoles in space. This $\kappa^2$ factor usually reflects random motion of the donor and acceptor, and is assumed to have the value of ⅔. $J(\lambda)$ is spectral overlap integral, which is defined as $$J(\lambda) = \int_0^\infty F_D(\lambda)\varepsilon_A(\lambda)\lambda^4 d\lambda \quad (3)$$

where $F_D(\lambda)$ is the emission intensity of the donor in the range $\lambda$ to $\lambda+\Delta\lambda$, with the total integrated intensity normalized to 1, $\varepsilon_A(\lambda)$ is the extinction coefficient of the acceptor at wavelength $\lambda$.

The energy transfer efficiency ($\kappa$), which represents the fraction of photons absorbed by the donor that are transferred to the acceptor, is related to the energy transfer and donor decay rates, and as such can be expressed via $R_0$:

$$\eta = \frac{R_0^6}{R_0^6 + r^6} \quad (4)$$

Figure 21A:
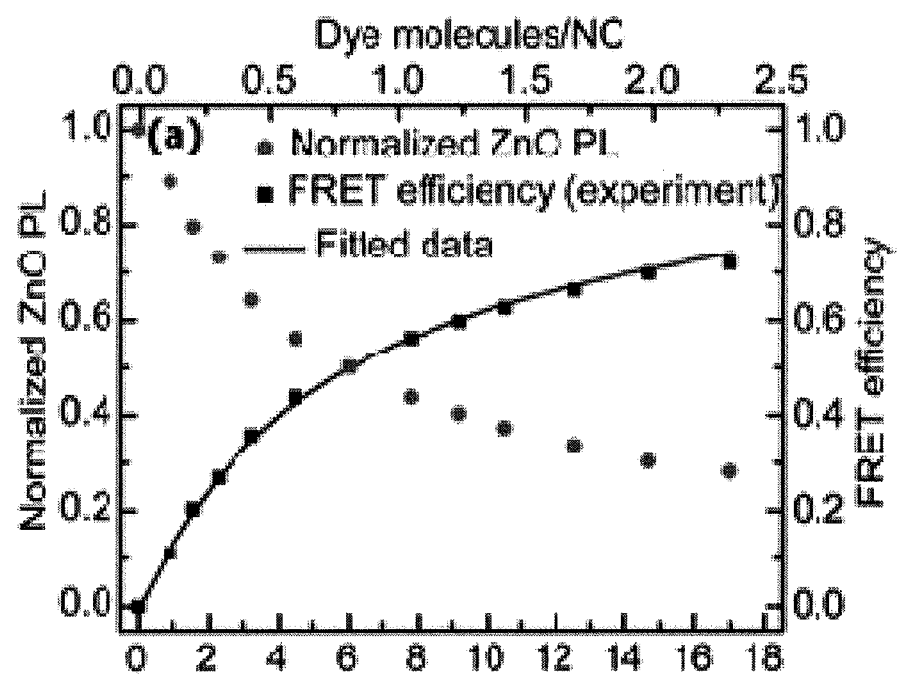
Figure 21B:
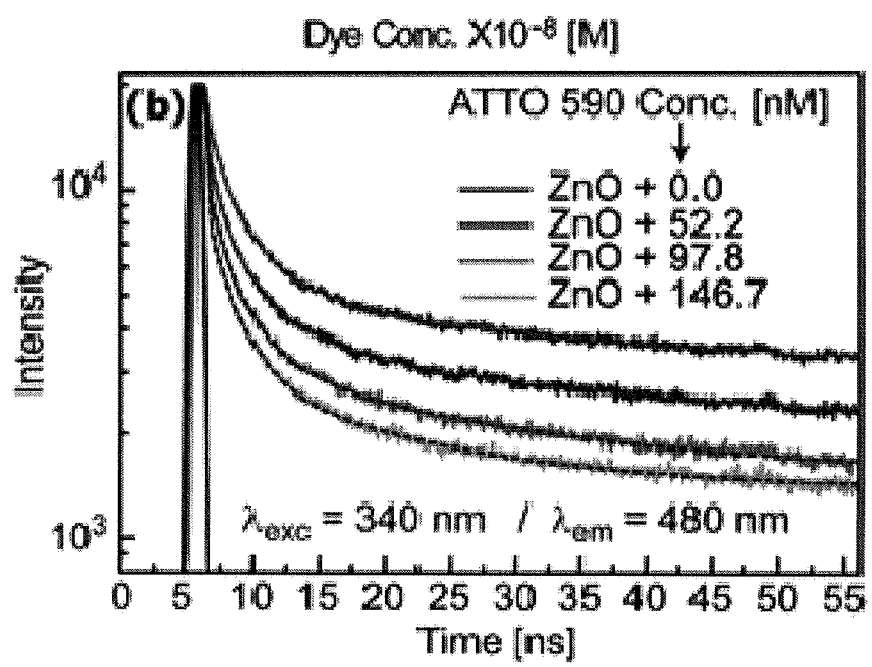

From the steady-state PL spectra in FIG. 21b, the FRET efficiency can also be calculated using the equation $$\eta = 1 - \frac{F_{DA}}{F_D} \quad (5)$$

where $F_D$ and $F_{DA}$ are the relative emission intensities of the donor ZnO NCs in the absence and presence of dye molecule acceptors, respectively.

FIG. 21A shows the FRET efficiencies obtained from the steady-state PL spectra (squares) and the normalized ZnO NC PL intensity (dots) as a function of the concentration of ATTO 590 molecule added to the suspensions of the fixed concentration of ca. 2.4 nm NCs. The Förster distance ($R_0$) and the spectral overlap integral ($J(\lambda)$) calculated using equations 2 and 3 were determined to be 38.6 Å and $1.97 \times 10^{15}$ $M^{-1}$ $cm^{-1}$ $mn^4$ respectively; which is in sufficient agreement with typical values. The FRET efficiency varies from 11 to 72% as the ATTO 590 concentration increases from 9 to 170 nM. The FRET efficiency shows sufficient agreement with the sixth power dependence on the donor-acceptor separation distance (shown in FIG. 21A as a solid line). The PL intensity decreases symmetrically to the increase in FRET efficiency with dye NC-surface coverage, affirming the energy transfer mechanism based on the Förster theory.

To further study the mechanism and dynamics of the energy transfer in hybrid ZnO-ATTO 590 conjugates, time-resolved PL studies of ZnO NCs in the presence of increasing amounts of ATTO 590 (shown in FIG. 21B) were carried out. The time-resolved studies were carried out at 52 nM, 98 nM, and 147 nM ATTO 590—congugated ZnO NCs in ethanol. The colloidal samples were excited at 340 nm (ZnO NC band edge) using a pulsed laser, while the PL signal was detected at 480 nm, the maximum intensity of the NC emission band. The temporal decays in absence and presence of ATTO 590 molecules are roughly tri-exponential. Notably, the decay rate of ZnO emission becomes higher with increasing concentration of ATTO 590 attached to NCs. Consistent with the Förster RET mechanism ATTO 590 quenches the fast and slow components of the defect luminescence of ZnO. The average lifetime $<\tau_{avg}>$ of ZnO defect emission at 480 nm is found to decrease from ca. 45 to 34 ns. The temporal parameters obtained from the time-resolved measurements are provided in Table S1. Taken together, steady-state and time-resolved PL results may confirm the fluorescence resonance energy transfer from ZnO NC defect states to attached ATTO 590 fluorophore molecules.

TABLE S1

Temporal parameters obtained from the time-resolved measurements.

| ZnO-ATTO590 Conjugates | | | | | | | |
|---|---|---|---|---|---|---|---|
| ATTO590 conc. [nM] | $A_1$ | $\tau_1$/ns | $A_2$ | $\tau_2$/ns | $A_3$ | $\tau_3$/ns | $<\tau>$/ns |
| 0 | 0.48 | 0.74 | 0.43 | 2.82 | 0.09 | 22.0 | 44.8 |
| 52.2 | 0.72 | 0.36 | 0.23 | 2.34 | 0.05 | 17.8 | 36.7 |
| 97.8 | 0.79 | 0.30 | 0.17 | 2.24 | 0.04 | 18.2 | 34.8 |
| 146.7 | 0.87 | 0.22 | 0.10 | 2.22 | 0.02 | 14.9 | 34.1 |

TABLE S1-continued

Temporal parameters obtained from the time-resolved measurements.

| ZnO-ATTO565 Conjugates | | | | | | | |
|---|---|---|---|---|---|---|---|
| ATTO565 conc. [nM] | $A_1$ | $\tau_1$/ns | $A_2$ | $\tau_2$/ns | $A_3$ | $\tau_3$/ns | $<\tau>$/ns |
| 0 | 0.48 | 0.74 | 0.43 | 2.82 | 0.09 | 22.0 | 44.8 |
| 54.5 | 0.82 | 0.28 | 0.14 | 2.35 | 0.04 | 17.8 | 36.3 |
| 114.5 | 0.79 | 0.32 | 0.17 | 2.26 | 0.04 | 17.6 | 35.2 |

Stability of the Hybrid Nanophosphor

Figure 22A:
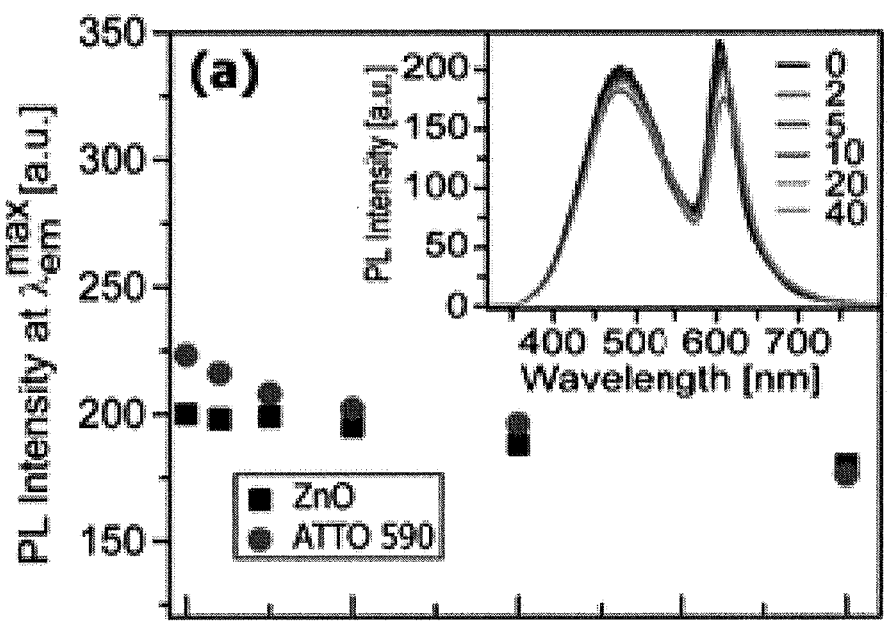

In spite of the demonstrated promise of ATTO 590-ZnO nanoconjugate for generating and tuning white light emission by controlling the FRET process, PL of colloidal ZnO NCs tends to degrade over time. This phenomenon has generally been associated with dynamic nature of NC surfaces, which are suggested to play a key role in PL of ZnO NCs. FIG. 22A shows the evolution of the PL spectra of as-synthesized ZnO NCs conjugated with ATTO 590 over time. The measured PL intensities at the ZnO (black squares) and ATTO 590 (dots) peak maxima are shown in FIG. 22A, when stored at ambient condition. The emission intensities of this sample show dramatic change over a period of 40 days. The ZnO PL decreases in intensity by an order of magnitude and red shifts from ca. 480 to 510 nm after 40 days upon the sample preparation. Decrease in the ZnO PL intensity and the spectral shift to lower energies indicate gradual change of the NC surface defect structure. The decrease in the ZnO PL intensity may reduce the amount of energy transferred to the acceptor, leading to a simultaneous decrease in ATTO 590 intensity and the overall white light generation efficiency. Besides the resulting decrease in the efficiency, the red shift of ZnO NC emission may also impact the chromaticity of the generated light over time.

It is also observed that the spectral position of the photoluminescence maximum of ZnO is red shifted with time. Similarly, the emission behavior of silane-capped sample is shown in 22B. Inset shows that the PL emission intensity and spectral distribution of the sample do not change significantly over time.

Figure 22B:
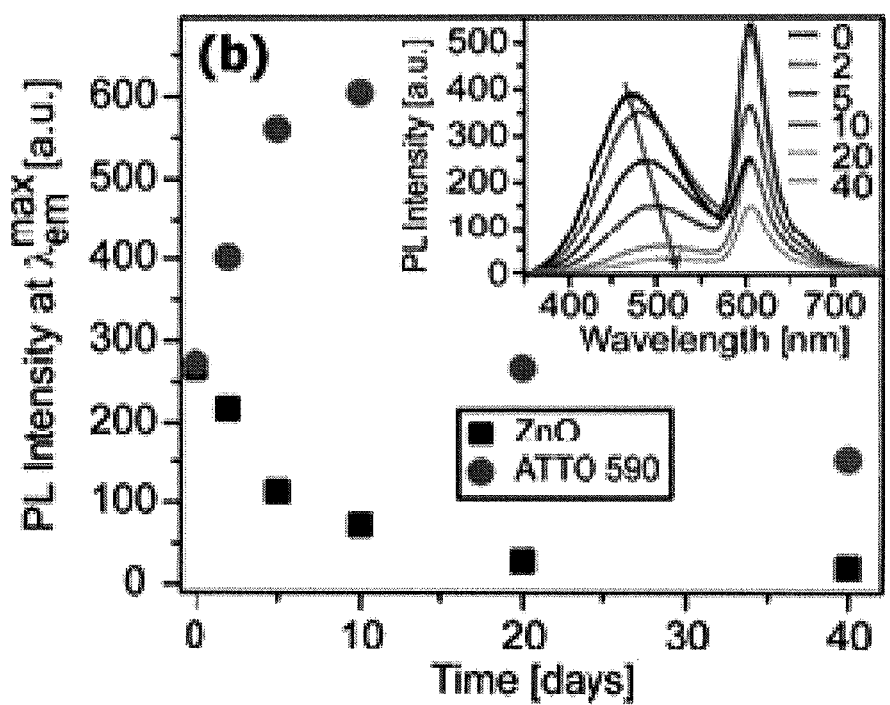

To enhance the stability of this hybrid nanoconjugate, the ATTO 590-conjugated ZnO NCs were encapsulated in an epoxy silane layer to protect the NC surface sites responsible for ZnO NC emission, together with ATTO 590 acceptor. The stability of the emission of the silane-protected colloidal nanophosphor is demonstrated in FIG. 22B. Contrary to unprotected ATTO 590-ZnO nanoconjugate, the PL intensities at 480 and 600 nm (peak maxima) for silane capped ATTO 590-conjugated ZnO NCs do not change significantly over a longer period of time under ambient condition (FIG. 22B, inset). Similarly, the silane-protected nanoconjugates experience little to no change in the spectral density distribution and color coordinates (FIG. 22B, inset). These results demonstrate that silane-protected ZnO-based hybrid nanophosphor samples are generally able to display pure white light emission, but also show enhanced stability over a longer period of time. Other types of stabilizing agents can include a silica shell or other molecules that can form a network under polymerization.

Generality of FRET Based White Nanophosphor.

Resonance energy transfer described by the Förster theory is a broad-based phenomenon, which makes the demonstrated mechanism for generating white light broadly applicable for a variety of different fluorophores. In corroboration of FRET based inorganic-organic hybrid conjugate for realization of single-phased white emitting phosphor, it was demonstrated that ZnO-ATTO 565 nanostructure composite also exhibits near white light emitting phosphor properties. This versatility provides an opportunity to tune the chromaticity of white light by simply selecting a molecular conjugate emitting the complementary spectral density to given NC size. Similarly to ATTO 590, ATTO 565 dye also has free carboxylic functional group which can anchor to the ZnO NC surfaces, but the $S_0 \rightarrow S_1$ transition is blue-shifted relative to ATTO 590. This blue shift induces larger spectral overlap with the PL band of ZnO NCs (shown in FIG. 19), requiring somewhat smaller average NC size to produce light of the same chromaticity, based on the color coordinates of the two coupled chromophores.

Figure 23A:
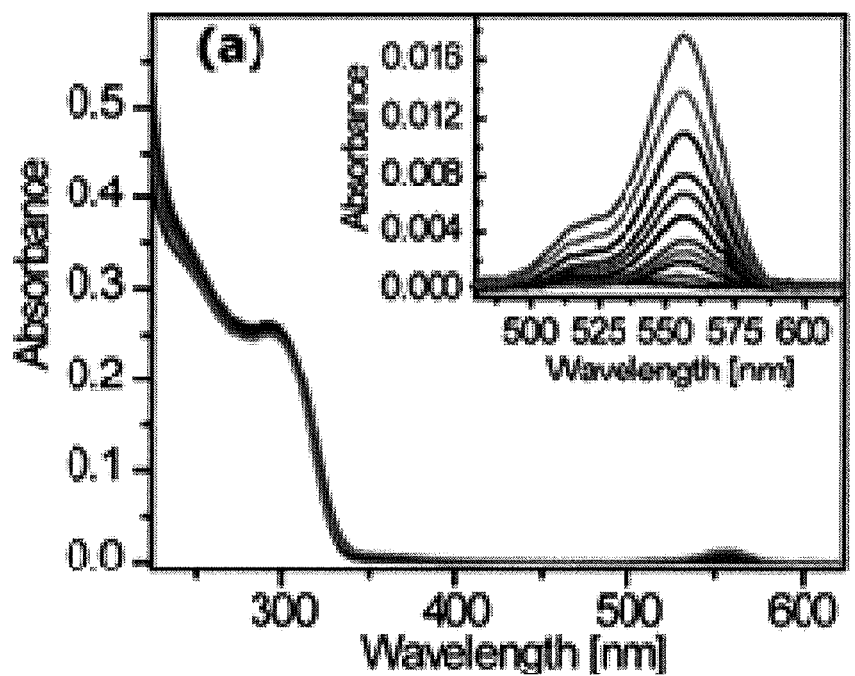
Figure 23B:
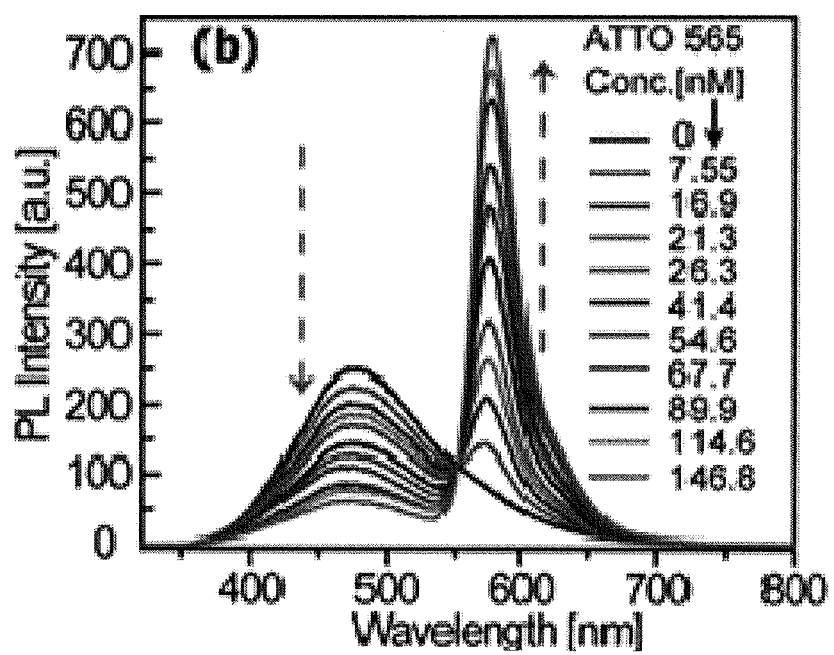
Figure 23C:
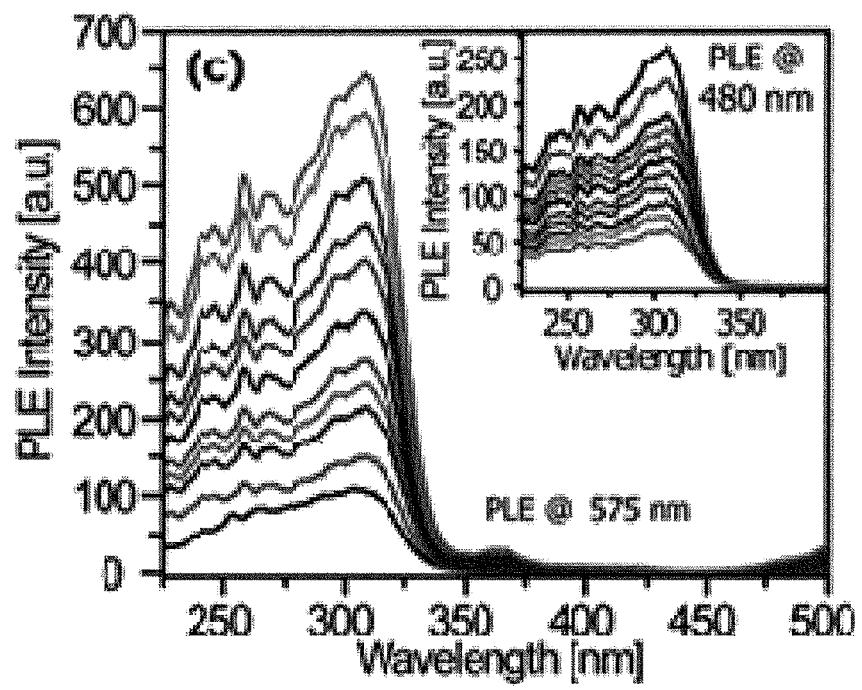
Figure 23D:
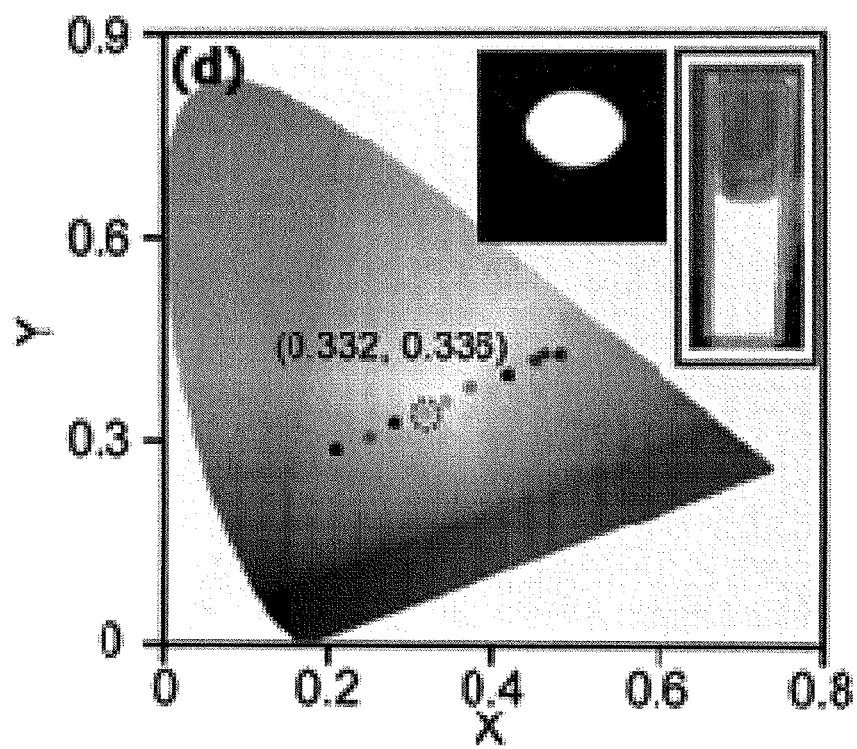

FIG. 23A shows the absorption spectra of 2.3 nm ZnO-ATTO 565 hybrid NCs for different starting concentrations of ATTO 565 added to NC suspension. The PL spectra of the same samples excited into the NC band gap are shown in FIG. 23B. The inset of FIG. 23A illustrates the absorbance of dye increases with increasing concentration of ATTO 565. FIG. 23B illustrates a photoluminescence spectra of approximately 2.3 nm ZnO-ATTO 565 nanoconjugates corresponding to the spectra in FIG. 23A ($\lambda_{exc}$=300 nm). The thick line spectrum is intended to correspond to pure white light. A decrease in the ZnO NC emission intensity accompanied by an increase in ATTO 565, intensity with increasing number of molecules per NC, is consistent with the excitation of ATTO 565 by anchoring NCs by FRET. This is believed to be similar to the ZnO-ATTO 590 nanoconjugates. The corresponding excitation spectra of the nanoconjugates monitored at 575 nm are shown in FIG. 23C. The excitation spectra recorded for the emission at 575 nm are dominated by ZnO exciton transition, clearly indicated FRET mediated excitation of conjugated ATTO 565 molecules. The inset of 23C illustrates the PLE of the nanoconjugates at 480 nm emission. The apparent colors associated with the spectra in FIG. 23B are indicated in the CIE-1931 diagram (shown in FIG. 23D). The sample emitting pure white light is designated with a dotted circle (0.332, 0.336), and corresponds to the ATTO 565 starting concentration of 21 nM. The photographs of this white light emitting sample in colloidal form and coated on a commercially available 300 nm LED are shown in the insets of FIG. 23D. The CRI and CCT of a typical LED were measured to be ca. 92 and 5100 K, respectively.

Figure 24:
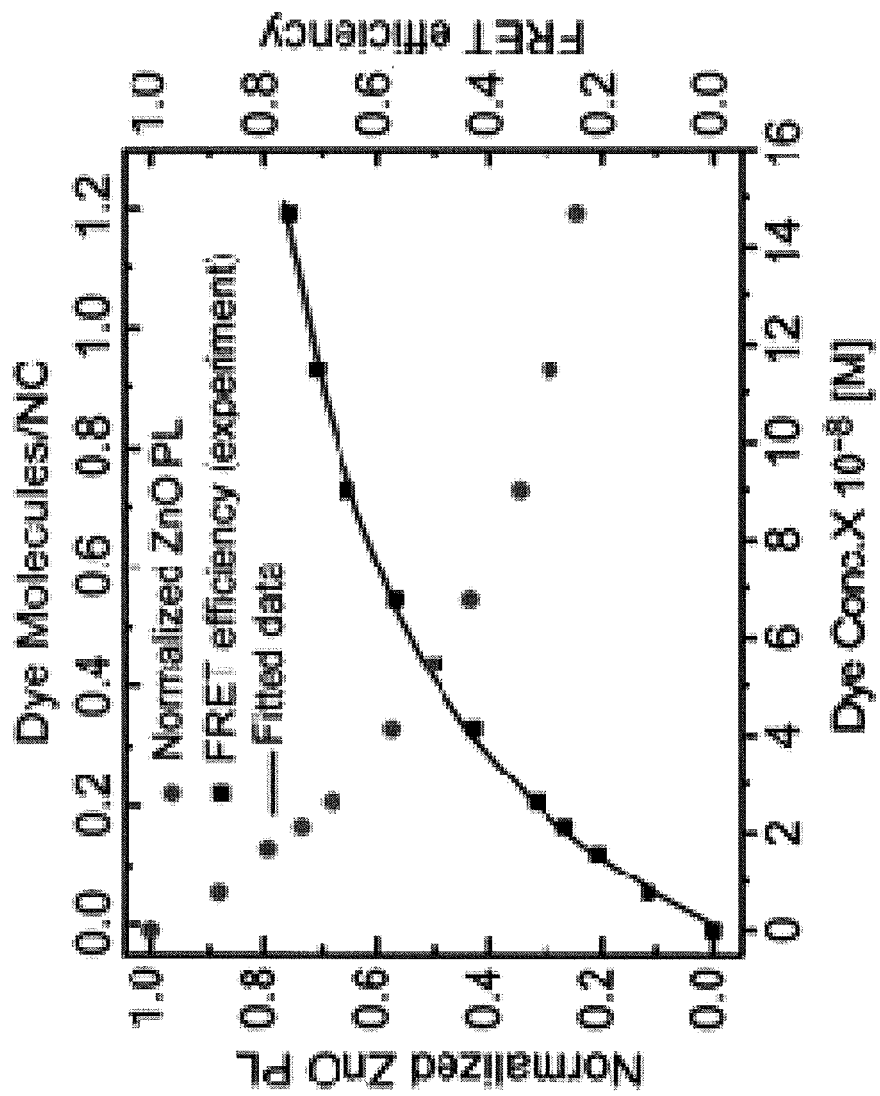

Applicants also calculated the FRET efficiency for ZnO-ATTO 565 nanoconjugates. FIG. 24 shows the FRET efficiencies (squares) and normalized ZnO NC emission obtained from the steady-state PL spectra as a function of concentration of ATTO 565 added to a fixed concentration a NC solution. The quenching of the PL intensifies (circles) of the NC donor emission with increasing dye concentration. The solid line is the fitting result of the sixth power dependence with the ATTO 565/NC ratio. The FRET efficiency varies from 11% to 76% as the concentration of ATTO 565 increases from 75 to 147 nM for a fixed concentration of ZnO NCs, following the same functional form and correlation with donor PL intensity as in FIG. 22A for ATTO 590. Applicants also performed time resolved PL measurements for ATTO 565-conjugated ZnO NCs. Time resolved data show that in the presence NC-bound ATTO 565 the average lifetime of ZnO defect emission decreases from 45 to 35 ns. From these experiments Applicants can infer that ZnO-ATTO 565 hybrid nanoconjugates behave as FRET-based single white light emitting nanophosphor, similarly to ZnO-ATTO 590 FRET pair. Furthermore, a comparison of the results for ATTO 565 and 590 conjugated on ZnO NCs demonstrate a high-level of accuracy and precision with which the chromaticity can be controlled for different dies or by changing the average NC size by as little as 0.1 nm. These results demonstrate exceptional tunability of white light emission using an inexpensive methodology and using earth abundant and easily prepared materials.

The present disclosure provides a technique for synthesizing ZnO-dye conjugated hybrid nanophosphor using a chemical method. The results reveal that stable hybrid inorganic-organic nanophosphor has the potential to produce pure white light. Due to energy transfer from ZnO NCs defect states to the conjugated ATTO590/ATTO565 dye molecules, this nanostructure composite is intended to generate tunable white light. The stable nanostructure composite is also intended to act as single-emitting direct white phosphor thus avoiding discrete color mixing from multiple phosphors or LEDs to mimic white light. Furthermore, the colloidal form of these NCs is intended to allow for their easy manipulation using chemical means, including their incorporation into light-emitting devices.

In a broader context, the electronic coupling between selected molecules and functional defects in environmentally benign ZnO oxide NCs may enable mutual transfer of properties of both components in the excited states, and realization of new functionalities in this class of nanostructure composite materials. Therefore, using semiconductor oxide conjugated hybrid nanophosphor based technology, and, in particular, ZnO technology is believed to be cost efficient, more environmentally friendly and require fewer resources than conventional lighting technology.

FIGS. 25 to 30 illustrate aspects of an example nanostructure composite using a nanocrystal such as ZnO or $Ga_2O_3$ and quantum dots (QD), such as those formed from CdSe/CdS. The core diameter and the shell thickness of CdSe/CdS core/shell NCs are adjusted to provide a PL spectrum complementary to that of the $Ga_2O_3$ or ZnO NC fluorophores. The ability to precisely tune the average core size and shell thickness of the CdSe/CdS NCs allows for the preparation of all-inorganic nanostructure composites based on $Ga_2O_3$ and ZnO NCs that exhibit the same color coordinates, but have different absorption spectra in the ultraviolet region.

Figure 25A:
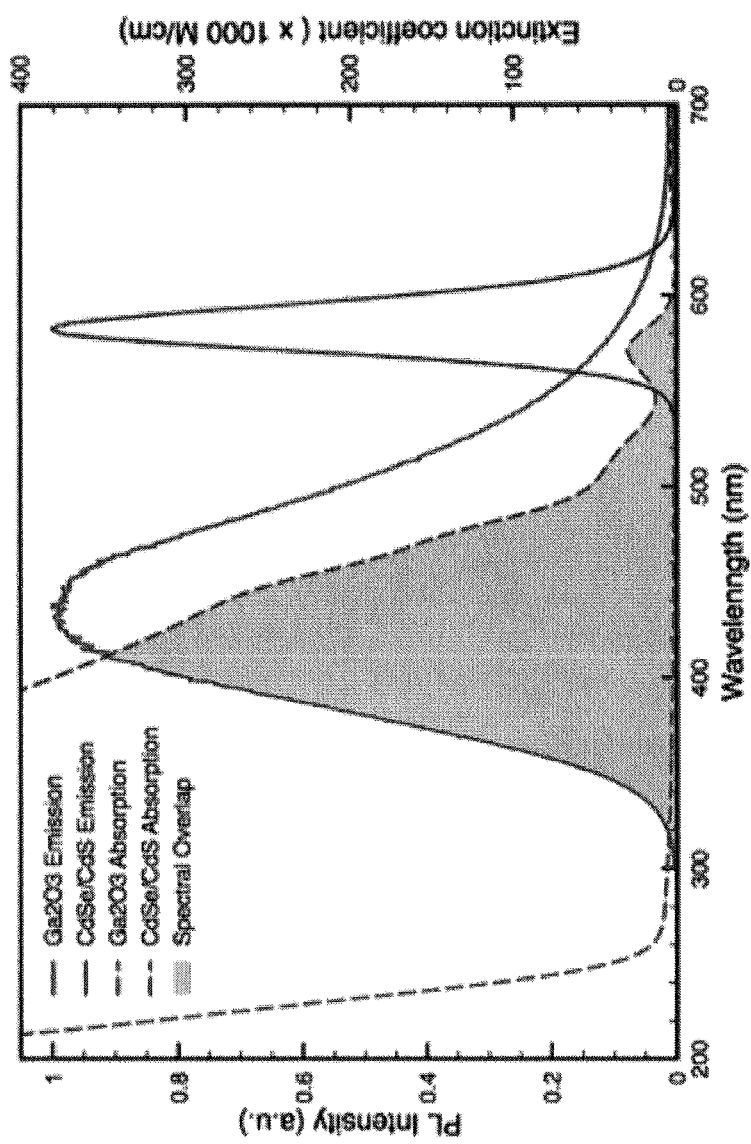
FIG. 25A is a graph showing absorption, emission and spectral overlap of $Ga_2O_3$ and CdSe/CdS.
Figure 25B:
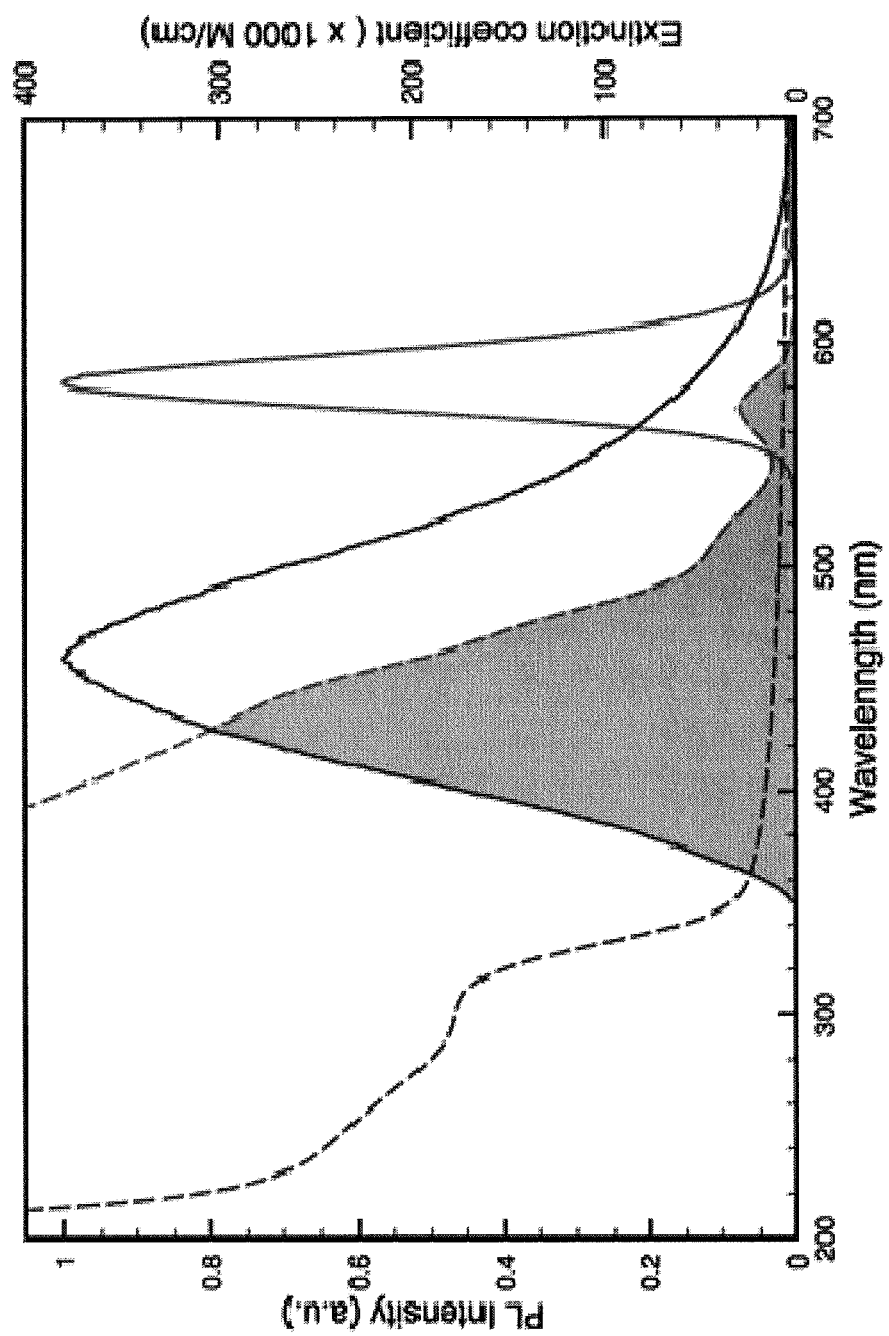
FIG. 25B is a similar graph showing absorption, emission and spectral overlap of ZnO and CdSe/CdS.

FIG. 25A is a graph showing absorption, emission and spectral overlap of $Ga_2O_3$ and CdSe/CdS. FIG. 25B is a similar graph showing absorption, emission and spectral overlap of ZnO and CdSe/CdS.

Figure 26:
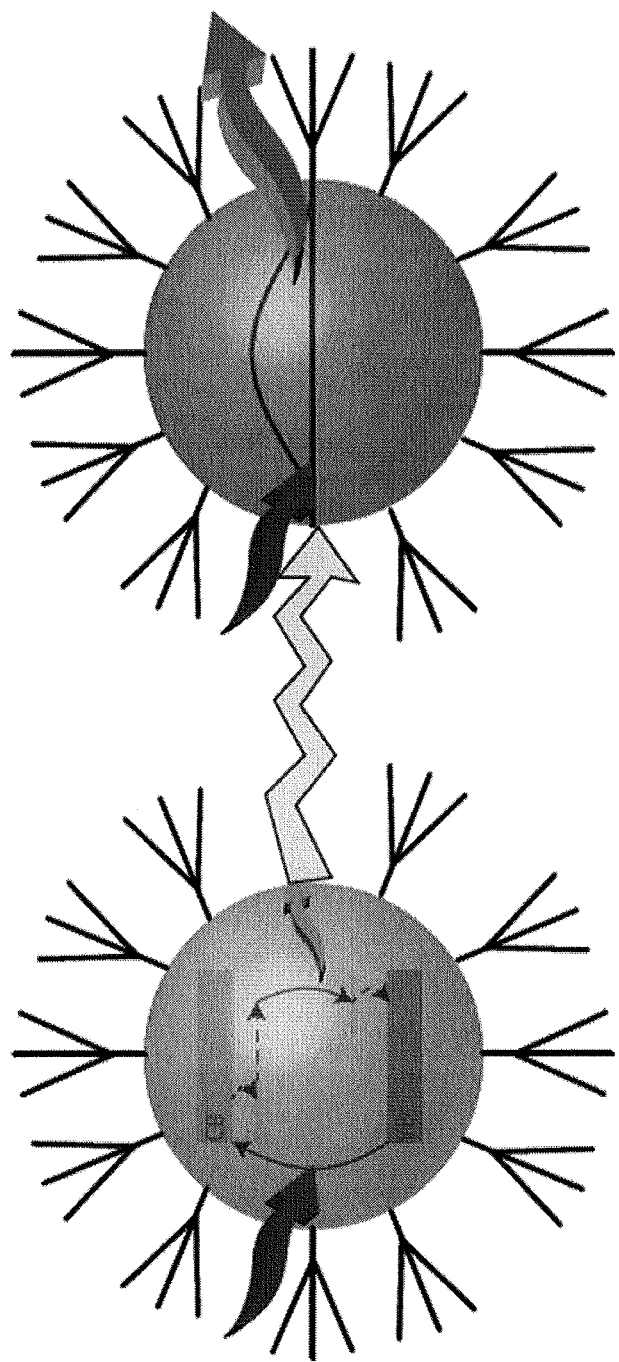
FIG. 26 illustrates how, when the NCs are contained in close proximity on a glass substrate, FRET occurs as opposed to when the NCs are in solution and sufficiently far apart that no FRET occurs.

FIG. 26 illustrates how, when the NCs are contained in close proximity on a glass substrate, FRET occurs as opposed to when the NCs are in solution and sufficiently far apart that no FRET occurs. The co-deposition of nanocrystals having complementary PL spectra systematically reduces the separation between donor and acceptor fluorophores (i.e. $Ga_2O_3$ or ZnO and CdSe/CdS NCs) allowing for the FRET mechanism to take place. Transparent substrates can simultaneously activate FRET for different nanocrystal composites having the same PL chromaticity but different absorption spectra.

Figure 27:
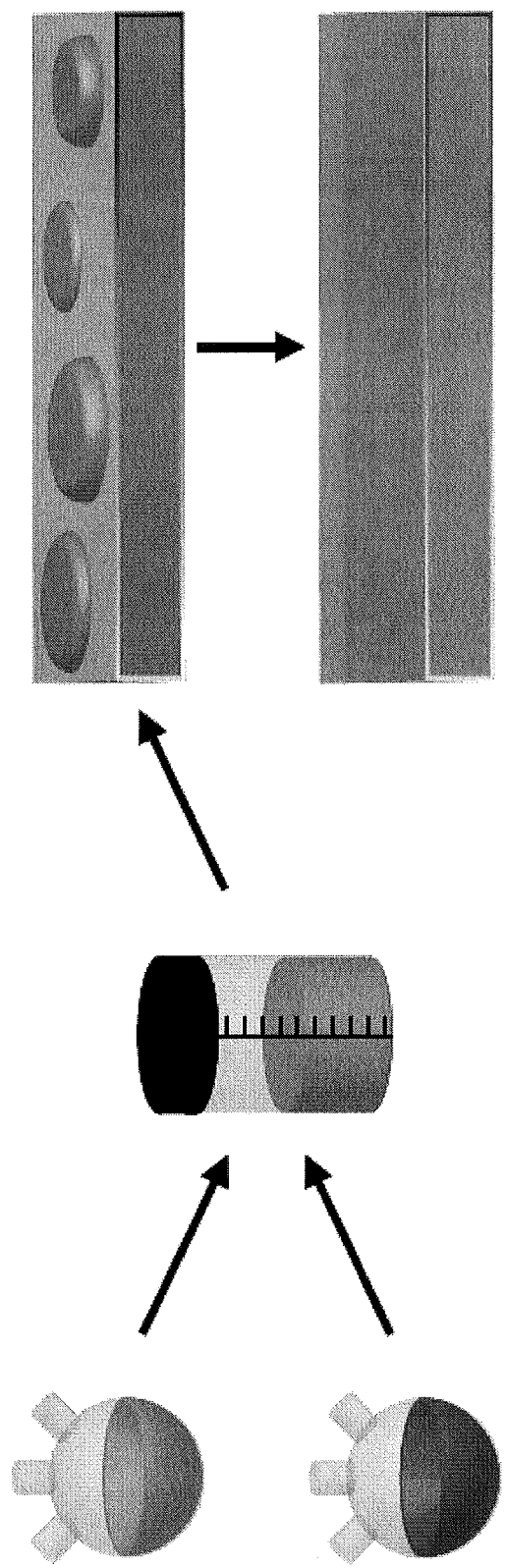
FIG. 27 illustrates the preparation of $Ga_2O_3$ NC and CdSe/CdS QD thin films.

FIG. 27 illustrates the preparation of $Ga_2O_3$ NC and CdSe/CdS QD thin films. First the NCs were prepared in isolation and suspended in hexane. The two NCs are then mixed together at 2 µM and drop cast on glass substrates.

Figure 28A:
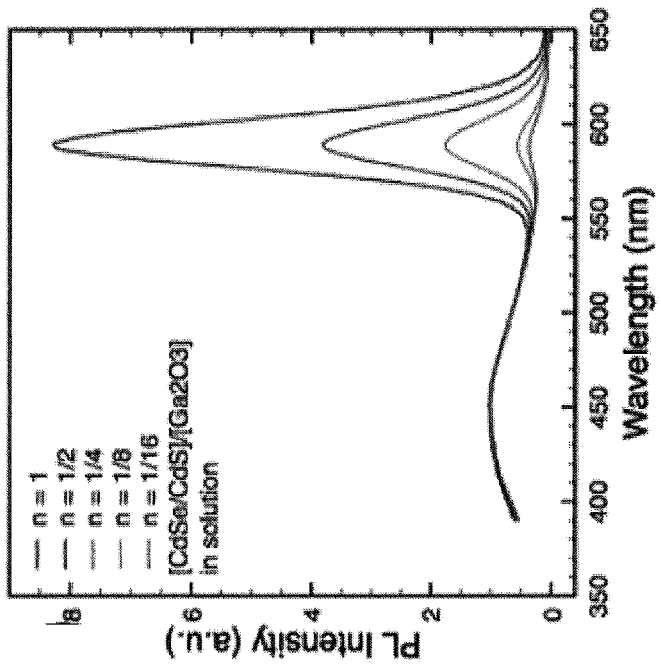
FIG. 28A shows PL of $Ga_2O_3$ NCs in solution at 2 µM with varying concentrations of CdSe/CdS QDs.
Figure 28B:
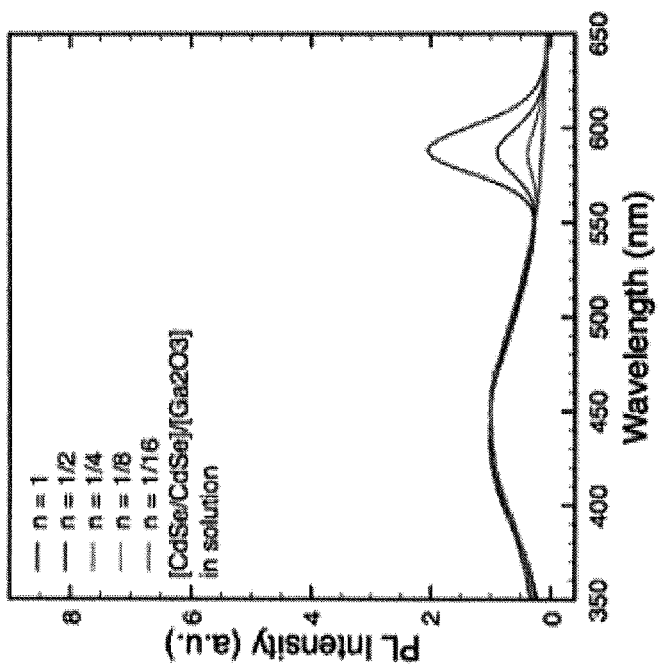
FIG. 28B shows the PL for the solutions from FIG. 28A after being deposited on glass substrates.
Figure 28D:
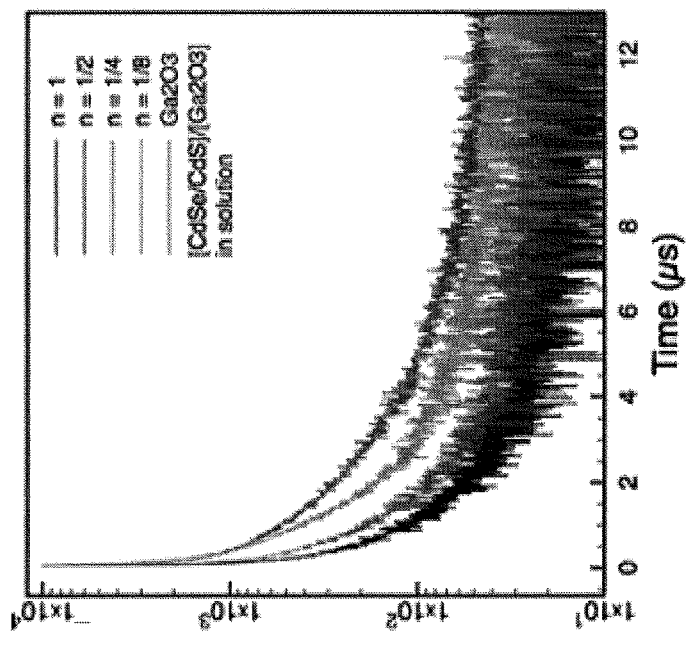
FIG. 28D shows lifetime of $Ga_2O_3$ NCs taken over 13 µs with intensity on a logarithmic scale.
Figure 28C:
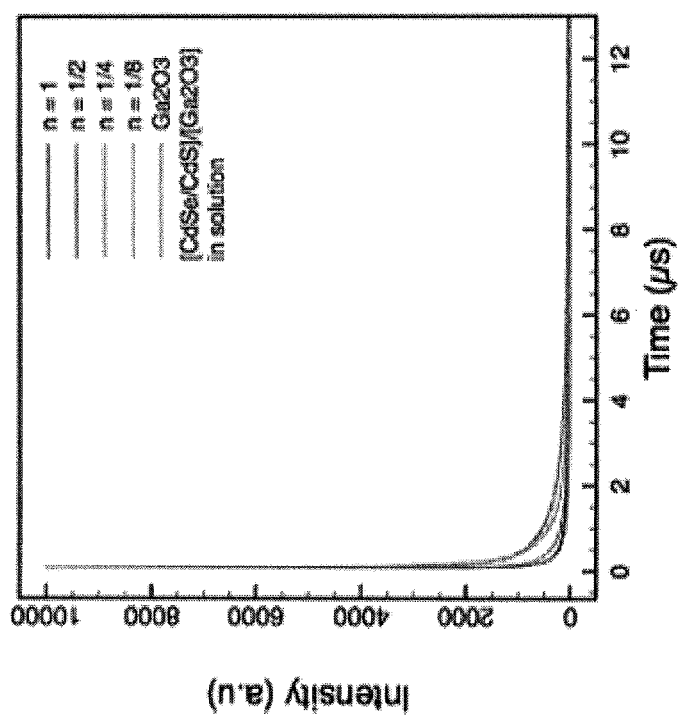
FIG. 28C shows lifetime data for $Ga_2O_3$ NCs taken over 13 µs with intensity on a linear scale.

FIG. 28A shows PL of $Ga_2O_3$ NCs in solution at 2 µM with varying concentrations of CdSe/CdS QDs. FIG. 28B shows the PL for the solutions from FIG. 28A after being deposited on glass substrates. FIG. 28C shows lifetime data for $Ga_2O_3$ NCs taken over 13 µs with intensity on a linear scale. FIG. 28D shows lifetime of $Ga_2O_3$ NCs taken over 13 μs with intensity on a logarithmic scale.

Figure 29:
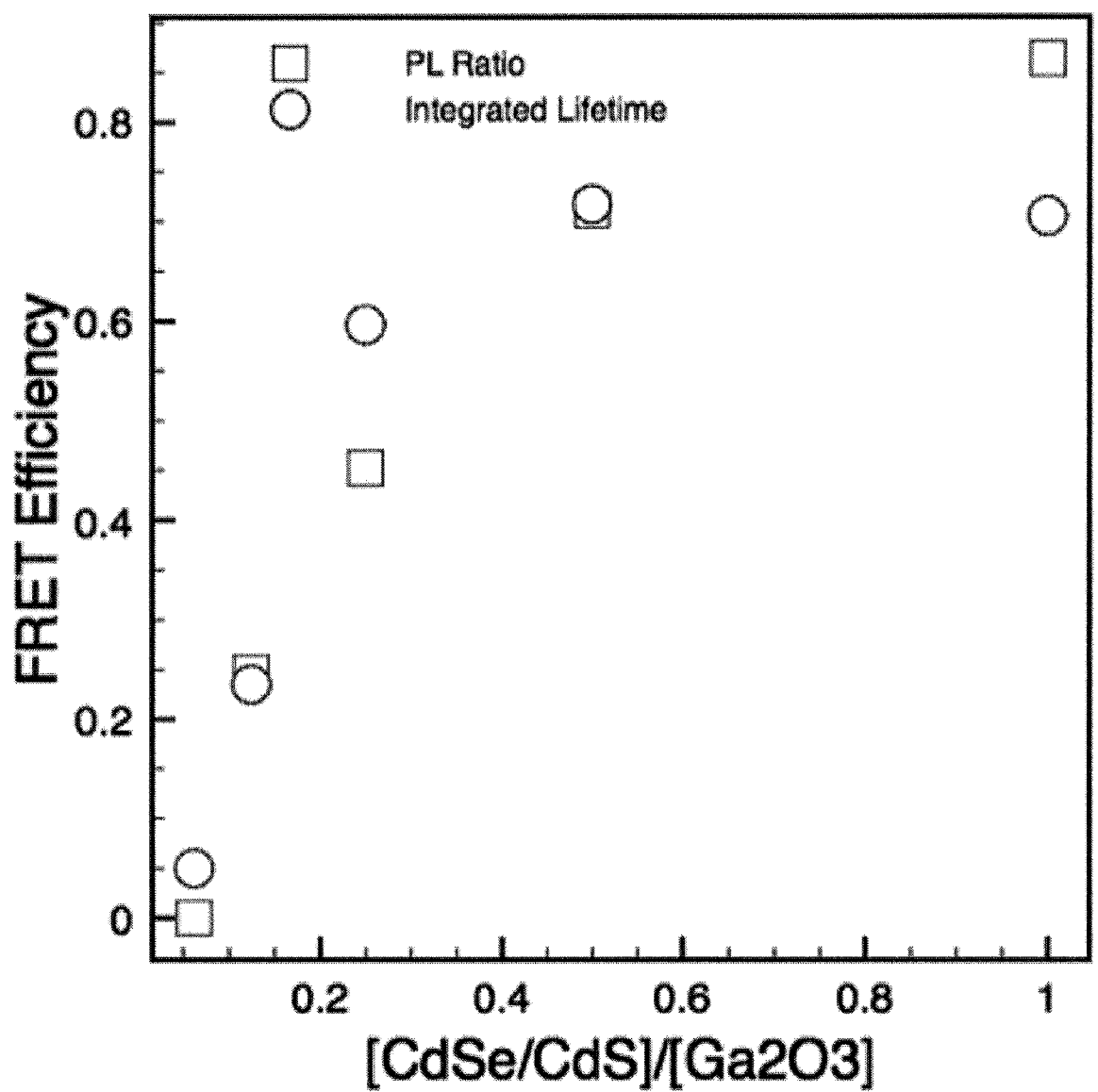
FIG. 29 shows a comparison of FRET intensities from PL ratio and integrated lifetime.

FIG. 29 shows a comparison of FRET intensities from PL ratio and integrated lifetime.

Figure 30B:
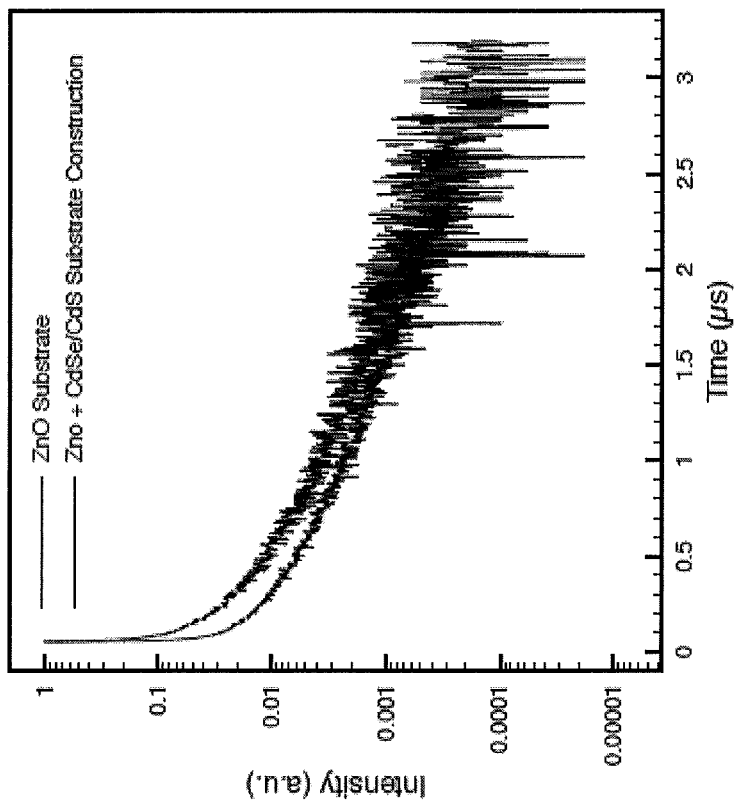
FIG. 30B shows the fluorescent lifetime of the samples shown in FIG. 30A.
Figure 30A:
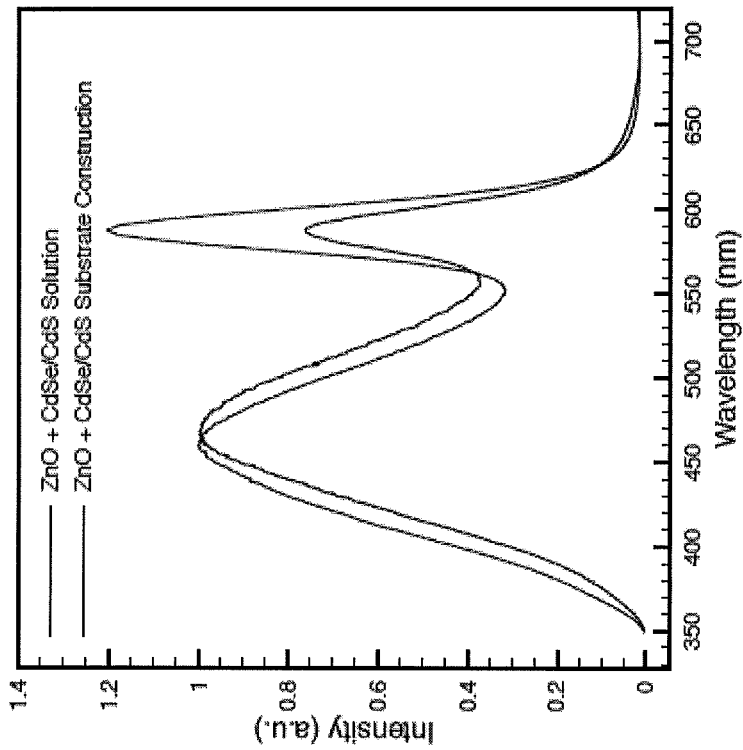
FIG. 30A shows PL of ZnO NCs and CdSe/CdS QDs in solution at an arbitrary concentration and PL of ZnO NCs and CdSe/CdSe QDs on a glass substrate normalized to ZnO PL intensity.

FIG. 30A shows PL of ZnO NCs and CdSe/CdS QDs in solution at an arbitrary concentration and PL of ZnO NCs and CdSe/CdSe QDs on a glass substrate normalized to ZnO PL intensity. FIG. 30B shows the fluorescent lifetime of the samples shown in FIG. 30A.

Figure 31:
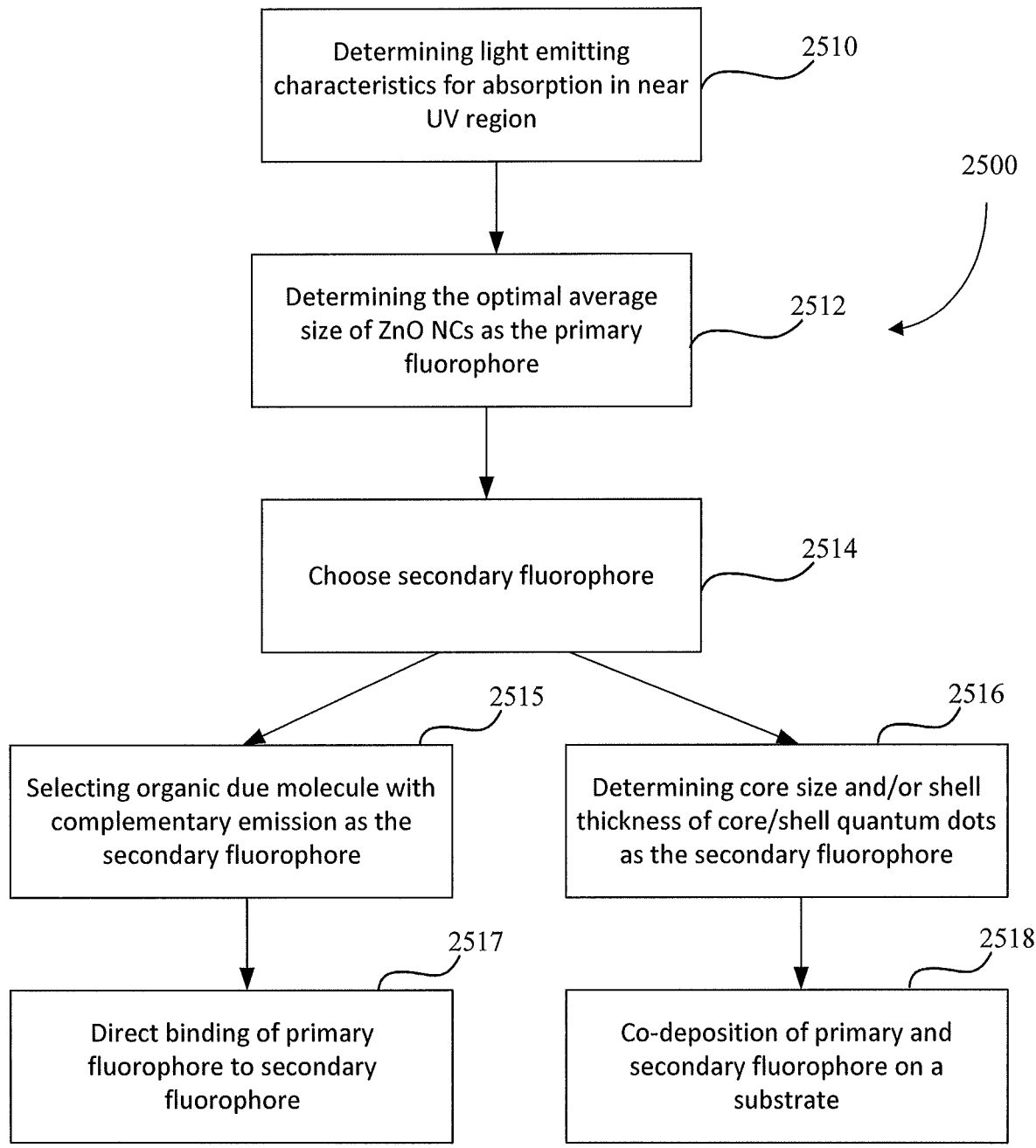
FIG. 31 is a flowchart for a method of producing a nanostructure composite according to an embodiment.

FIG. 31 is a flowchart for a method 2500 of producing a nanostructure composite light emitting structure using a ZnO nanocrystal base. The light emitting characteristics of a light emitter allowing for absorption in the UV (or near UV) spectrum are determined at 2510. ZnO, as a primary fluorophore, is configured with properties such that the photoluminescence gives a predetermined PL spectrum at 2512. In particular, the ZnO is synthesized to have a predetermined average size to provide the predetermined PL spectrum. A secondary fluorophore is selected at 2514 based on the PL spectrum of the ZnO and the particular application for the lighting. Two examples of options for the secondary fluorophore include dyes and inorganic complexes, such as quantum dots. In some cases, dyes may have advantages over quantum dots in some applications, as there may be a better control of the ratio of FRET acceptors to donors, and therefore the control and reproducibility of the color coordinates and light homogeneity may be improved with dyes. If an organic dye is selected, at 2515, a particular organic dye having a complementary emission spectrum as the ZnO PL spectrum is selected as the secondary fluorophore. Similarly, if an inorganic complex such as quantum dots (QD) is selected, at 2516, the quantum dots are configured to have an appropriate core size and/or shell thickness to match with the ZnO PL spectrum as the secondary chromophore. For the organic dye, at 2517, the secondary fluorophore is directly bound to the primary fluorophore, generally by mixing and sonication in a polar solvent to enable the FRET mechanism (i.e. nonradiative dipole—dipole coupling occurs). For the quantum dots, at 2518, the primary and secondary fluorophores co-deposited onto a substrate to enable the FRET mechanism. In at least some applications, the substrate is a transparent substrate.

As explained herein, the light emitting characteristics of the nanostructure composite are configured by varying at least one of the size of the primary fluorophore, the type of the secondary fluorophore, the distance between the secondary fluorophore and the primary fluorophore, and the overlap between the emission spectrum of the primary fluorophore (donor) and the absorption spectrum of the secondary fluorophore (acceptor). The light emitting characteristics may be selected such that the light emissions are in the white light range.

Further, the binding of the primary and secondary fluorophores may generally occur in a liquid phase. In a further case, the binding may be the result of interactions of a functional group in order to provide a nanomaterial structure that is operable to define a single illuminating entity which itself is operable upon application of a single excitation energy to generate light emissions consistent with selected light emission characteristics.

Although the nanostructure composites described above have been shown to be able to produce white light, the ability to tune nanostructure composites of the type described above also allows for the creation of a lighting material or lighting system produced by using at least two nanostructure composites of the type described above acting together to produce light, including white light or other light with predetermined chromaticity and color temperatures. Using materials, systems and methods described herein, differing nanostructure composites can be produced such that the different nanostructure composites have different absorption spectra, but because of tuning, the different nanostructure composites output the same chromaticity and color temperature of light, which may be white light. It is an intended advantage that such a combination of nanostructure composites will potentially provide increased efficiency over conventional phosphor based lighting or single nanostructure composite based lighting because of the increased absorption spectrum of the combination of different nanostructure composites. For example, in a fluorescent lighting example, a combination of nanostructure composites may be able to absorb a broader spectrum of ultra-violet light and convert this absorbed light into light in the visible spectrum. Additionally, the tunability of the emission of the nanostructure composites means that even though the different nanostructure composites may have different absorption spectra, they can have the same or similar emission spectra, thus generally retaining uniform color and high homogeneity regardless of the number and type of nanostructure composites used.

In one example of a hybrid lighting system, the nanostructure composites selected are ZnO and $Ga_2O_3$-based nanostructure composites. The absorption (or excitation) energy range of each nanostructure composite can be selected such that the combination of these nanostructure composites cover substantially all of the ultraviolet frequency range. In other cases, the absorption spectrum of the combination of different nanostructure composites may be tuned to a different spectrum of ultraviolet light or to an appropriate absorption/excitation spectrum for the light source that is available/used. In a specific case, the absorption range may be between approximately 180 nm to 380 nm. In some cases of the hybrid lighting system, mercury or halogen may be used to excite the nanostructure composites by producing broad ultraviolet light. In further cases, the mercury or halogen may produce other varieties of light, for example, white light.

Figure 32:
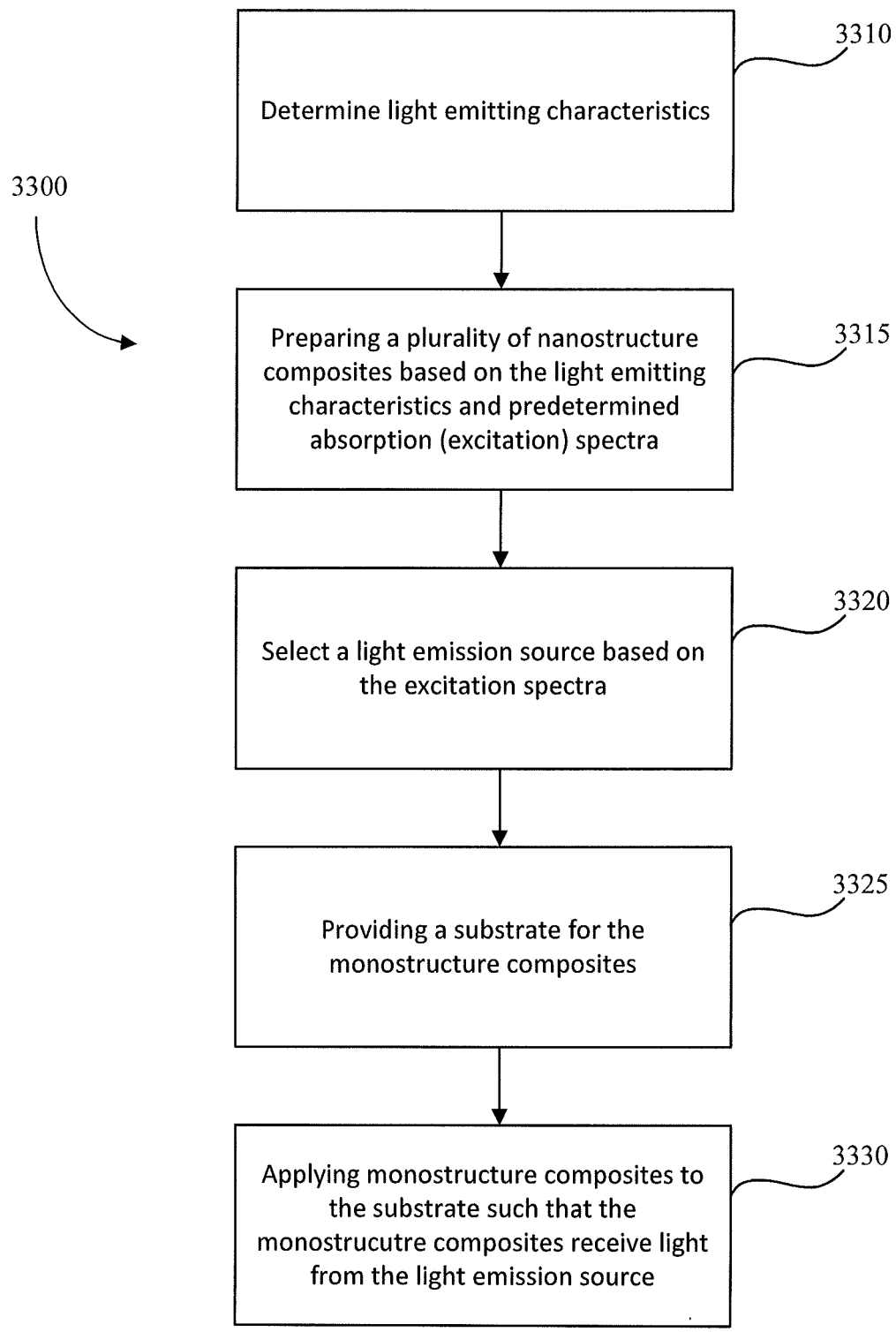
FIG. 32 is a flowchart for a method of producing a light emitting system using nanostructure composites, according to an embodiment.

FIG. 32 is a flowchart illustrating an embodiment of a method 3300 for making nanostructure composite lighting materials or systems having more than one nanostructure composites. At 3310, the light emitting characteristics are determined. At 3315, a plurality of nanostructure composites are prepared/configured based on the light emitting characteristics and are also configured to have predetermined absorption (excitation) spectra. At 3320, a light emission source is selected based on the absorption (excitation) spectra for the plurality of nanostructure composites. At 3325, a substrate is provided for the nanostructure composites. At 3330, the nanostructure composites are applied to the substrate such that the nanostructure composites receive light from the light emission source and thus provide the light emitting characteristics.

In some cases, the different nanostructure composites may have different life-cycles which may reduce efficiency and change other characteristics such as, the chromaticity, color temperature, and color rendering index. In an example, where the nanostructure composites are ZnO and $Ga_2O_3$-based, the ZnO may need increased durability to match that of $Ga_2O_3$. In this case, providing a protecting layer of a stabilizing agent (epoxy silane) on the ZnO, as described above, could enhance the stability of the ZnO. With enhanced ZnO stability, the efficiency of the hybrid/composite lighting system may be improved, while generally retaining the same homogeneity, chromaticity, correlated color temperature (CCT), and color rendering index (CRI). It will be understood that the stabilizing agent may also be used on other nanostructure composites to provide a similar effect.

In some embodiments, the nanostructure composite hybrid lighting system may also be combined with conventional phosphor lighting. In an example, there may be two layers provided wherein one layer includes the nanostructure composites described above, and a second layer that includes conventional phosphors. In another example, there may be three layers, where two nanostructure composites layers sandwich the conventional phosphor layer. The order of layers may depend on the wavelengths which are desired to be produced by the lighting system. There may also be multiple nanostructure composite layers or a single layer containing multiple nanostructure composites used with or without a conventional phosphor.

Figure 33:
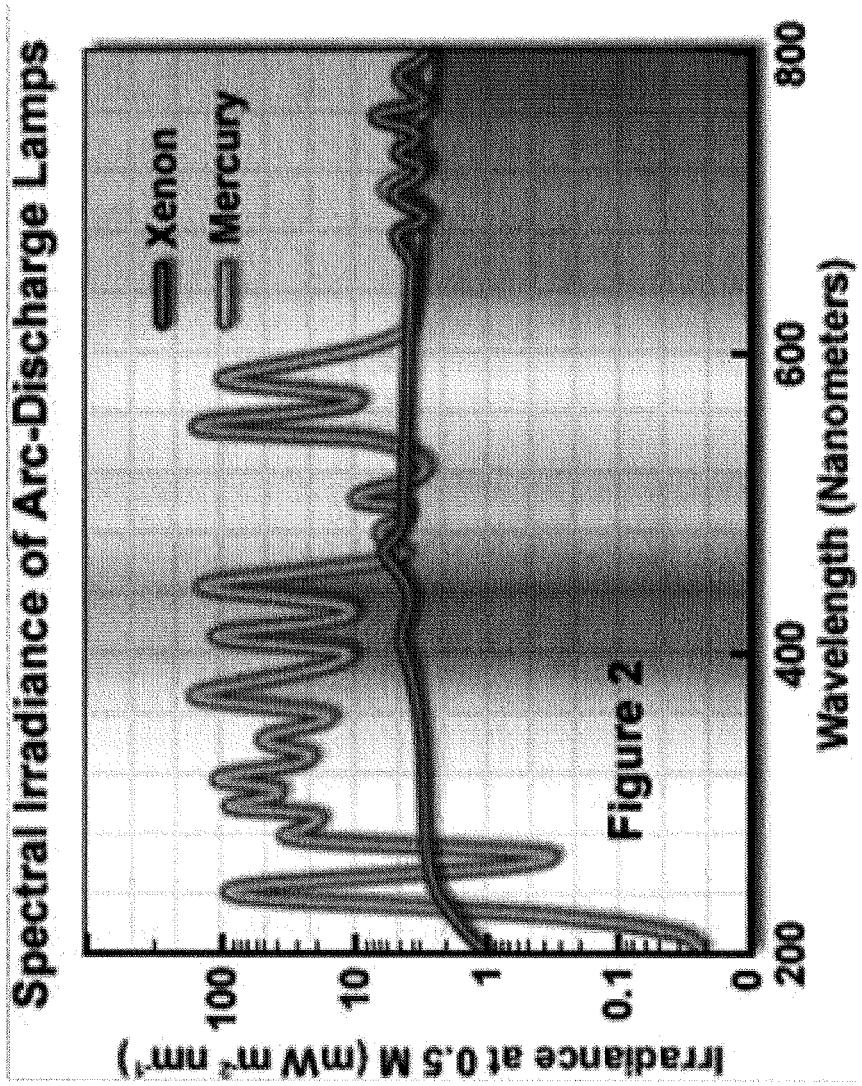
FIG. 33 illustrates a spectral output of mercury and xenon lamps.

As noted above, in conventional fluorescent lighting, much of the UV radiation created by the discharge is not used because it is filtered or reflected back into the tube, which makes the devices less efficient and/or more costly to manufacture. FIG. 33 illustrates spectral output of mercury and xenon lamps, which may be considered typical fluorescence lamps. A broad UV emission is shown from 200 to 400 nm, which is only partly extracted by currently used phosphor-based lighting systems. Lighting systems and materials using the nanostructure composites and combinations described herein, allow for more complete use of the UV radiation in order to increase the efficiency of conventional lighting. Similar results can be achieved for conventional induction lighting and by also more accurately tuning the color rendering index. Further, lighting systems and materials using the nanostructure composites and combinations described herein are also intended to reduce the need for expensive rare earth elements.

Figure 34:
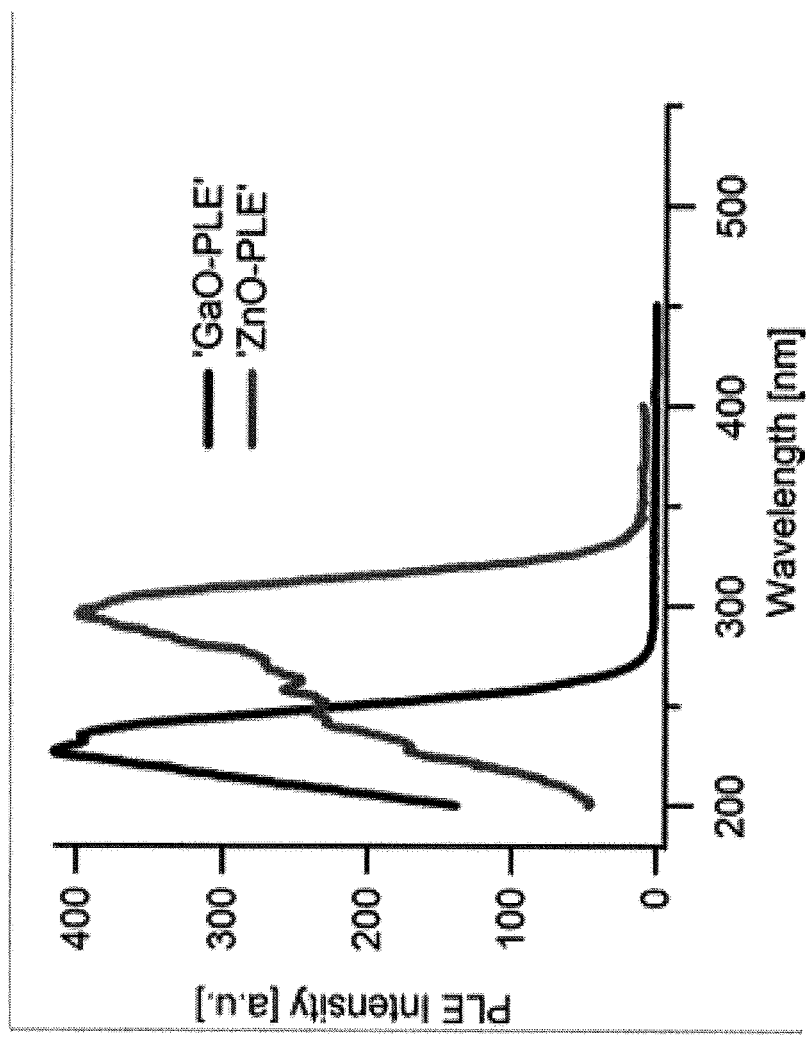
FIG. 34 illustrates an enhanced excitation energy range using two types of chromophore, according to an embodiment.

Embodiments of the materials, systems, methods described herein are intended to overcome at least some of the problems associated with conventional phosphor-based lighting. White light is produced based on energy transfer between components that act as a single "chromophore" in a nanostructure composite. The ability to also tune output for different primary and secondary nanostructure composites make the light homogeneity independent of the composition of a phosphor mixture. FIG. 34 illustrates an enhanced excitation energy range by using two types of nanostructure composites (in this example, GaO and ZnO-based nanostructure composites).

The embodiments of the materials, systems and methods described herein are intended to provide certain advantages: for example, better light quality and homogeneity; increased safety due to a reduction in released UV light and, in some cases, elimination of the use of mercury or the like; and decreased production costs due to reduced or non-use of rare earth elements. The coating of the fluorescence tubes can be accomplished from powder or liquid form of the nanostructure composite or combinations thereof. The overall processing cost may also decrease compared to conventional phosphor-based lighting due to the elimination of steps in the production process.

The nanostructure composites and combinations thereof of this disclosure are intended to provide low cost materials that produce pure white light. Additionally, the nanostructure composites and combinations thereof are tunable such that they can be excited/activated by various spectra and also produce various types of output in the visible and non-visible spectrum.

The nanostructure composites and combinations thereof can be processed into light emitting structures and devices from a liquid form, i.e. solution, or a solid form, i.e. powder.

Because of the versatility and chemical compatibility of the nanostructure composites and combinations thereof, it/they can be used in various configurations and devices. Such devices include, for example, LEDs, light emitting displays, luminescent liquids and polymer/plastic panels.

For example, LED use in television displays typically require specific color output from the LEDs that comprise the backlighting of the display. The nanostructure composites and combinations thereof described herein enables the fabrication of LEDs with particular luminescent attributes by means of the color tunability. Additionally, the ability to create a pure white light backlighting of a display allows for increased realized or perceived fidelity of color representation. The nanostructure composites and combinations thereof described herein can also be used in actual displays similarly to OLEDs, and are intended to provide higher efficiency and larger color range.

The nanostructure composites and combinations thereof described herein are intended to enable the achievement of internal quantum yield that is comparable to currently used blue LEDs, but with a higher white conversion efficiency of up to 20% in comparison to prior art technologies.

LEDs synthesized using an embodiment described herein are intended to be less expensive than traditional LEDs because the material used in the coatings is typically more than ten times less expensive. For example, silicon is an abundant and inexpensive material, and may be used as a substrate instead of conventional materials, such as sapphire, which are expensive and rare. For example, a standard blue LED precursor according to conventional systems, for example trimethylgallium 25 g, costs approximately $2000. While possible LED materials according to the present disclosure, for example, gallium acetylacetonate 25 g or zinc nitrate 25 g, costs approximately $140 and $1.25 respectively.

The nanostructure composites and combinations thereof of the present disclosure may be produced using conventional solid state manufacturing methods, which can be accomplished at relatively low costs. Additionally, the nanostructure composites and combinations thereof can also be produced in solution. This contrasts with conventional approaches, which typically have solid state only manufacturing processes. As a liquid solution, the nanostructure composites and combinations thereof may be applied, for example, by spraying or printing thus enabling useful lighting applications that would generally not have been possible in accordance with conventional solutions. For example, it may be possible to convert curtains or blinds into a light source. As well, it may be easier to produce a light source in a unique, curved shape.

A particular advantage of embodiments of the nanostructure composites and combinations thereof described herein is that their features including luminescence are highly tunable, and their luminescence features have attractive functionality attributes.

The methods described herein enable preparation and processing of light emitting structures including the white light emitting nanostructure composites and combinations thereof, from a liquid form, i.e., solution or from a solid form, i.e., powder. This makes the technology highly adaptable to different fabrication methods and infrastructures. This adaptability makes the nanostructure composites and combinations thereof highly scalable and versatile, and also easy and inexpensive to apply in relation to existing processes and fabrication infrastructures. As well, its chemical compatibility enables use in connection with a large number of configurations and devices, for example, LEDs, light emitting displays, luminescent liquids, or polymer/plastic panels.

The light emitting structures fabricated using the nanostructure composites and combinations thereof are highly tunable to consumer preference. For example, some consumers prefer "pure white light" while others prefer a "more yellow white", sometimes called a "warm white light". Many consumers, for example, complain about the appearance or eye comfort of emerging non-incandescent light sources. The flexibility of nanostructure composites and combinations thereof enables the tuning of features based on adjusting of the characteristics during synthesis, such as nanocrystal size and the choice and concentration of the nanocrystal bound fluorophores as well as the combination of the nanostructure composites. Adjusting these characteristics can in turn vary the quality of light, such as producing a pure white light or a warm white light.

The embodiments of the materials and production/synthesis methods described herein are intended to enable a manufacturer to use the same or similar manufacturing infrastructure and the same or similar processes at a high level. As such, a manufacturer can manufacture different products with different attributes addressing variation in consumer or business preference. As well, the method of synthesis described herein typically requires fewer manufacturing steps than prior art methods. Also, the synthesis method enables solution-based fabrication (i.e. liquid phase) which is intended to provide for new lighting applications, and more cost effective fabrication of light emitting structures, based on custom requirements.

A further advantage is that the nanostructure composites and combinations thereof are compatible with outdoor and large-space lighting technologies relying on high-energy UV excitation.

Generally speaking, the present disclosure provides the ability to tune the chromaticity and spectral properties of nanostructure composites and combinations thereof. The nanostructure composites and combinations thereof are composed of different "primary" (i.e., metal oxide nanocrystals, such as $Ga_2O_3$ and ZnO nanocrystals) and "secondary" (i.e., organic dye) fluorophores by resonance energy transfer (FRET). This process allows the generation of white light with chromaticity and color rendering index matching by different donor-acceptor FRET pairs or by combinations of nanostructure composites. Furthermore, the described surface protection chemistry can allow for the enhancement of stability of different materials, enabling the retention of the same chromaticity over time. The nanostructure composites and combinations thereof can convert a broad range of UV radiation to light with tunable chromaticity and color temperature, and high color rendering index for various applications, such as in fluorescent or induction lighting and displays.

In particular, some embodiments herein may be useful for fluorescence and induction lighting. These types of lighting have particular application in outdoor and large-area lighting. Typically, fluorescence or induction lighting generates a broad range of UV radiation, which is usually filtered, thus meaning that energy is lost in the process and generally reducing the energy efficiency. While certain narrow ranges of wavelengths can be converted to white light via different, rare-earth phosphors, it remains extremely challenging to convert broad UV output and simultaneously produce white light of the required chromaticity. Embodiments herein are intended to address these challenges without the use of rare-earth elements. Furthermore, the embodiments described herein are intended to be applied for displays and other technologies, which also generate residual UV radiation, which can then be converted to light having high quality and predetermined characteristics.

The embodiments described herein are intended to provide convenient matching of the chromaticity (including pure white light) of the photoluminescence of nanostructure composites and combinations thereof to generate homogeneous light output. Some embodiments also provide conversion of a broad range of UV light by selecting the absorption/excitation spectra of different nanostructure composites and combinations thereof. Further some embodiments are intended to increase the stability of ZnO-based nanostructure composites to retain the same chromaticity and prevent the change in the homogeneity of the generated light over prolonged device operation. Additionally, some embodiments are intended to have application to general outdoor lighting (fluorescence and induction lighting) and displays to improve their efficiency and safety.

Experiments have demonstrated the concept of harvesting a broad range of UV radiation using a mixture of different nanostructure composites and combinations thereof (for example, dye-conjugated gallium oxide and zinc oxide nanocrystals), and converting the UV radiation into visible light. In particular, the tunability of these nanostructure composites allows for generating light of the same chromaticity for different hybrids, making their mixture generally homogeneous in terms of emitted light.

Embodiments of the materials, systems and methods herein may have application to lighting, for example, municipalities, city governments, institutions, factories, malls, public spaces (convention centers etc.), parking lots, or the like. As well, embodiments may have application for manufacturers of electronic devices containing displays, for example, on smart phones, LCD TVs, or the like. As markets for these devices expand, there is also an increased demand for more energy efficient lighting.

Embodiments of the light emitting materials herein are intended to have one or more beneficial qualities, including non-toxic, environmentally benign and inexpensive, made from earth abundant elements.

All terms used herein are used in accordance with their ordinary meanings unless the context or definition indicates otherwise. Also, unless indicated otherwise by context the use of "or" includes "and" and vice-versa. Non-limiting terms are not to be construed as limiting unless expressly stated or the context clearly indicates otherwise (for example, "including", "having", "characterized by" and "comprising" typically indicate "including without limitation"). Singular forms included in the claims such as "a", "an" and "the" include the plural reference unless expressly stated or the context clearly indicates otherwise. Further, it will be appreciated by those skilled in the art that other variations of the preferred embodiments described may also be practiced without departing from the scope of the claims.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding.

The above-described embodiments are intended to be examples only. Alterations, modifications and variations can be effected to the particular embodiments by those of skill in the art. The scope of the description should not be limited by the particular embodiments set forth herein, but should be construed in a manner consistent with the specification as a whole.

I claim:

1. A method for making a light emitting structure, the method comprising:
   determine desired light emitting characteristics that provide light having predetermined chromaticity, color temperature, or color rendering index;
   prepare a plurality of nanostructure composites, wherein each of the plurality of nanostructure composites are tuned to provide the same desired light emitting characteristics and are each configured with predetermined excitation characteristics, wherein the predetermined excitation characteristics cover substantially all of the ultraviolet frequency range;
   selecting a light source based on the predetermined excitation characteristics for the plurality of nanostructure composites;
   providing a substrate for the plurality of nanostructure composites; and
   applying the plurality of nanostructure composites to the substrate such that the plurality of nanostructure composites receive light from the light source.

2. A method according to claim 1 wherein the excitation characteristics of the plurality of nanostructure composites are configured to cover a sub-set of the ultraviolet frequency range.

3. A method according to claim 2 wherein the sub-set of the ultraviolet frequency range is approximately 180 nm to 380 nm.

4. A method according to claim 1 wherein the light source is a mercury or halogen light source.

5. A method according to claim 1 wherein the light source is a fluorescent lighting source.

6. A method according to claim 1 wherein at least one of the plurality of nanostructure composites comprises a stabilizing agent.

7. A method according to claim 6 wherein the stabilizing agent is epoxy silane.

8. A method according to claim 1 wherein the applying the plurality of nanostructure composites comprises forming a layer including the plurality of nanostructure composites.

9. A method according to claim 8 wherein the light emitting structure further comprises a second layer comprising conventional phosphors.

10. A method according to claim 9 wherein the light emitting structure further comprises additional layers of nanostructure composites and conventional phosphor based on the wavelengths for the desired light emitting characteristics.

11. A method according to claim 1 wherein the plurality of nanostructure composites comprises a first and second nanostructure composite and the method further comprises:
   configuring the first nanostructure composite to provide photoluminescence (PL) in a first PL spectrum based on the light emitting characteristics and to have absorption for a first excitation spectrum; and
   configuring the second nanostructure composite to provide photoluminescence in a second PL spectrum based on the light emitting characteristics and to have absorption for a second excitation spectrum that is different from the first adsorption spectrum.

12. A method according to claim 11 wherein the first PL spectrum and the second PL spectrum are the same.

13. A method according to claim 11 wherein the first nanostructure composite is applied in a first layer and the second nanostructure composite is applied in a second layer.

14. A method according to claim 11 wherein the first nanostructure composite and the second nanostructure composite are mixed and applied in a single layer.

15. A method according to claim 11 wherein the first absorption spectrum and the second absorption spectrum overlap.

16. A light emitting structure comprising:
   a plurality of nanostructure composites, wherein the plurality of nanostructure composites are each tuned to have predetermined excitation characteristics and predetermined emission characteristics, wherein the predetermined emission characteristics have the same value of at least one of color coordinates, color temperature or color rendering index to provide uniform and homogenous white light when excited based on the predetermined excitation characteristics; and
   a substrate for the plurality of nanostructure composites, wherein the plurality of nanostructure composites are applied to the substrate such that the plurality of nanostructure composites receive light from a light source having a spectrum that includes the predetermined excitation characteristics.

17. A light emitting structure according to claim 16 wherein the plurality of nanostructure composites comprise $Ga_2O_3$ and ZnO-based nanostructure composites.

18. A light emitting structure according to claim 16 wherein at least one of the plurality of nanostructure composites comprises a stabilizing agent.

19. A light emitting structure comprising:
   a plurality of metal oxide-based nanostructure composites, wherein the plurality of nanostructure composites are each tuned to have:
      predetermined emission characteristics that have the same value of at least one of color coordinates, color temperature or color rendering index to provide uniform and homogenous white light; and
      predetermined excitation characteristics that cover substantially all of the ultraviolet frequency range; and
   a substrate for the plurality of nanostructure composites, wherein the plurality of nanostructure composites are applied to the substrate such that the plurality of nanostructure composites receive light from a light source having a spectrum that includes the predetermined excitation characteristics.

20. A light emitting structure according to claim 19 wherein the tuning of the predetermined emission characteristics comprises adjusting the size of the nanostructure composites and the type and concentration of a secondary fluorophore used with the nanostructure composites.

* * * * *